US012131723B2

(12) United States Patent
Mitsuhashi et al.

(10) Patent No.: US 12,131,723 B2
(45) Date of Patent: Oct. 29, 2024

(54) SOUND PROCESSING DEVICE, SOUND PROCESSING METHOD, AND NON-TRANSITORY COMPUTER READABLE MEDIUM STORING PROGRAM

(71) Applicant: Roland Corporation, Shizuoka (JP)

(72) Inventors: Takeshi Mitsuhashi, Shizuoka (JP); Hideaki Shiraishi, Shizuoka (JP)

(73) Assignee: Roland Corporation, Shizuoka (JP)

( * ) Notice: Subject to any disclaimer, the term of this patent is extended or adjusted under 35 U.S.C. 154(b) by 313 days.

(21) Appl. No.: 17/700,460

(22) Filed: Mar. 21, 2022

(65) Prior Publication Data

US 2023/0062249 A1 Mar. 2, 2023

(30) Foreign Application Priority Data

Aug. 31, 2021 (JP) ................................ 2021-141221

(51) Int. Cl.
*G10H 1/00* (2006.01)
*G06F 3/0482* (2013.01)
*G06F 3/0486* (2013.01)

(52) U.S. Cl.
CPC ......... *G10H 1/0008* (2013.01); *G06F 3/0482* (2013.01); *G06F 3/0486* (2013.01); *G10H 2220/106* (2013.01)

(58) Field of Classification Search
CPC ............ G10H 1/0008; G10H 2220/106; G06F 3/0482; G06F 3/0486
See application file for complete search history.

(56) References Cited

U.S. PATENT DOCUMENTS

| 9,922,630 | B2 * | 3/2018 | Ceccolini | G06F 9/451 |
| 10,885,890 | B2 * | 1/2021 | Pezeshkian | G10H 1/0008 |
| 11,170,746 | B2 * | 11/2021 | Sato | G10H 1/344 |
| 2008/0053293 | A1 | 3/2008 | Georges et al. | |
| 2016/0019877 | A1 * | 1/2016 | Remignanti | G10H 1/0058 84/645 |
| 2020/0202826 | A1 * | 6/2020 | Nolan | G10H 3/186 |
| 2020/0312288 | A1 * | 10/2020 | Sato | G10H 1/0091 |
| 2020/0341718 | A1 * | 10/2020 | Hiskey | G11B 27/34 |

(Continued)

FOREIGN PATENT DOCUMENTS

| WO | 2014142931 | 9/2014 |
| WO | 2019143364 | 7/2019 |

OTHER PUBLICATIONS

"Search Report of Europe Counterpart Application", issued on Sep. 1, 2022, p. 1-p. 10.

(Continued)

*Primary Examiner* — Robert W Horn
(74) *Attorney, Agent, or Firm* — JCIPRNET

(57) ABSTRACT

A sound processing device that is capable of setting a plurality of processes to be performed on a sound signal on a time axis. The sound processing device includes a display control part that controls display of a screen on which two or more blocks each indicating input and output of the sound signal and process details for the input sound signal can be disposed, and a signal processing part that performs a process corresponding to each block on the sound signal in a block order defined on the basis of a positional relationship between a block disposed on the screen and a new block disposed on the screen.

18 Claims, 37 Drawing Sheets

(56) References Cited

U.S. PATENT DOCUMENTS

2022/0222294 A1* 7/2022 Wang ................. G06F 16/685
2023/0062249 A1* 3/2023 Mitsuhashi ........... G06F 3/0482

OTHER PUBLICATIONS

Jean Bresson, "Sound Processing in OpenMusic," Proceedings of the 9th International Conference on Digital Audio Effects(DAFx-06), Montreal, Canada, Sep. 2006, pp. 1-6.

Ircam, Anonymous, "OpenMusic Documentation—Sound Processing," Feb. 2017, available at: https://web.archive.org/web/20170203001944/http://support.ircam.fr/docs/om/om6-manual/co/SoundProcessing.html.

* cited by examiner

SOUND PROCESSING DEVICE, SOUND PROCESSING METHOD, AND NON-TRANSITORY COMPUTER READABLE MEDIUM STORING PROGRAM

CROSS-REFERENCE TO RELATED APPLICATION

This application claims the priority benefit of Japan application serial no. 2021-141221, filed on Aug. 31, 2021. The entirety of the above-mentioned patent application is hereby incorporated by reference herein and made a part of this specification.

BACKGROUND

Technical Field

The present disclosure relates to a sound processing device, a sound processing method, and a non-transitory computer readable medium storing program.

Description of Related Art

In the related art, there is the following technique in a multi-effects board for a guitar. That is, a processor displays, on a display, an image of a signal chain, which includes images of pedals and images of existing simulated connections between the pedals. By touching an image of a pedal and dragging the image to a destination position, a signal path in the signal chain can be changed (for example, Patent Document 1).

Patent Documents

[Patent Document 1] International Publication No. 2019/143364

In the related art, in generation of a signal chain, a process of connecting images of pedals with images of connections is necessary and is complicated.

SUMMARY

The present disclosure provides a sound processing device, a sound processing method, and a program in which a user can easily determine the order of processing for a sound signal.

According to an embodiment of the present disclosure, there is provided a sound processing device that can set a plurality of processes to be performed on a sound signal on a time axis, the sound processing device including a display control part that controls display of a screen on which two or more blocks each indicating input and output of the sound signal and process details for the input sound signal can be disposed; and a signal processing part that performs a process corresponding to each block on the sound signal in a block order defined on the basis of a positional relationship between a block disposed on the screen and a new block disposed on the screen.

The present disclosure may be a sound processing method, a non-transitory computer readable medium storing program, and a non-transitory storage medium storing the program, having the same characteristics as those of the sound processing device.

BRIEF DESCRIPTION OF THE DRAWINGS

FIG. 25 is a flowchart illustrating a process example of checking a chain block region in a case where a palette block flag is ON.

FIG. 28 is a flowchart illustrating an example of a process of checking a chain block region in a case where the chain block flag is ON.

DESCRIPTION OF THE EMBODIMENTS

Figure 1:
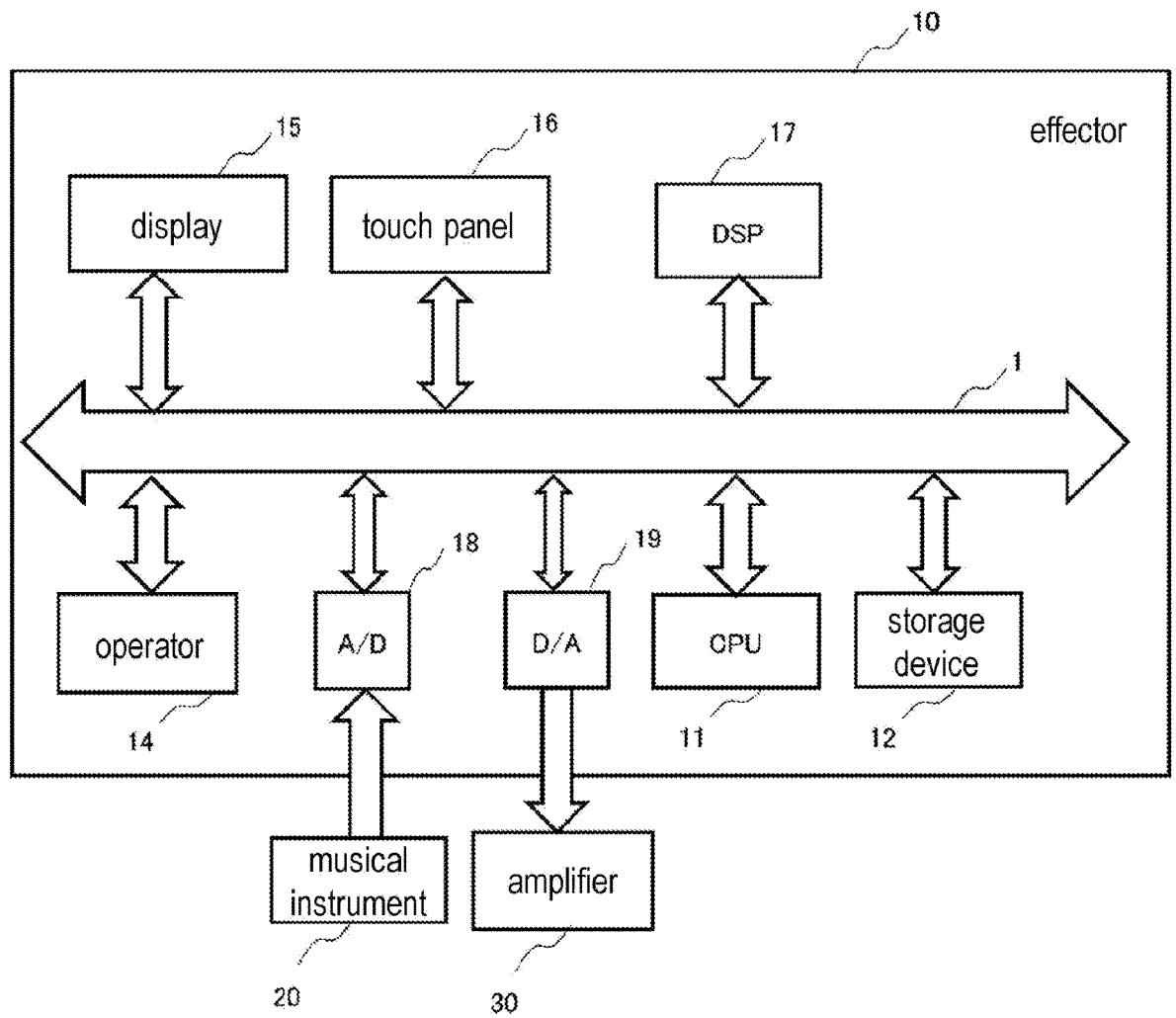
FIG. 1 is a diagram illustrating a configuration example of an effector according to an embodiment.

Hereinafter, an embodiment will be described with reference to the drawings. The configuration of the embodiment is an example and embodiments are not limited to the configuration of this embodiment. FIG. 1 is a diagram illustrating a configuration example of an effector 10 according to the embodiment. The effector 10 is an example of a "sound processing device".

Configuration of Effector

The effector 10 includes a central processing unit (CPU) 11, a storage device 12, an operator 14, a display 15, a touch panel 16, a digital signal processor (DSP) 17, an analog-to-digital converter (A/D) 18, and a digital-to-analog converter (D/A) 19, connected to a bus 1. A musical instrument 20 is connected to the A/D 18, and an amplifier 30 is connected to the D/A 19.

The musical instrument 20 is, for example, an electric guitar. However, the musical instrument may include an electronic musical instrument (such as an electronic piano) other than an electric guitar. The effector receives a signal of sound (also referred to as a musical sound or a performance sound) input from the musical instrument 20 through playing of the musical instrument 20, that is, a sound signal. The effector 10 processes the received sound signal to generate a sound signal in which the performance sound of the musical instrument 20 is given an effect desired by a user. The sound signal output from the effector 10 is input to the amplifier 20. The amplifier 20 is an amplifier that amplifies the input sound signal, and the amplified sound signal is connected to a speaker built in the amplifier 20 or a speaker connected to the amplifier 20, and the speaker outputs sound based on the sound signal.

The CPU 11 is an example of a "processor". The CPU 11 performs various processes related to imparting an effect to a sound signal by executing a program. The storage device 12 includes a ROM and a RAM. The ROM is used as a storage region for programs executed by the CPU 11 and data. The RAM is used as a work region of the CPU 11 and a storage region for programs and data. The ROM and the RAM are examples of main storage devices, and the storage device 12 may further include an auxiliary storage device storing programs and data. The auxiliary storage device includes, for example, a hard disk, a solid state drive (SSD), a flash memory, or an electrically erasable programmable read-only memory (EEPROM).

The operator 14 is a knob, a key, a button, a switch, or the like for setting various settings for the effector 10. The display 15 is a liquid crystal display, an organic EL, or the like, and is used to display information. The touch panel 16 is used to operate a user interface (UI) displayed on the display 15.

The A/D 18 converts an analog sound signal input from the musical instrument 20 into a digital sound signal and supplies the digital sound signal to the DSP 17. According to execution of the program, the CPU 11 performs setting for a process or processing to be performed on the sound signal for the DSP 17 in order to impart an effect. The DSP 17 performs various processes on the sound signal according to the setting performed by the CPU 11. A sound signal imparted with a desired effect is generated through the processes. The D/A 19 receives the sound signal output from the DSP 17, converts the input digital sound signal into an analog sound signal, and outputs the analog sound signal to the amplifier 30.

Figure 2:
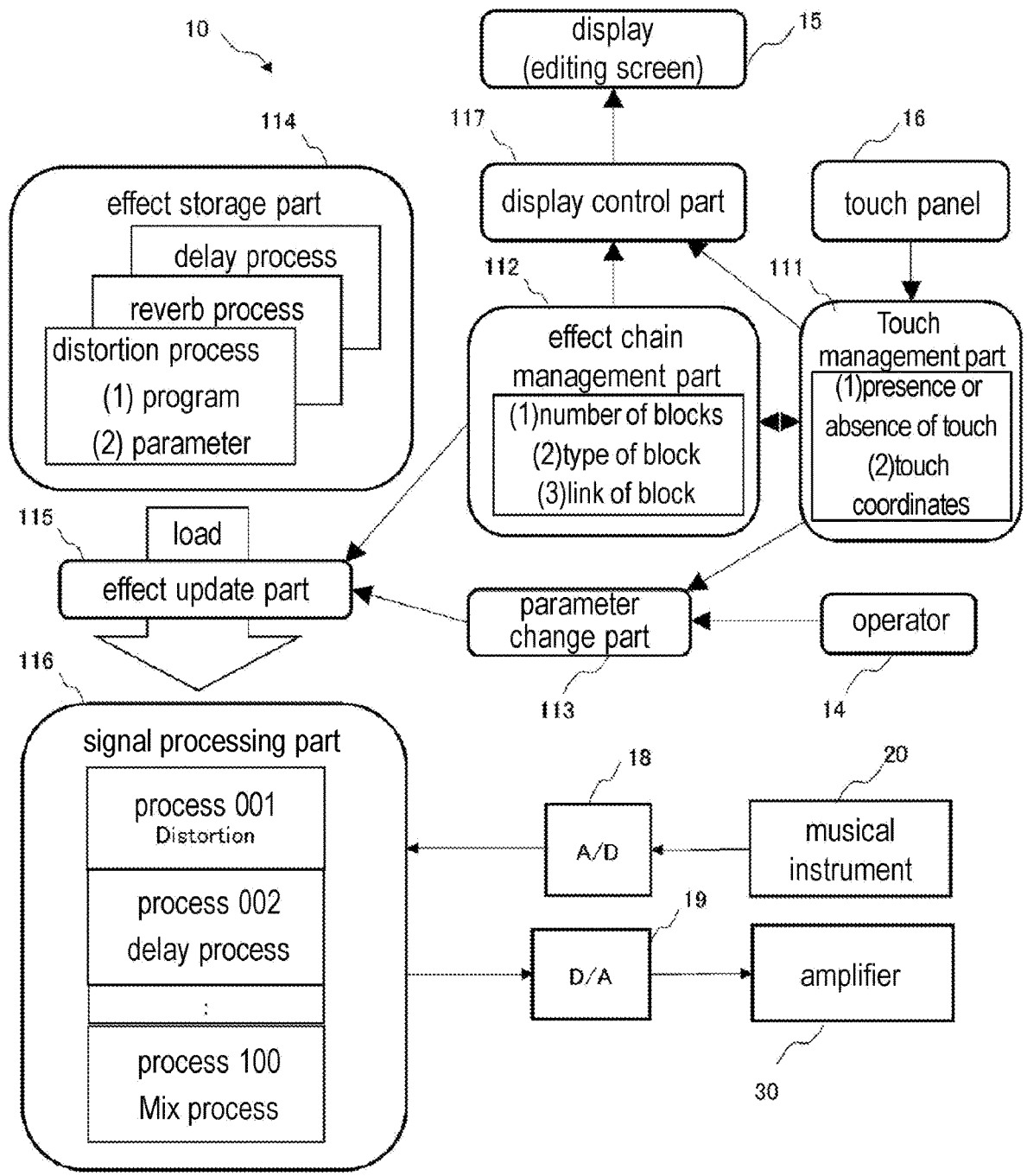
FIG. 2 is a block diagram illustrating a process performed by the effector.

FIG. 2 is a block diagram illustrating a process performed by the effector 10. When the CPU 11 illustrated in FIG. 1 executes a program, the effector 10 operates as a device having the configuration as illustrated in FIG. 2. Specifically, the CPU 11 operates as a touch management part 111, an effect chain management part 112, a parameter change part 113, an effect update part 115, and a display control part 117 with execution of the program. The storage device 12 is used as an effect storage part 114. The DSP 17 operates as a signal processing part 116.

The touch management part 111 determines whether or not there is a touch on the touch panel 16 provided on the display 15, that is, detects a touch. In a case where the touch is detected, the touch management part 111 detects or calculates the coordinates of the screen of the touched display 15.

The effect chain management part 112 manages information indicating an effect chain (that will be described later) (referred to as effect chain information) displayed on a setting screen in a case where the type of effect to be imparted to a sound signal, the order in which effects are imparted, and the like are set (edited). The effect chain information is managed by being stored in the storage device 12. The effect chain information includes information indicating the number of blocks forming an effect chain, information indicating the type of block, and information indicating a link (connection order) of blocks. The effect chain management part 112 is an example of a "generation part".

The display control part 117 performs control for displaying an effect chain based on the effect chain information managed by the effect chain management part 112 on the setting screen of the display 15.

The effect storage part 114 is a library that stores programs and data (setting parameters) for imparting a plurality of types of effects (also referred to as effects) that can be imparted to a sound signal by the effector 10. The effects are, for example, distortion, reverb, and delay, but are not limited to these.

The effect update part 115 reads programs and parameters related to the effects that are impartment targets according to the set effect chain, and loads them to the DSP 17 (signal processing part 116). In this case, a parameter set in the signal processing part 116 may be changed to a value changed by the parameter change part 113.

The parameter change part 113 generates a changed parameter with respect to an effect that is a change target according to a touch on the touch panel 16 detected by the touch management part 111 or an operation input for the operator 14. The parameter change part 113 supplies information indicating the changed parameter to the effect update part 115. If the changed parameter is received from the parameter change part 113 when a program and a parameter related to the effect are loaded, the effect update part 115 changes (updates) a value of the parameter that is a loading target to a value of the changed parameter.

The signal processing part 116 operates as an electric/electronic circuit that performs a plurality of predetermined processes (example: processes 001 to 100 in the figure) on a sound signal input from the musical instrument 20 via the A/D 18 according to a program and parameters. The sound signal output from the signal processing part 116 is input to the amplifier 30 via the D/A 19.

Effect Chain

Next, an effect chain that is edited and set by using the effector 10 will be described. FIGS. 3A and 3B and FIGS. 4A and 4B are diagrams illustrating display examples of an effect chain editing screen.

Figure 3A:
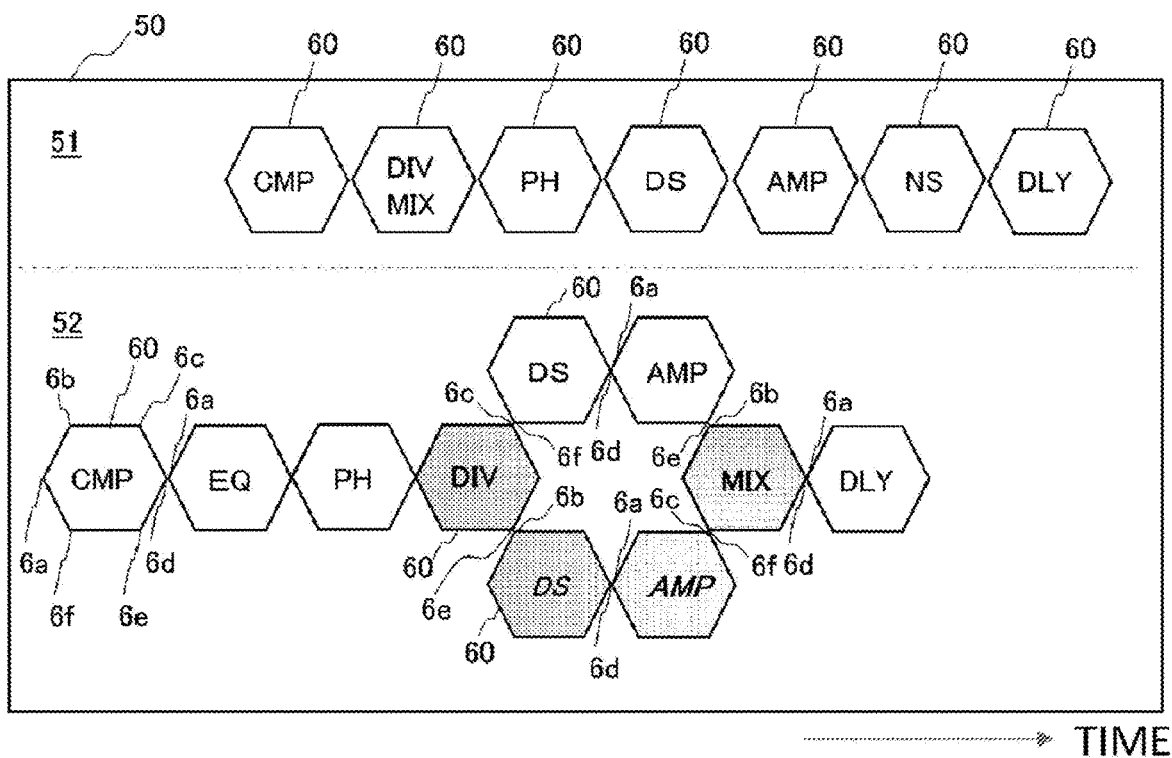
FIGS. 3A and 3B are diagrams illustrating a display example of an effect chain editing screen.

FIG. 3A illustrates a display example of an effect chain editing screen (also referred to as a setting screen) 50 displayed on the display 15. The editing screen 50 (hereinafter, simply referred to as a "screen 50") includes a pallet region 51 provided on the upper side of the screen 50 and an editing region 52 provided under the pallet region 51. The editing screen 50 is an example of a "screen". The palette region 51 is an example of a "first region", and the editing region 52 is an example of a "second region".

In the palette region 51, a plurality of types of blocks 60 that can be edited or set in the editing region 52 are displayed. The pallet region 51 can be scrolled left and right independently of the editing region 52, and the hidden block 60 can be displayed in the pallet region 51 through scrolling. The block 60 is a symbol (icon) indicating input and output of a sound signal and a process performed on the sound signal.

When any one block 60 displayed in the palette region 51 is selected by touching the touch panel 16 (finger pressing or the like), the selected block 60 is in a drag state. When the finger is moved to the editing region 52 in the drag state, the block 60 in the drag state is moved to the editing region 52 following the movement of the finger. When the finger is released at a desired position of the editing region 52, the block 60 is dropped onto the editing region 52, and the block 60 is disposed in the editing region 52.

In the present embodiment, the block 60 has a regular hexagonal shape and has six vertices 6a to 6f. In the block 60, two parallel sides facing each other on the screen 50 are disposed in the left-right direction of the screen 50. A time axis direction is set in the editing region 52. In the present embodiment, the time axis direction is set to the left-right direction of the editing screen, and time flows from the left to the right of the screen 50 in the editing region 52 (refer to the TIME arrow in FIG. 3A). In other words, on the screen 50, the right direction of the editing region 52 is a future direction.

The direction of the time axis flowing from the left to the right of the screen 50 is an example, and a direction of the time axis on the screen 50 may be any of a direction from the right to the left of the screen 50, a direction from the top to the bottom, and a direction from the bottom to the top. A direction of the time axis may be an oblique direction with respect to the vertical direction or the horizontal direction of the screen. Regardless of a direction of the time axis, an effect chain extends in one direction toward the future direction of the time axis and is not folded on the screen 50.

By repeating drag and drop of the blocks 60 from the palette region 51 described above, a plurality of blocks 60 can be disposed in the editing region 52 in the time axis direction from left to right. The effect chain is represented in the editing region 52 by a link of a plurality of blocks 60 disposed along the time axis. The editing region 52 can be scrolled in the left-right direction independently of the palette region 51, and in a case where a length of the effect chain does not fit in a size of the screen 50 in the left-right direction, a desired portion of the effect chain can be displayed on the screen 50 by scrolling the editing region 52.

The block 60 may be classified into a first type block 60 (referred to as a normal block) having one input and one output, and a second type block 60 (referred to as a branch source block) having one input and two outputs, and a third type block 60 (referred to as an aggregation block) having two inputs and one output. Inputs and outputs are indicated by any of the vertices 6a-6f.

In the example in FIG. 3A, each of the blocks 60 such as "CMP", "EQ", "PH", "DS", "AMP", "DLY", "DS (underlined)", and "AMP (underlined)" in the editing region 52 corresponds to a normal block. The block 60 such as "DIV" in the editing region 52 corresponds to a branch source block. The block 60 such as "MIX" in the editing region 52 corresponds to an aggregation block.

In a case where a new normal block is disposed with respect to the disposed block 60 through drag and drop, this new block is disposed on the right side (future direction) of the disposed block along the time axis direction. In this case, the leftmost vertex 6a of the new block 60 is connected to the rightmost vertex 6d of the disposed block 60.

In a case where output of a sound signal is caused to branch into two directions from a certain disposed block 60 (for example, the block 60 "DIV"), the branch source block 60 is disposed on the right side of the disposed block 60. In the branch source block 60, the vertices 6c and 6e respective indicate the two outputs.

The next block (referred to as a first branch block) connected to the vertex 6c (first output) of the branch source block is disposed on the upper right of the branch source block, and the lower left vertex 6f thereof is connected to the vertex 6c of the branch source block. In the example in FIG. 3A, the block "DS" connected to the branch source block "DIV" corresponds to the first branch block.

The next block (referred to as a second branch block) connected to the vertex 6e (second output) of the branch source block is disposed on the lower right of the branch source block, and the upper left vertex 6b thereof is connected to the vertex 6e of the branch source block. In the example in FIG. 3A, the block "DS (underlined)" connected to the branch source block "DIV" corresponds to the second branch block.

In a case where outputs from two disposed blocks 60 are aggregated (mixed), an aggregation block is disposed. In the example illustrated in FIG. 3A, the block 60 "MIX" connected to the block 60 "AMP" (corresponding to a first aggregation source block) and the block 60 "AMP (underlined)" (corresponding to a second aggregation source block) corresponds to an aggregation block.

The aggregation block is disposed on the lower right of the first aggregation source block and on the upper right of the second aggregation source block. The upper left vertex 6b of the aggregation block is connected to the lower right vertex 6e of the first aggregation source block, and the lower left vertex 6f of the aggregation block is connected to the upper right vertex 6c of the second aggregation source block.

A normal block, a branch source block, or an aggregation block may be connected to a first branch block. The example in FIG. 3A illustrates a case where the normal block "AMP" is connected to the block "DS" that is a first branch block. In a case where a branch block is connected to the first branch block, the first branch block also serves as a branch source block. In a case where an aggregation block is connected to the first branch block, the first branch block also serves as a first or second aggregation source block. The same applies to the second branch block.

By repeatedly dragging and dropping the blocks 60 from the palette region 51 to the editing region 52, it is possible to edit an effect chain in which a plurality of blocks 60 are arranged along the time axis direction (left-right direction) of the editing region 52. Each of the blocks 60 indicates details of a process to be performed on an input sound signal. Therefore, the effect chain indicates the order of input/output of a sound signal flowing between the blocks and details of the process performed in each block.

The types of effects includes "CMP (compressor)", "EQ (equalizer)", "DS (distortion)", "AMP (amplifier)", "DLY (delay)", "PH (phaser): growl effect", "NS (noise suppression): noise removal effect", and the like. The type and number of effects that the effector 10 can impart to a sound signal are arbitrary and are not limited to the above examples.

The block "DIV" is a block (branch source block) in which process details are branching of an input sound signal, and the block "MIX" is a block (aggregation block) in which process details are mixing of two input sound signals. The blocks "DS" and "AMP" located on one of the branch paths in FIG. 3A and indicated in shaded regions (actually highlighted) and in italics are the blocks 60 respectively corresponding to the white blocks "DS" and "AMP" located on the other branch path, and in which process details are causing an input sound signal to pass therethrough (the sound signal is output without any process). A block through which a sound signal passes (referred to as a through-block) is used in a case of dividing a path of the sound signal into two, and imparting an effect on one path and not imparting an effect on the other path (maintaining the original sound signal). The block "DIV", the block "MIX", and the through-block are referred to as "functional blocks" from the viewpoint that they are blocks for controlling a flow direction of a sound signal rather than imparting an effect to the sound signal. A user can change a setting from a "through process" to a process of executing a process of the corresponding block 60, and vice versa, regarding a through-block. For example, a user can change a setting of the block "DS" as a through-block to the block "DS", and can change a setting of the changed block "DS" to a through-block.

In the present embodiment, a connection between the blocks indicates a state in which the vertices of the two blocks 60 are in contact with each other, and thus a user can intuitively understand the connection between the blocks, that is, input and output of a sound signal. However, it is not always necessary that the vertices of the two blocks 60 are in contact with each other, and a gap may be provided between the vertices. That is, the vertices may be separated from each other. Corners between two connected blocks may overlap each other. A connection relationship indicates an input/output relationship of a sound signal (a relationship in which a sound signal output from one block is input to the other block).

Figure 3B:
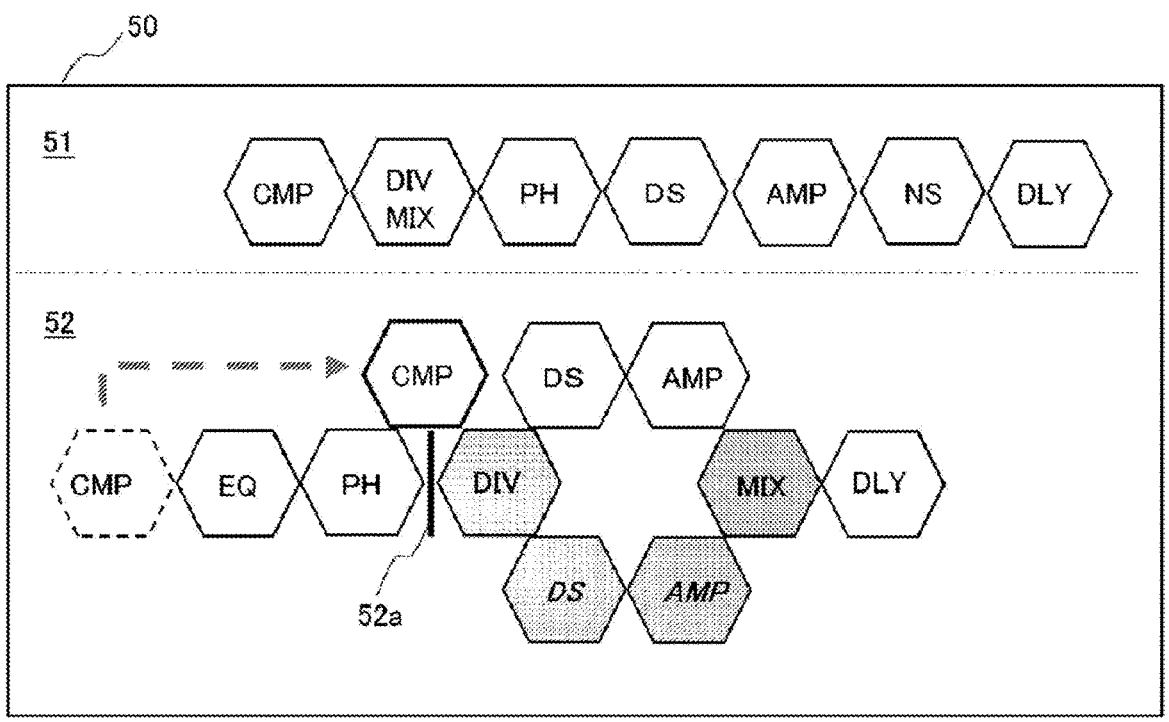

In the editing region 52, the effect chain can be edited by using the already disposed blocks 60. For example, as illustrated in FIG. 3B, when one of the disposed blocks 60 (the block "CMP" in the example in FIG. 3B) is selected, the block "CMP" is in a drag state. The selection is performed, for example, by a user of the effector 10 touching the block "CMP" in the editing region 52 on the editing screen 50 with a finger or a touch pen. The block "CMP" can be moved to a desired position by moving the finger or the like. For example, as illustrated in FIG. 3B, when the dragged block "CMP" is brought close between the block "PH" and the block "DIV", a vertical line symbol 52a indicating an insertion position between the block "PH" and the block "DIV" is displayed. In this state, when the user releases the finger from the editing screen 50 to drop the block "CMP", the block "CMP" is automatically changed to a state of being inserted between the block "PH" and the block "DIV". As described above, the user of the effector 10 can change a position or an order of the block 60 in the effect chain through a simple operation.

Figure 4A:
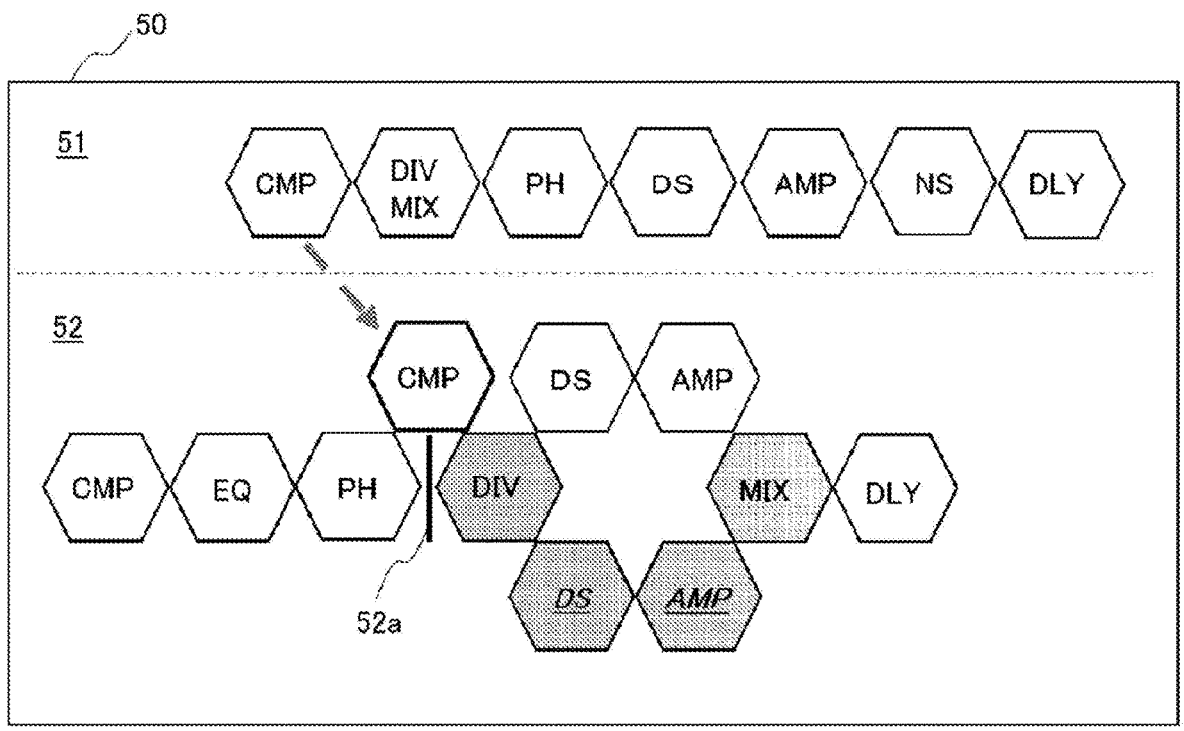
FIGS. 4A and 4B are diagrams illustrating a display example of an effect chain editing screen.

As illustrated in FIG. 4A, when the user selects (touches) the block 60 in the palette region 51 to be brought into a drag state and brings the block 60 close between the blocks in the editing region 52, the symbol 52a indicating the above insertion position is displayed in the editing region 52. In the example illustrated in FIG. 4A, the symbol 52a is displayed between the block "PH" and the block "DIV". When the block 60 is dropped in this state, the dropped block 60 is inserted between the two blocks 60 (the block "PH" and the block "DIV") separated by the symbol 52a. As described above, the user of the effector 10 can insert the new block 60 into the effect chain through a simple operation.

Figure 4B:
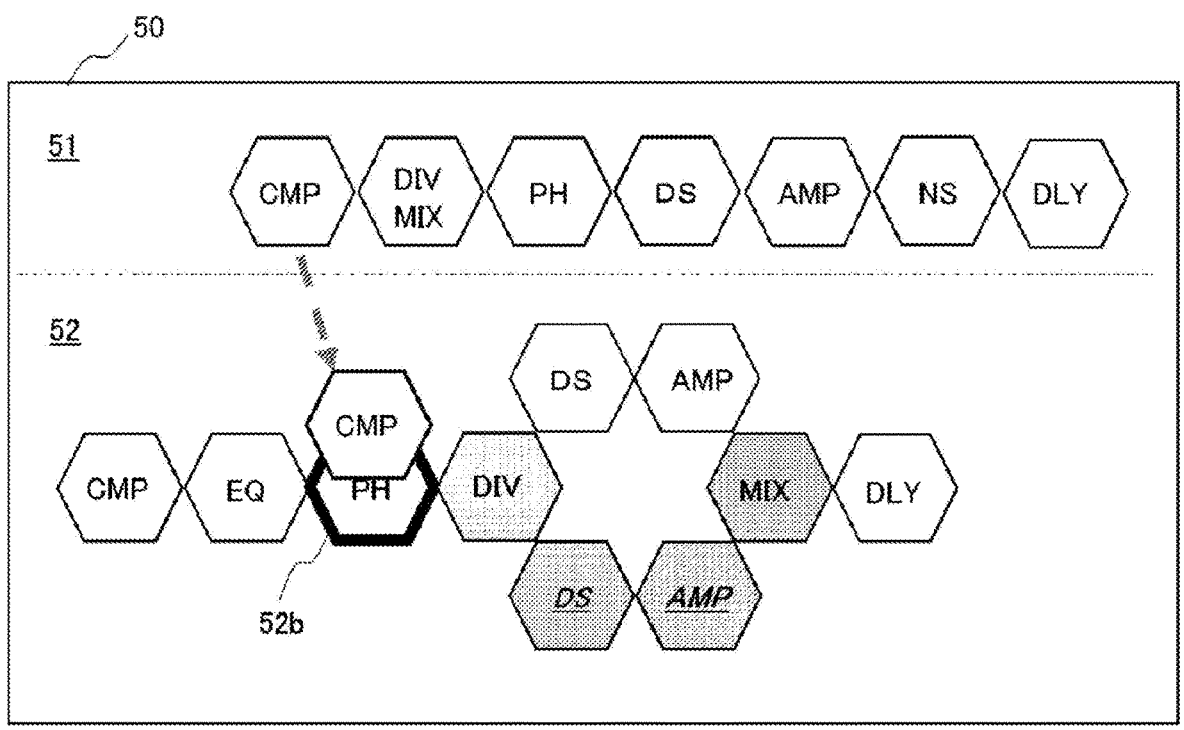

As illustrated in FIG. 4B, the user selects (touches) the block 60 in the palette region 51 to be brought into a drag state, and overwrites the block on a block that is an overwriting target in the editing region 52 (the block "PH" in the example illustrated in FIG. 4B). An outline of the block 60 that is an overwriting target is displayed as a thick line, and it is displayed that the block "PH" is selected as an overwriting target. When the block 60 is dropped, the dropped block 60 is displayed to be superimposed on the block "PH" that is an overwriting target, and the block "PH" becomes invisible. As described above, the user of the effector 10 can overwrite the block 60 forming the effect chain with another block 60 through a simple operation.

Figure 5A:
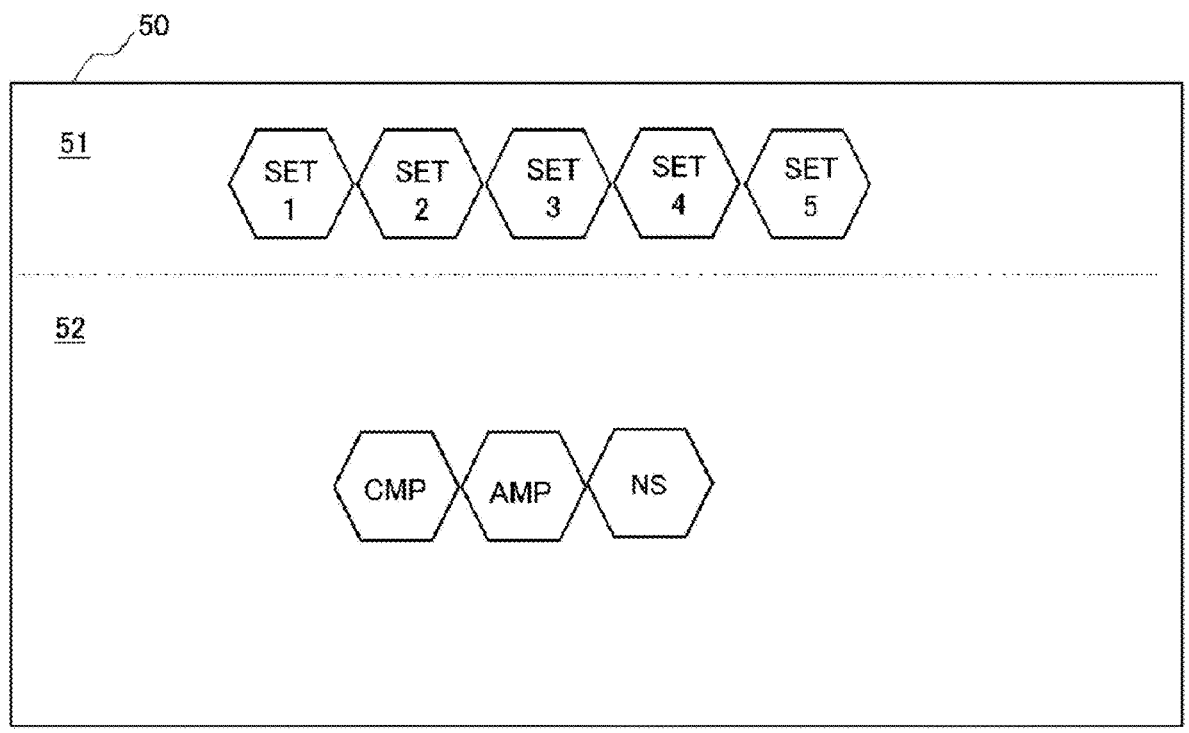
FIGS. 5A and 5B are diagrams illustrating a display example of a set block editing screen.
Figure 5B:
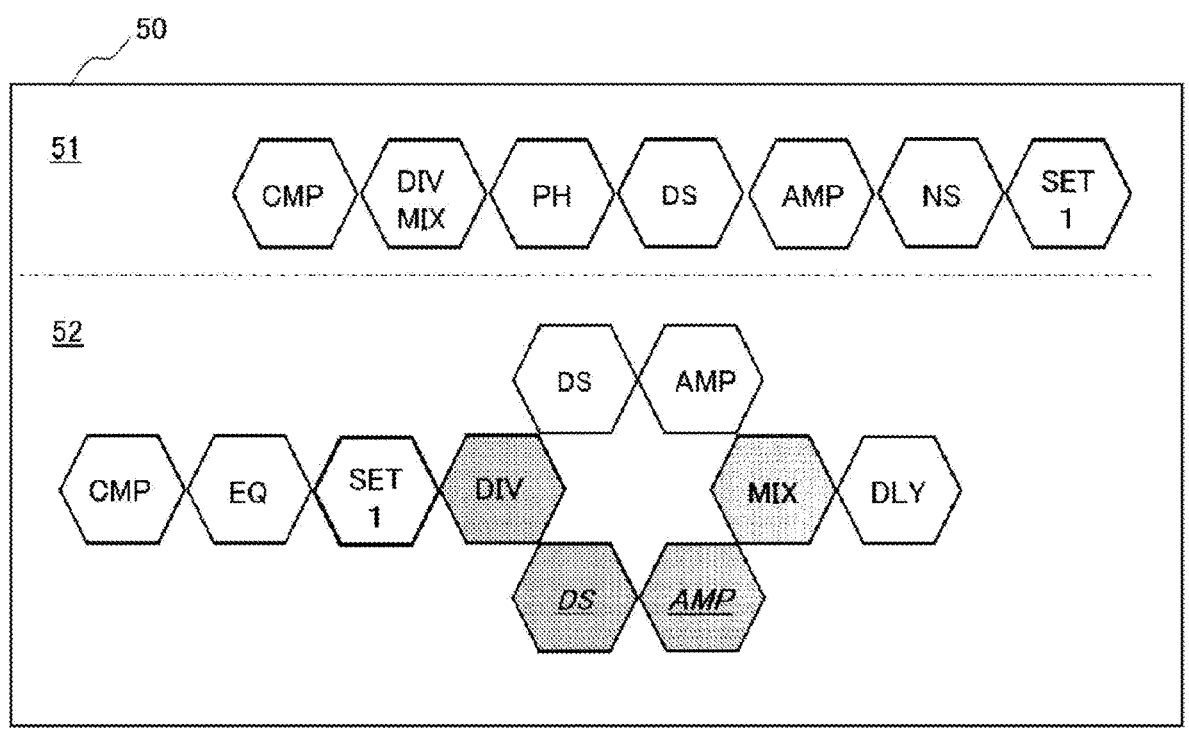

FIGS. 5A and 5B are diagrams illustrating a display example of a set block editing screen. FIG. 5A illustrates an example of a set block editing screen. A set block represents a short effect chain (referred to as a short chain) formed by a combination of two or more blocks 60 in one block. On the set block editing screen in FIG. 5A, a plurality of editable set blocks ("SET1", "SET2", and the like) are displayed in the palette region 51, and an editing target set block may be selected by touching any of the blocks. By selecting the block 60 forming a short chain from the palette region 51 and dropping the block 60 at an appropriate position in the editing region 52, a short chain to be set in an editing target set block can be formed.

The example in FIG. 5A illustrates a state in which a short chain in which the blocks 60 "CMP", "AMP", and "NS" are arranged in a line in the time axis direction is formed, and the set block "SET1" containing the short chain is created.

The set block "SET1" is used as one block equivalent to a normal block when editing an effect chain. In the example illustrated in FIG. 5B, the set block "SET1" is interposed between the block "EQ" and the block "DIV" in the editing region 52. A sound signal input to the set block "SET1" is processed according to the short chain forming the set block "SET1". An output of the last block in the short chain is input to the next block "DIV" connected to the set block "SET1". As described above, a short chain formed by combining any number of blocks 60 can be formed as a set block and handled as one of blocks forming an effect chain. Consequently, it becomes easier to edit an effect chain.

Process at the Time of Drop

Figure 6A:
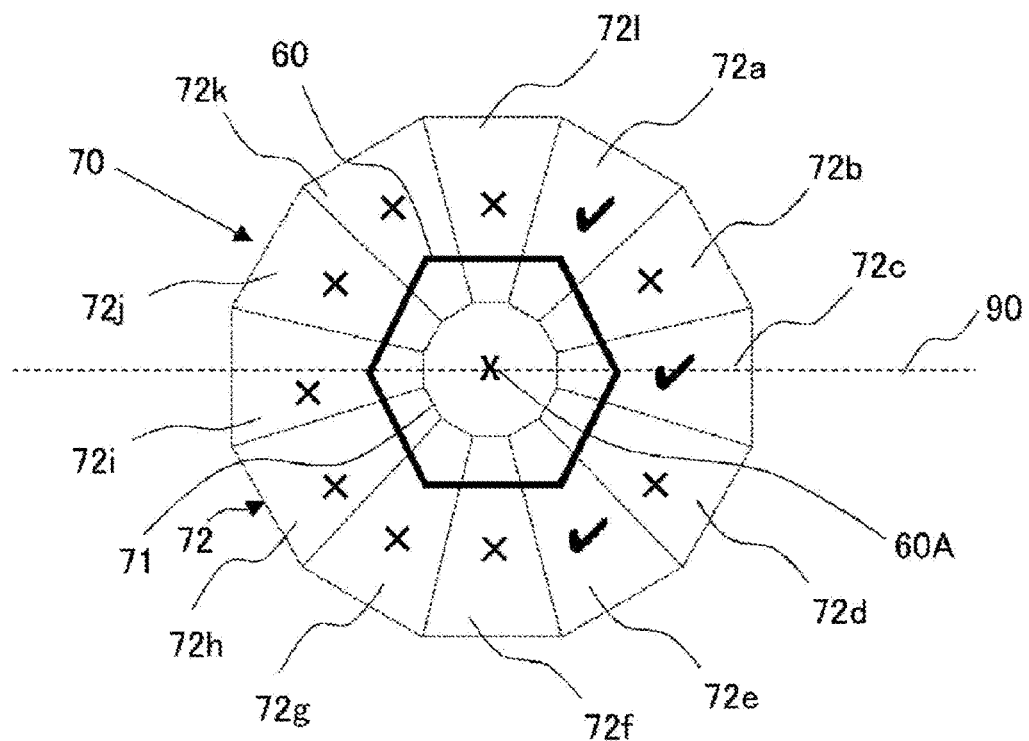
FIGS. 6A and 6B are explanatory diagrams of a connection destination determination region for a block dropped onto a disposed block.
Figure 6B:
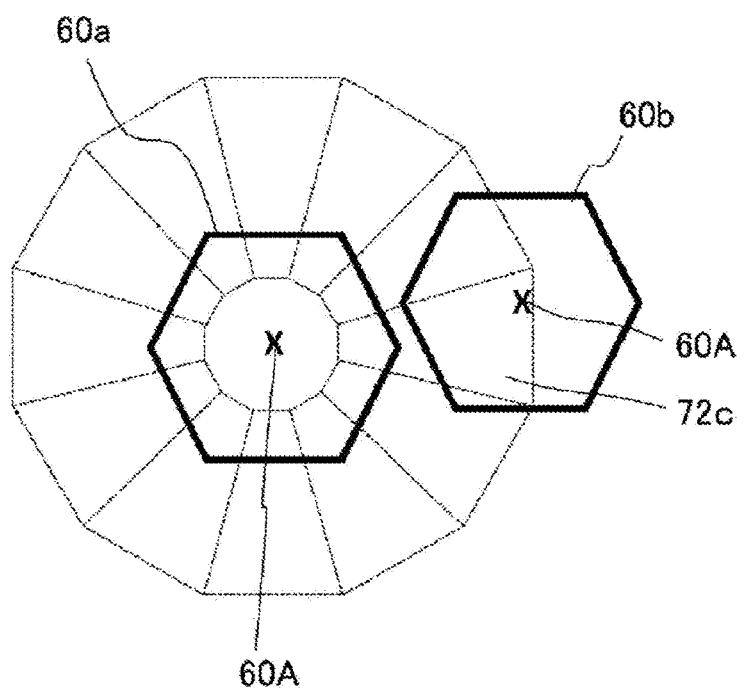

Next, details of a process in a case where the new block 60 is dropped onto the editing region 52 will be described. FIGS. 6A and 6B are explanatory diagrams of a connection destination determination region for a block dropped onto the disposed block.

FIG. 6A illustrates the block 60 disposed in the editing region 52. A determination region 70 is set in the disposed block 60. The determination region includes a regular dodecagonal first determination region 71 formed inside the block 60 and a regular dodecagonal second determination region 72 formed outside the block 60. Both the centers of the first determination region 71 and the second determination region 72 are set at the center 60A of the block 60. The second determination region 72 is divided into regions 72a to 72l by straight lines extending from the center 60A of the block 60 and passing through the respective vertices of the first determination region 71 and the second determination region 72. A connection state of the next block to the disposed block 60 is determined depending on whether the center of the dropped block 60 is located in the first determination region 71 or any of the regions 72a to 72l.

In a case where the next block is connected to the right side (future direction) of the block 60 illustrated in FIG. 6A, the regions 72a (upper right), 72c (right), and 72e (lower right) are regions in which it is determined that the next block 60 is connected to the disposed block 60. The regions 72b, 72d, and 72f to 72l are set as dead zones. In a case where the center of the next block 60 dropped is included in a dead zone, the next drop floats at that position (a disposition position is undefined).

For example, as illustrated in FIG. 6B, in a case where there is a block 60a disposed in the editing region 52 and a user desires to connect the next block 60b to the right side of the block 60a, the user drops the block 60b to the right side of the block 60a. In this case, when the center 60A of the block 60b is included in the region 72c of the block 60a, it is determined that the block 60b is connected to the block 60a, and a disposition position of the block 60b in the editing region 52 is automatically corrected.

Figure 7A:
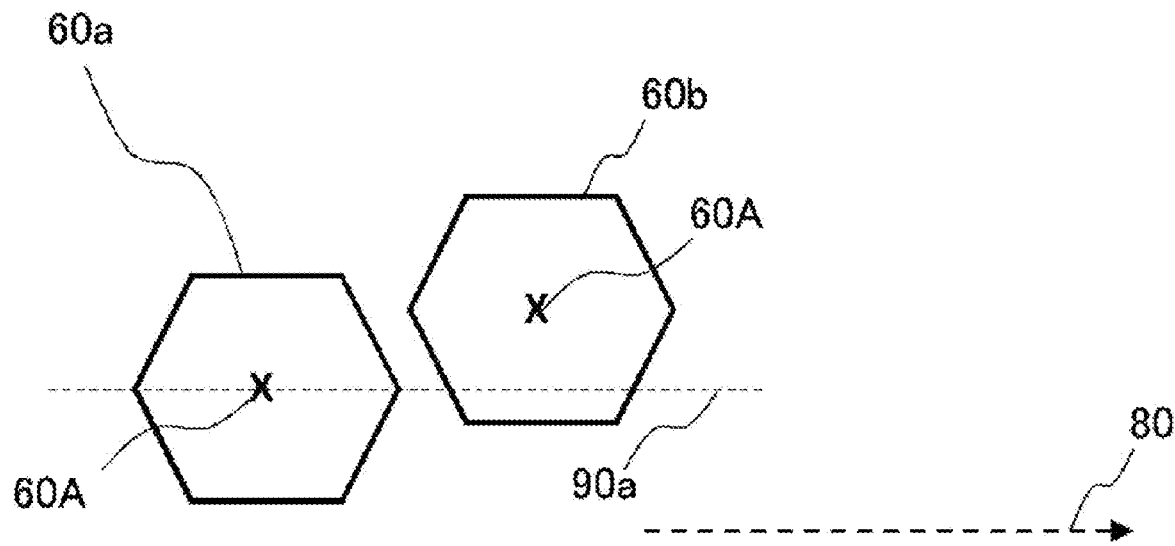
FIGS. 7A and 7B are explanatory diagrams of block disposition correction.
Figure 7B:
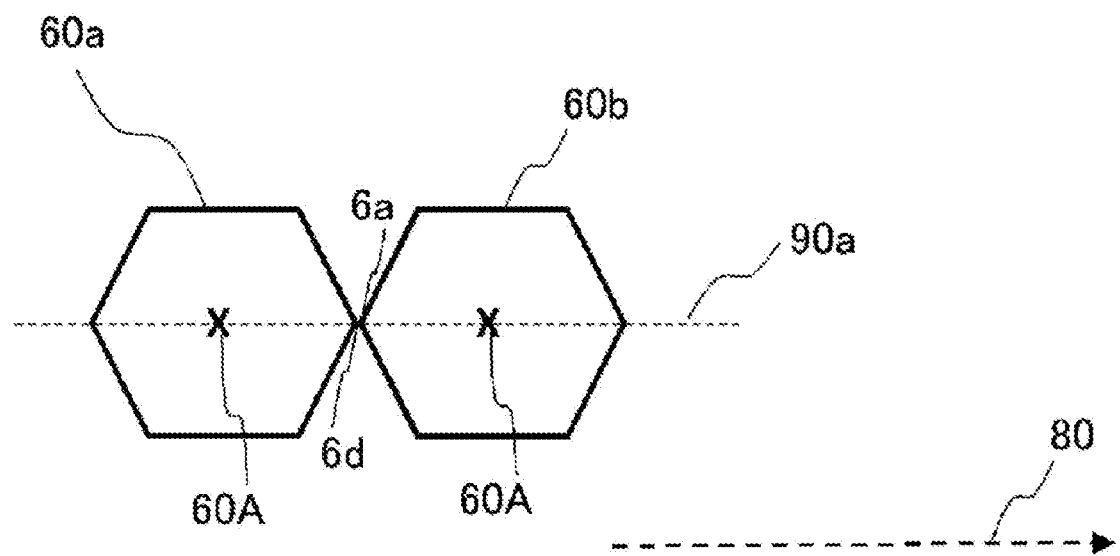

FIGS. 7A and 7B are explanatory diagrams of disposition correction for the block 60b. As illustrated in FIG. 7A, it is determined whether or not the center 60A of the block 60b at the time of dropping is on a virtual line 90a in the left-right direction passing through the center 60A of the block 60a. In a case where it is determined that the center 60A is not on the virtual line 90a, the position of the block 60b is automatically corrected such that the center of the block 60b is located on the virtual line 90a as illustrated in FIG. 7B. Consequently, a height of the block 60b in the editing region 52 is aligned with the block 60a, and thus the blocks are arranged in a row in the direction of the time axis 80. The position of the block 60b is automatically corrected such that the left vertex 6a of the block 60b comes into contact with the right vertex 6d of the block 60a.

Figure 8A:
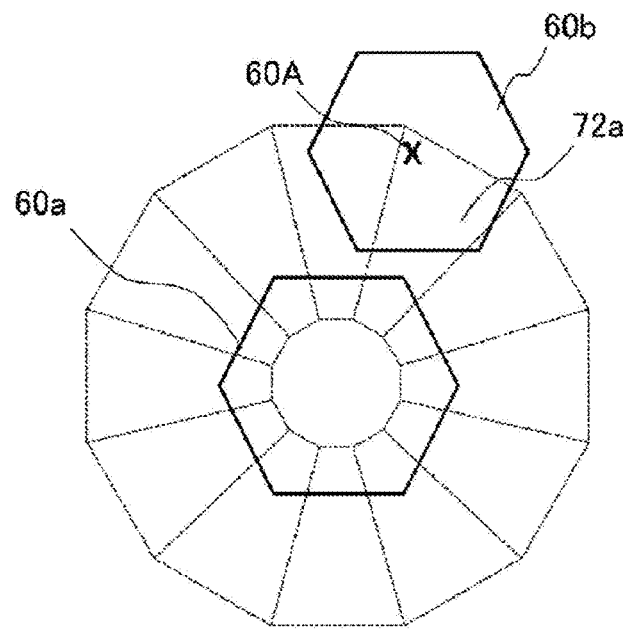
FIG. 8A is an explanatory diagram of a connection destination determination region for a block dropped onto a disposed block.
Figure 8B:
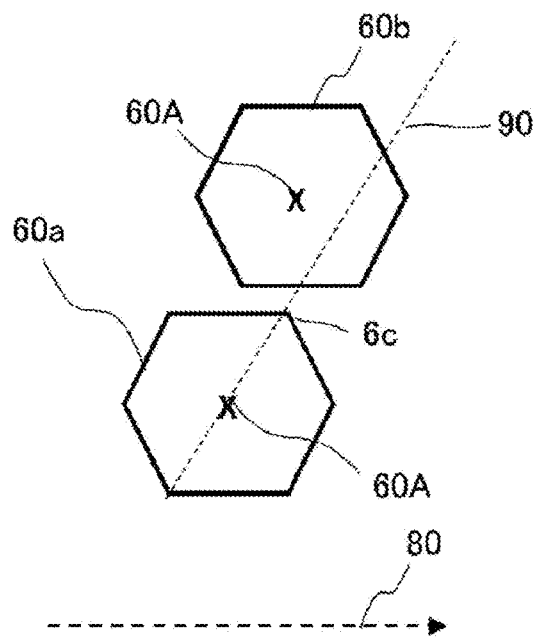
FIGS. 8B and 8C are explanatory diagrams of block disposition correction.
Figure 8C:
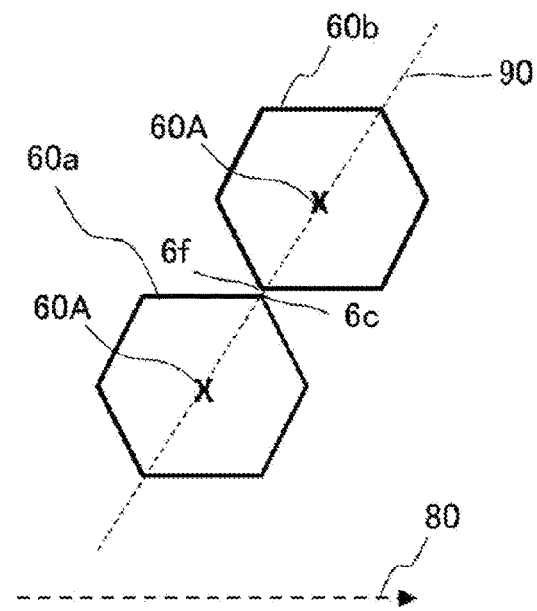

FIG. 8A is an explanatory diagram of a connection destination determination region for the block 60b dropped onto the disposed block 60a. FIGS. 8B and 8C are explanatory diagrams of disposition correction for the block 60b. A case is assumed in which there is a block 60a disposed in the editing region 52, the block 60a is used as a branch source block, and the user desires to connect the block 60b as a first branch block. In this case, the user drops the block 60b to the upper right of the block 60a.

In this case, as illustrated in FIG. 8A, it is determined whether or not the center 60A of the block 60b is included in the region 72a of the block 60a. In a case where it is determined that the center 60A is included in the region 72a, the block 60b is determined as being a first branch block for the block 60a, and a disposition position of the block 60b is automatically corrected.

As illustrated in FIG. 8B, it is determined whether or not the center 60A of the block 60b at the time of dropping is on a virtual line 90b passing through the center 60A of the block 60a and the vertex 6c. In a case where it is determined that the center 60A is not on the virtual line 90b, a position of the block 60b is automatically corrected such that the center of the block 60b is located on the virtual line 90b as illustrated in FIG. 8C. Consequently, the virtual line 90b passes through the center of the block 60b and the lower left vertex 6f. The position of the block 60b is automatically corrected such that the lower left vertex 6f of the block 60b comes into contact with the upper right vertex 6c of the block 60a.

Figure 9A:
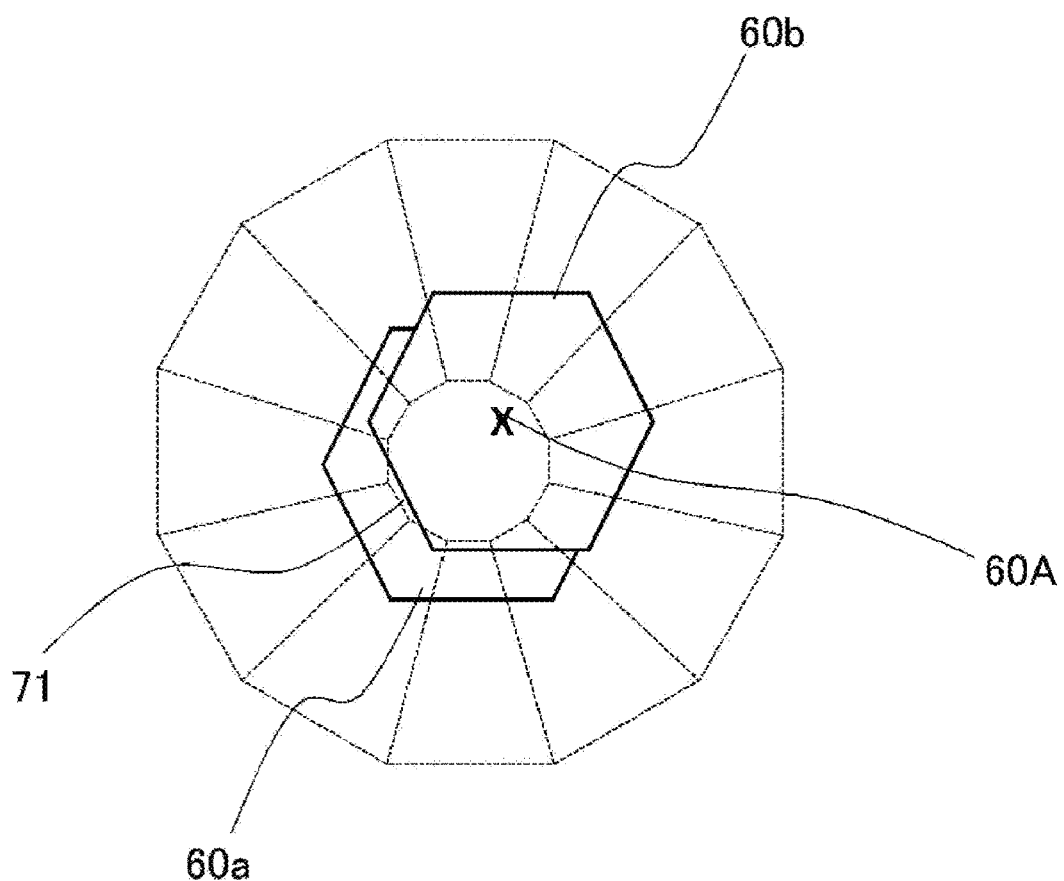
FIG. 9A is an explanatory diagram of a connection destination determination region for a block dropped onto a disposed block.
Figure 9B:
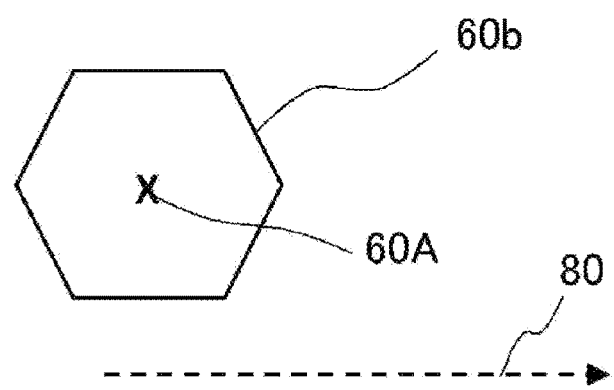
FIG. 9B is an explanatory diagram of block disposition correction.

FIG. 9A is an explanatory diagram of a connection destination determination region for the block 60b dropped onto the disposed block 60a. FIG. 9B is an explanatory diagram of disposition correction for the block 60b. A case is assumed in which there is a block 60a disposed in the editing region 52, and the user desires to overwrite the block 60a with the block 60b. In this case, the user superimposes the block 60b on the block 60a and drops the block 60b.

In this case, as illustrated in FIG. 9A, it is determined whether or not the center 60A of the block 60b is included in the first determination region 71 of the block 60a. In a case where it is determined that the center 60A is included in the first determination region 71, it is determined that the block 60a is overwritten with the block 60b, and a disposition position of the block 60b is automatically corrected.

In a case where it is determined that the center of the dropped block 60b is included in the first determination region 71, it is determined whether or not the center 60A of the block 60b at the time of dropping matches with the center 60A of the block 60a. In a case where it is determined that the centers 60A do not match, a position of the block 60b is automatically corrected such that the center of the block 60b is located at the center 60A of the block 60a, as illustrated in FIG. 9B. Consequently, the block 60b is superimposed on the block 60a, and the block 60a is hidden and invisible. As described above, the block 60a is overwritten with the block 60b.

FIGS. 10A to 10E are diagrams illustrating a procedure in a case where a new block is connected to a disposed block.

Figure 10A:
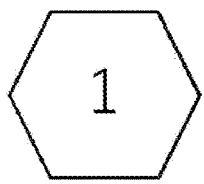
FIGS. 10A to 10E are diagrams illustrating a procedure in a case where a new block is connected to a disposed block.
Figure 10B:
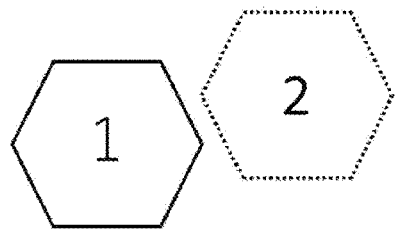

FIGS. 10A to 10E illustrate a procedure of connecting a block "2" that is the new block 60 to a block "1" that is the disposed block 60. In FIG. 10A, the block "1" is disposed in the editing region 52. In a case where the number of outputs of the block "1" is one, the user drops the block "2" to the right of block "1" (FIG. 10B).

Figure 10C:
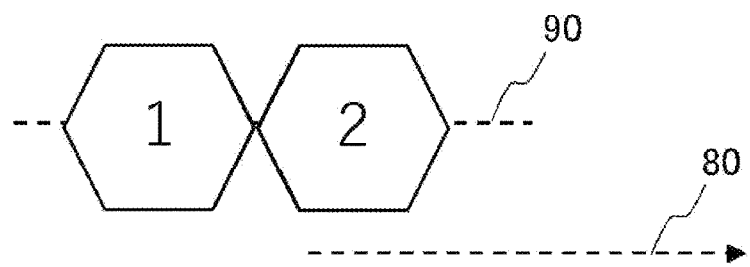

A determination related to a positional relationship between the block "1" and the block "2" described with reference to FIG. 6B is performed. In this case, when the center 60A of the block "2" is included in the region 72c of the block "1", the block "2" is automatically disposed on the right side of the block "1". Consequently, the virtual line 90 passing through the respective centers 60A of the block "1" and the block "2" is disposed in the direction of the time axis 80, and the right vertex of the block "1" and the left vertex of the block "2" come into contact with each other (FIG. 10C).

Figure 10D:
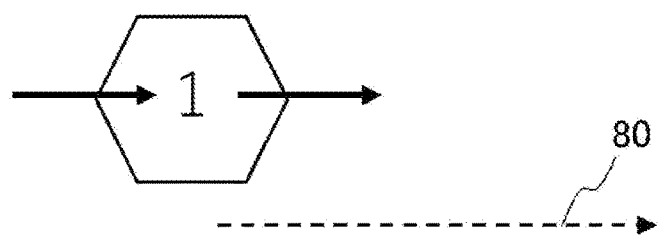
Figure 10E:
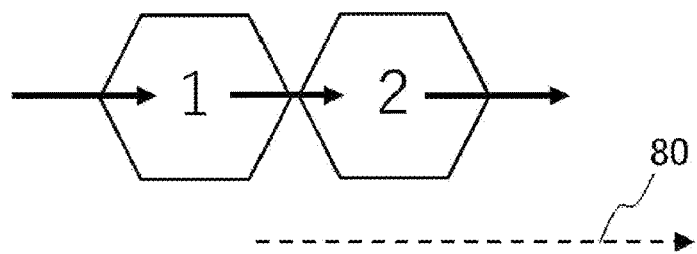

FIG. 10D illustrates an input and an output of the block "1". The left vertex (vertex 6a) of the block "1" indicates input of a sound signal, and the right vertex (vertex 6d) indicates output of the sound signal from the block "1". FIG. 10E illustrates inputs and outputs of blocks "1" and blocks "2". The block "1" is the same as that described with respect to FIG. 10D. For the block "2", the left vertex (vertex 6a) indicates the input, and the right vertex (vertex 6d) indicates the output of the sound signal from the block "2".

Figure 11A:
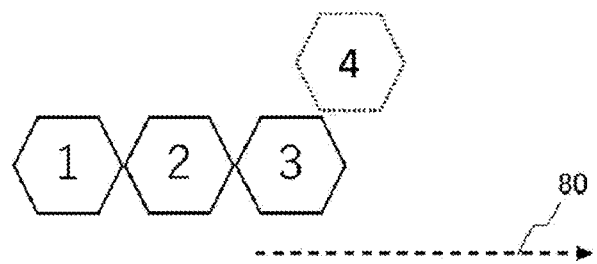
FIGS. 11A to 11E are diagrams illustrating a procedure in a case where a signal from a disposed block branches into two directions.
Figure 11B:
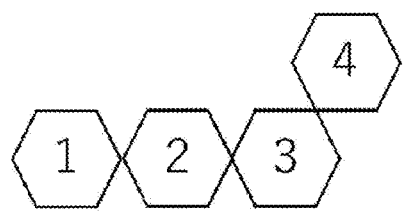

FIGS. 11A to 11E are diagrams illustrating a procedure (first branch procedure) in which a signal from a disposed block branches into two directions. As illustrated in FIG. 11A, a case is assumed in which blocks "1", "2", and "3", which are normal blocks, are disposed side by side in the direction of the time axis 80 in the editing region 52. A case is assumed in which a block "4", which is a normal block, is dropped as a first branch block to the upper right of the block "3".

In this case, it is determined whether or not the center 60A of the block "4" is included in the region 72a of the block "3" (refer to FIG. 8A). In a case where the center 60A is included in the region 72a, a position of the block "4" is automatically corrected such that the block "4" is located on the upper right of the block "3", and the upper right vertex (vertex 6c) of the block "3" and the lower left vertex (vertex 6f) of the block "4" come into contact with each other, and thus these vertices and the centers 60A of the blocks "3" and "4" are located on the same straight line (refer to FIGS. 11B and 8C).).

Figure 11C:
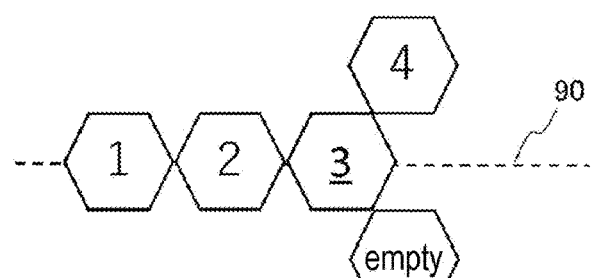

The block "3" is changed from handling of a normal block to handling of a branch source block. Consequently, a block "empty" as a second branch block is automatically disposed on the lower left of the block "3" in the editing region 52. The block "empty" is the block 60 in which process details are causing a sound signal to pass therethrough. The lower right vertex (vertex 6e) of the block "3", the upper left vertex (vertex 6b) of the block "empty", and each center 60A of the blocks "3" and "empty" are located on the same virtual straight line 90 (FIG. 11C). In FIG. 11C, the block "4" (center thereof) and the block "empty" (center thereof) are line-symmetrical with respect to the virtual straight line 90. In a case where a future direction of the virtual straight line 90 seen from the block "3" (branch source block) is defined as the front of the block "3", the block "4" (first branch block) is located on the front left of the block "3", and the block "empty" (second branch block) is located on the front right of the block "3".

Subsequently, a block "M" that is an aggregation block (block "MIX") in which the block "4" that is a first branch block is used as a first aggregation source block and the block "empty" that is a second branch block is used as a second aggregation source block is automatically disposed in the editing region 52. The center 60A of the block "M" is located on a virtual straight line passing through the blocks "1", "2", and "3". The lower right vertex (vertex 6e) of the block "4" and the upper left vertex (vertex 6b) of the block "M" come into contact with each other. The upper right vertex (vertex 6c) of the block "empty" and the lower left vertex (vertex 6f) of the block "M" come into contact with each other (FIG. 11D).

As described above, when the block used as the first branch block is disposed on the upper right of the series effect chain, the second branch block and the aggregation block are automatically disposed, and it is possible to easily create an effect chain in which a sound signal to which an effect is applied in the first branch block and a sound signal passes through the second branch block is mixed in the aggregation block.

Figure 11D:
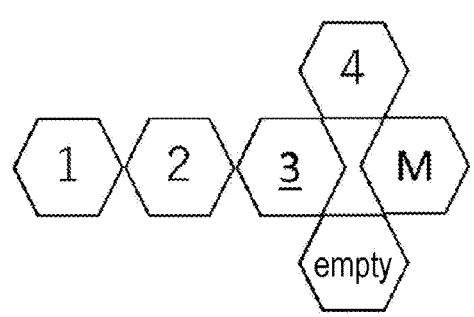
Figure 11E:
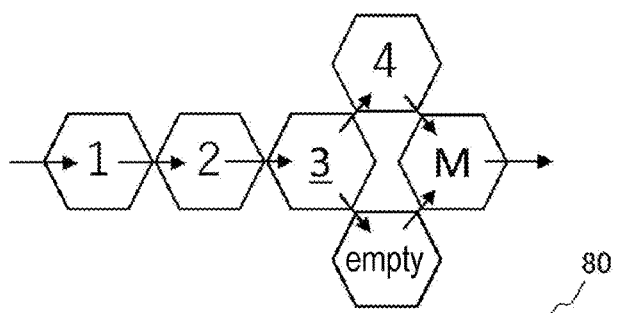

FIG. 11E illustrates a path of a sound signal in the effect chain illustrated in FIG. 11D. In FIG. 11E, the sound signal that has passed through the blocks "1" and the block "2" branches into the block "4" and the block "empty" at the block "3", and merges again at the block "M".

Figure 12A:
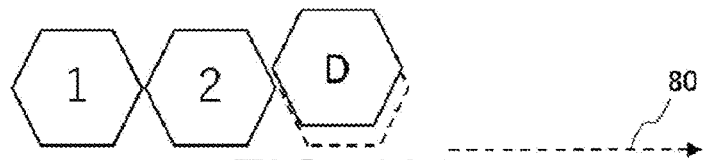
FIGS. 12A to 12E are diagrams illustrating a procedure in a case where a branch block is connected to a disposed block.

FIGS. 12A to 12E are diagrams illustrating a procedure (second branch procedure) in which a signal from a disposed block branches into two directions. As illustrated in FIG. 12A, a case is assumed in which the blocks "1" and "2", which are normal blocks, are disposed side by side in the direction of the time axis 80 in the editing region 52. A case is assumed in which a block "D" that is a dedicated branch source block (block "DIV") is dropped to the right side of the block "2". The block "D" is disposed at an underlined position in FIG. 12A through automatic disposition, and is brought into a state of being connected to the block "2".

Figure 12B:
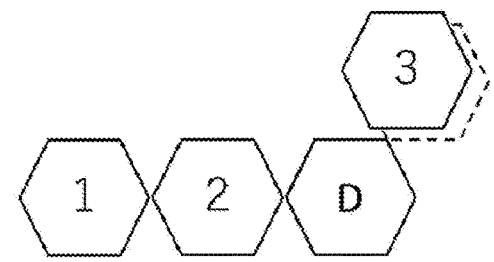

Thereafter, as illustrated in FIG. 12B, when the next block "3" is dropped to the upper right of the block "D", the block "3" is disposed at an underlined position in FIG. 12B through automatic disposition and becomes a first branch block connected the block "D".

Figure 12C:
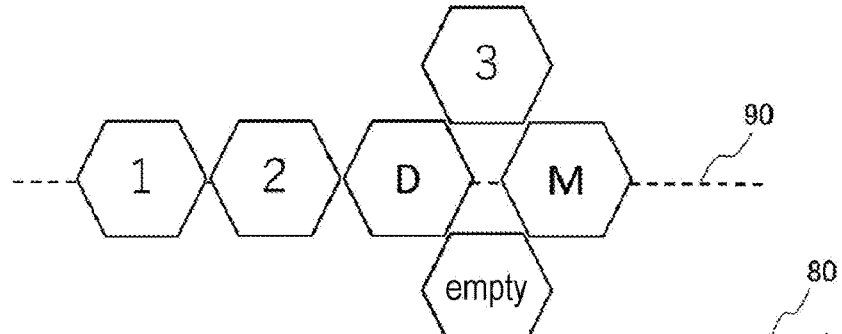
Figure 12D:
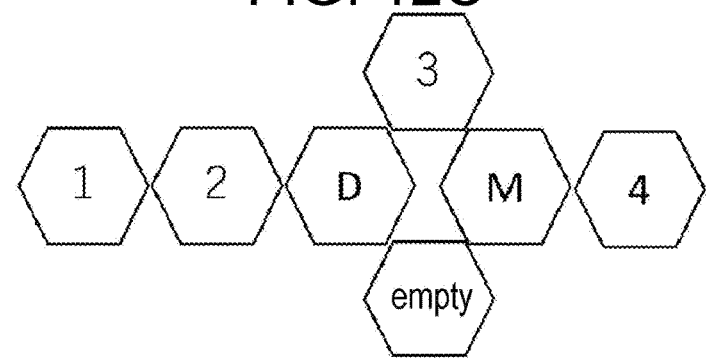
Figure 12E:
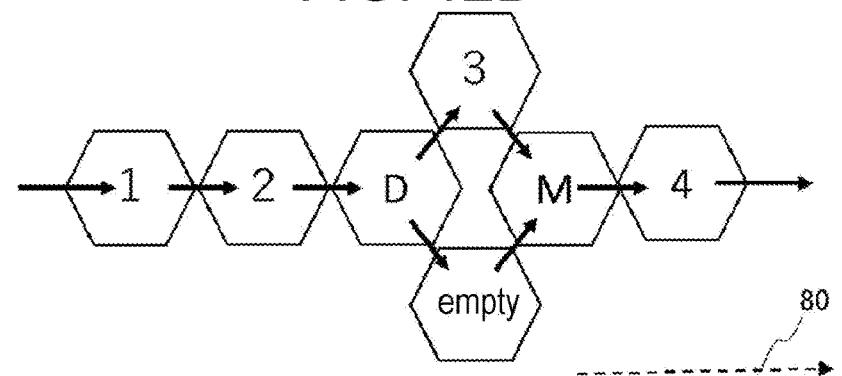

The block "empty" and the block "M" are automatically disposed as described with reference to FIGS. 11C and 11D, and thus a branch path and its merging state are formed (FIG. 12C). For example, the block "4" may be connected to the block "M" (FIG. 12D). As a path of the sound signal, as illustrated in FIG. 12E, the sound signal that has passed through the block "1" and the block "2" branches into the block "3" and the block "empty" at the block "D", and merges again at the block "M" and is output after passing through the block "4".

In the first branch procedure, a block that imparts an effect to the sound signal is used as the branch source block. In the second branch procedure, the branch-dedicated block "D" (block "DIV") is used as the branch source block. Also in the second branch procedure, the user can easily create a path in which the sound signal temporarily branches and then merges.

Figure 13A:
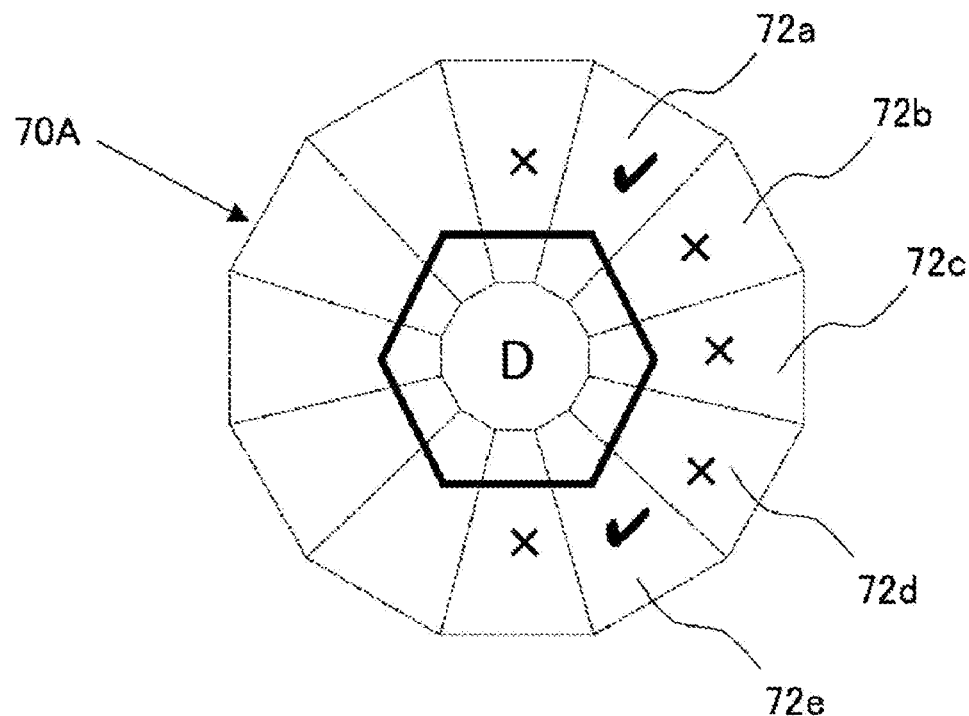
FIG. 13A is an explanatory diagram of a connection destination determination region for a block dropped onto a branch source block.

FIG. 13A is an explanatory diagram of a connection destination determination region for a block dropped onto a dedicated branch source block (block "DIV"). The region 72c is set as a dead zone in the determination region of the block "DIV" unlike the determination region of a normal block. Therefore, even if the next block is dropped to the right side of the block "DIV", automatic disposition does not occur. In a case where the center 60A of the next block 60 is dropped onto the region 72a or 72e, automatic disposition occurs.

Consequently, since automatic disposition does not occur even if the next block is dropped to the right side of the branch source block, the next block 60 can be reliably connected to a position of the first branch block or a position of the second branch block. Automatic disposition also occurs in a case where the next block 60 is dropped onto the region 72e. Thus, in a case where the second branch block is connected to the branch source block in an unconnected state of the first branch block, the block "empty" is automatically disposed at the position of the first branch block, and the block "MIX" is further automatically disposed.

Figure 13B:
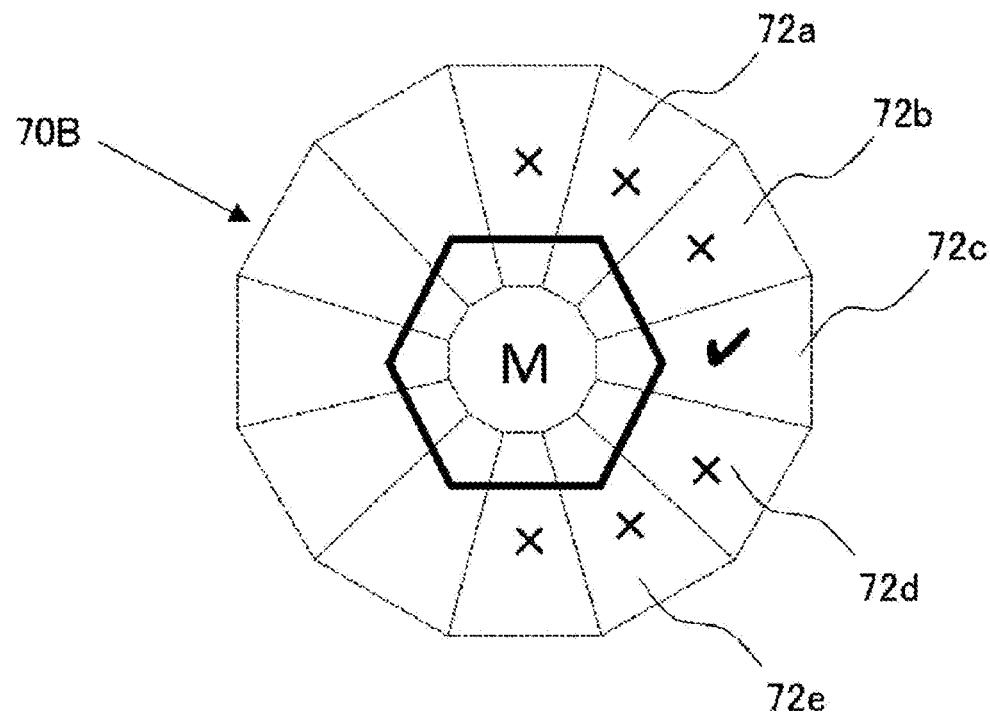
FIG. 13B is an explanatory diagram of a connection destination determination region for a block dropped onto an aggregation block.

FIG. 13B is an explanatory diagram of a connection destination determination region for a block dropped onto the aggregation block (block "MIX"). The regions 72a and 72d are set as dead zones in the determination region of the block "MIX" unlike the determination region of a normal block. Thus, even if the next block 60 is dropped to the upper right or the lower right of the block "MIX", the automatic disposition does not occur, and in a case where the next block 60 is disposed on the right side, the automatic disposition occurs. Consequently, the next block 60 can be reliably connected to the right side of the block "MIX".

Figure 14A:
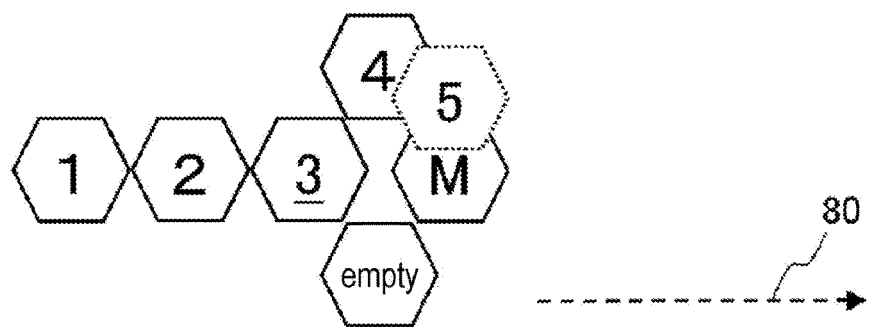
FIGS. 14A to 14D are explanatory diagrams of a method of disposing and connecting a block in a case where a new block that is an insertion target is dropped between disposed blocks.

FIGS. 14A to 14D are explanatory diagrams of a method of disposing and connecting a block in a case where a new block that is an insertion target is dropped between disposed blocks. In FIG. 14A, it is assumed that the effect chain illustrated in FIG. 11D is displayed in the editing region 52. In such a state, it is assumed that a block "5" that is an insertion target is dropped between the block "4" and the block "M".

Figure 14B:
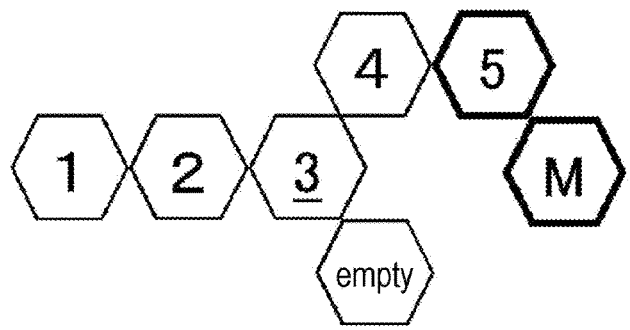

In a case where it is determined that a block "5" is to be inserted between the block "4" and the block "M" depending on a position where the block "5" is dropped, the result is as follows. That is, the block "5" is automatically disposed on the right side of the block "4", and the block "M" is automatically disposed on the lower right of the block "5" (FIG. 14B).

Figure 14C:
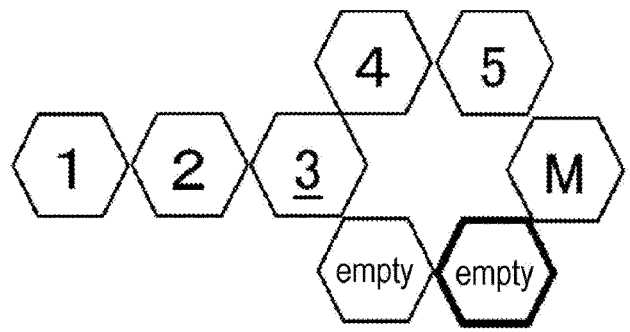

A new block "empty" (referred to as a complementary block) connecting the block "empty" connected to the block "3" to the block "M" is automatically disposed (FIG. 14C). The block "empty" that is a complementary block is disposed such that the left vertex comes into contact with the right vertex of the original block "empty". The block "empty" that is a complementary block is disposed such that the upper right vertex thereof comes into contact with the lower left vertex of the block "MIX".

Figure 14D:
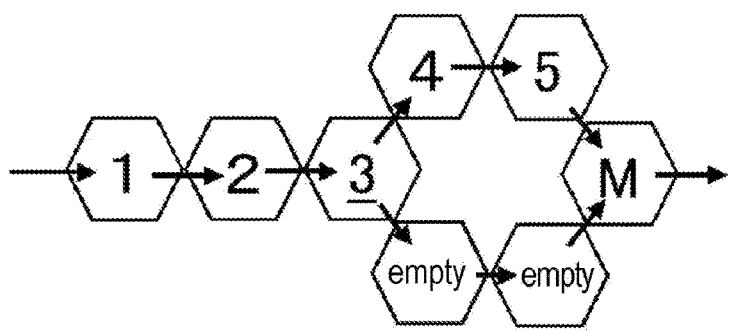

FIG. 14D illustrates a path of the sound signal. The sound signal that has passed through the block "1" and the block "2" branches into the block "4" and the block "empty" at the block "3". The sound signal input to the block "4" merge at the block "M" after passing through the block "5". The sound signal input to the block "empty" merges at the block "M" after passing through the block "empty" that is a complementary block.

As described above, the block 60 can be inserted between the first aggregation source block and the aggregation block. Consequently, it is possible to insert a normal block into a branch path and impart two or more effects on the branch path. At the time of inserting a block, a complementary block (block "empty") paired with the inserted block 60 (block "5") is automatically disposed. Consequently, a user can easily add an effect on a branch path.

In the state in FIG. 14A, in a case where the block "5" is inserted between a second aggregation source block (block "empty") and an aggregation block (block "M"), the same process is performed. That is, the block "5" is inserted between the block "empty" and the block "M". The block "4" and the block "M" are connected by a new block "empty" that is a complementary block corresponding to the block "5".

Figure 15:
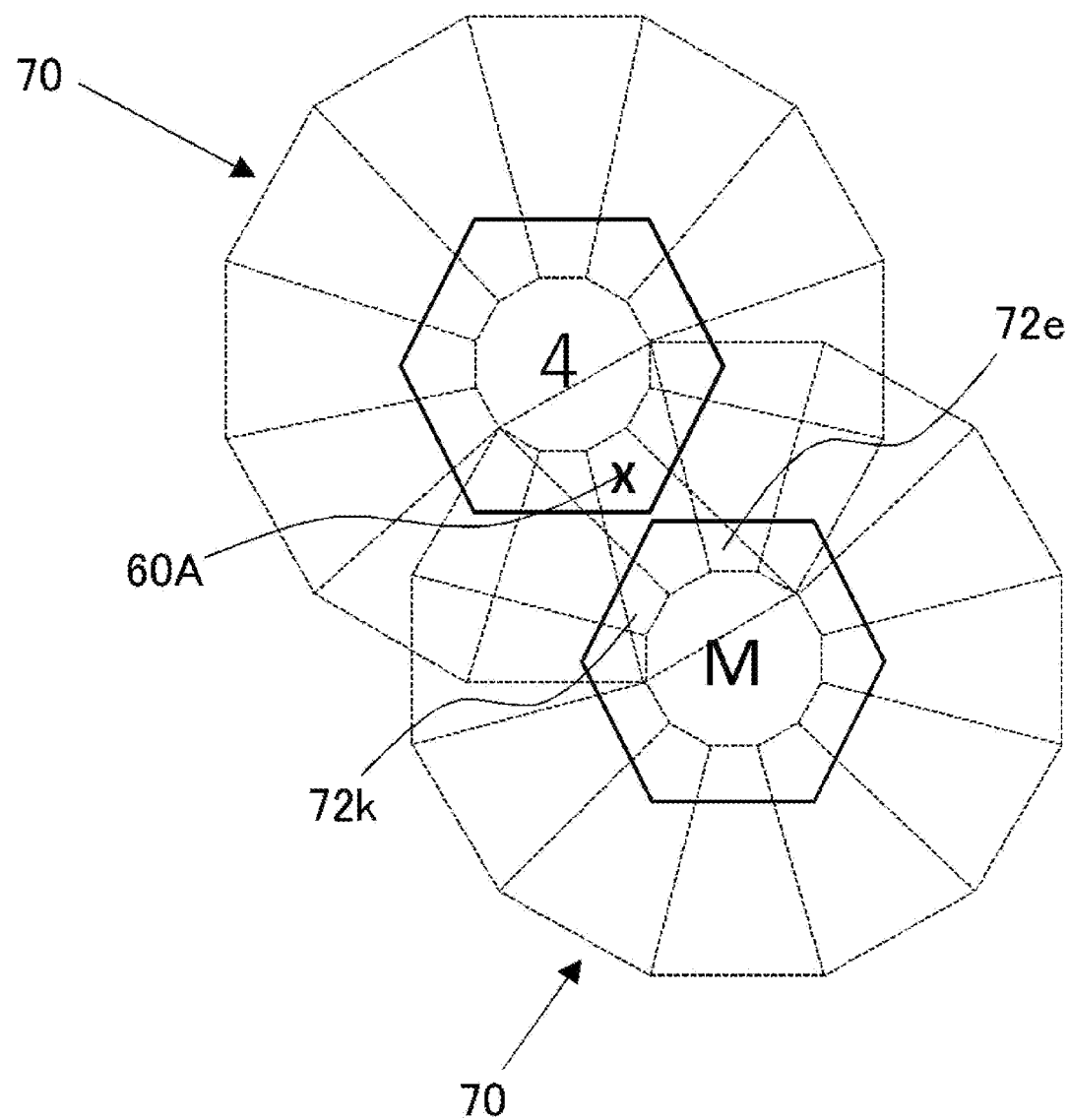
FIG. 15 is an explanatory diagram of an insertion determination for a dropped block.

FIG. 15 is an explanatory diagram of insertion determination for the dropped block 60. FIG. 15 illustrates the block "4" and the block "M" illustrated in FIG. 14A. Each of the block "4" and the block "M" has the above determination region 70. The vertex 6e of the block "4" comes into contact with the vertex 6b of the block "M", and the region 72e of the block "4" corresponding to the vertex 6e and the region 72k of the block "M" corresponding to the vertex 6b have an overlapping range. In a case where the center of the dropped block 60 is included in this overlapping range, it is determined that the block 60 is inserted between the block "4" and the block "M". FIG. 15 illustrates the center 60A of the block "5" included in the overlapping range. As described above, when a user can intuitively drop the block 60 between the two blocks 60 between which the block 60 is desired to be inserted, the block 60 is inserted between them.

Figure 16A:
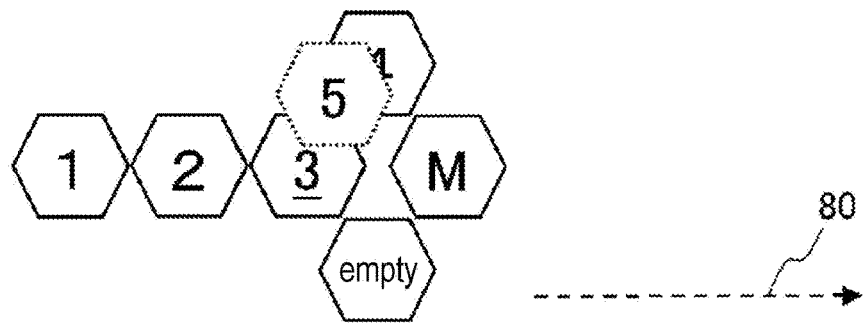
FIGS. 16A to 16D are explanatory diagrams of a method of disposing and connecting a block in a case where a new block that is an insertion target is dropped between disposed blocks.

FIGS. 16A to 16D are explanatory diagrams of a method of disposing and connecting a block in a case where a new block that is an insertion target is dropped between disposed blocks. In FIG. 16A, it is assumed that the effect chain illustrated in FIG. 11D is displayed in the editing region 52. In such a state, it is assumed that the block "5" that is an insertion target is dropped between the blocks "3" and the block "4".

Figure 16B:
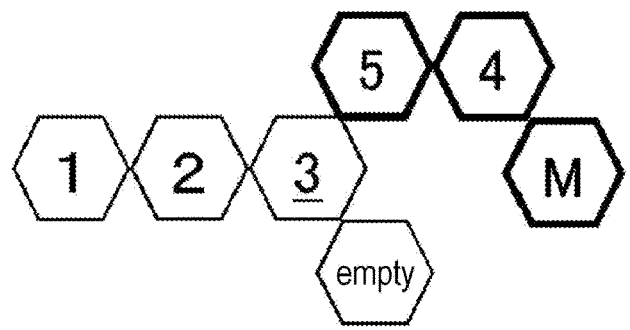

In a case where it is determined that the block "5" is inserted between the block "3" and the block "4" depending on a position where the block "5" is dropped, the result is as follows. That is, the block "5" is automatically disposed at the position where the block "4" was located, and the block "4" is disposed on the right side of the block "5". The block "M" is disposed on the lower right of the block "4" (FIG. 16B).

Figure 16C:
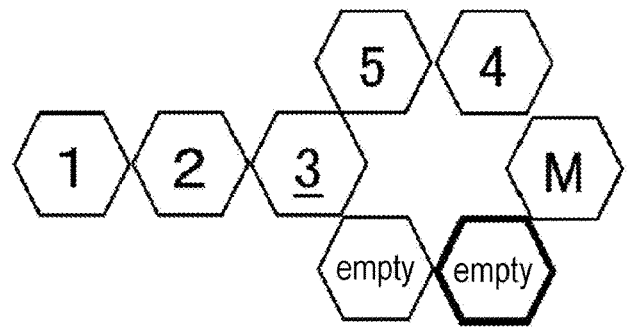

As a complementary block corresponding to the block "4", a block "empty" connecting the block "empty" connected to the block "3" to the block "M" is automatically disposed (FIG. 16C). The block "empty" that is a complementary block is disposed such that the left vertex thereof comes into contact with the right vertex of the original block "empty". The block "empty" that is a complementary block is disposed such that the upper right vertex thereof comes into contact with the lower left vertex of the block "MIX".

Figure 16D:
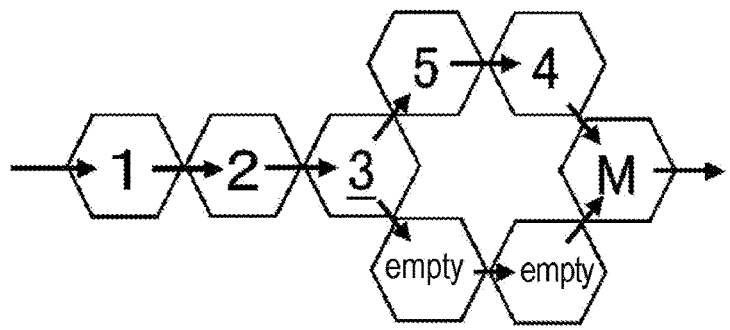

FIG. 16D illustrates a path of the sound signal. The sound signal that has passed through the block "1" and the block "2" branches into the block "5" and the block "empty" at the block "3". The sound signals input to the block "5" merge at the block "M" after passing through the block "4". The sound signal input to the block "empty" merges at the block "M" after passing through the block "empty" as a complementary block.

As described above, it is possible to insert a normal block between the branch source block and the first branch block and insert a normal block into the branch path to impart two or more effects on the branch path. Consequently, a user can easily add an effect on a branch path. In a case where the block "5" is inserted between the branch source block (block "3") and the second branch block (block "empty"), the same process is performed, and the block "4" and the block "M" are connected by the block "empty" that is a complementary block.

In the state illustrated in FIG. 16A, in a case where the block "5" is inserted between the second aggregation source block (block "empty") and the aggregation block (block "M"), the same process is performed. That is, the block "5" is inserted between the block "3" and the block "empty".

The block "4" and the block "M1" are connected by a new block "empty" that is a complementary block corresponding to the block "5".

Figure 17A:
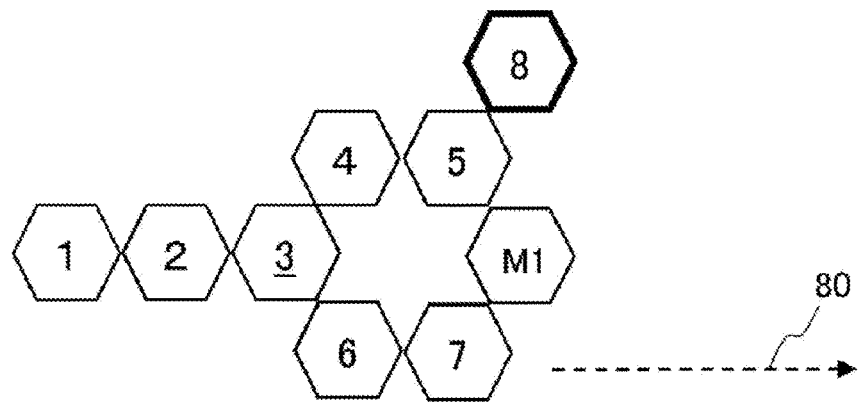
FIGS. 17A to 17D are explanatory diagrams of a method of disposing and connecting a block in a case where a new block is connected to a block forming a branch path.

FIGS. 17A to 17D, and FIGS. 18A and 18B are explanatory diagrams of a method of disposing and connecting a block in a case where a new block is connected to a block forming a branch path. It is assumed that an effect chain in a state illustrated in FIG. 17A is displayed in the editing region 52 by blocks "1" to "7" and a block "M1" that is an aggregation block (block "MIX"). It is assumed that a new block "8" is connected to the upper right of the block "5" on the branch path by a user.

Figure 17B:
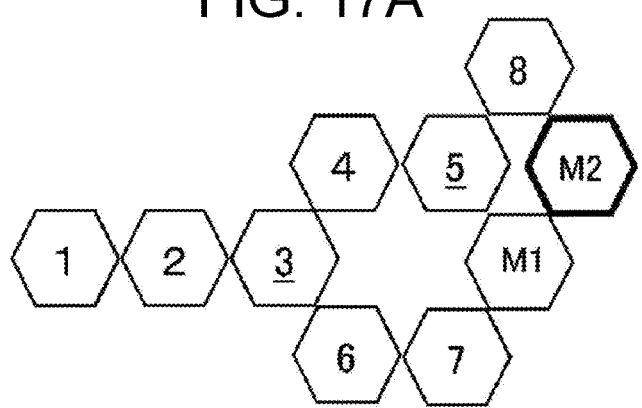
Figure 17C:
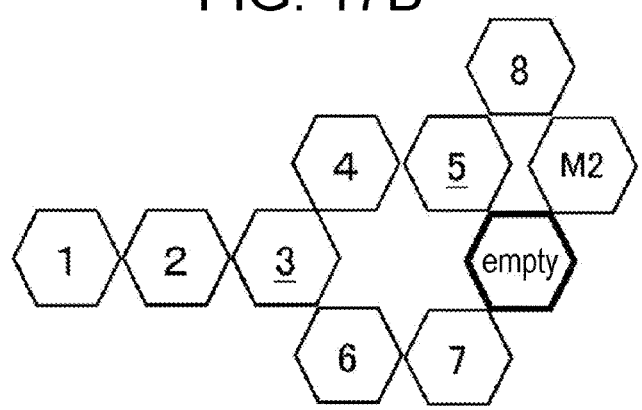
Figure 17D:
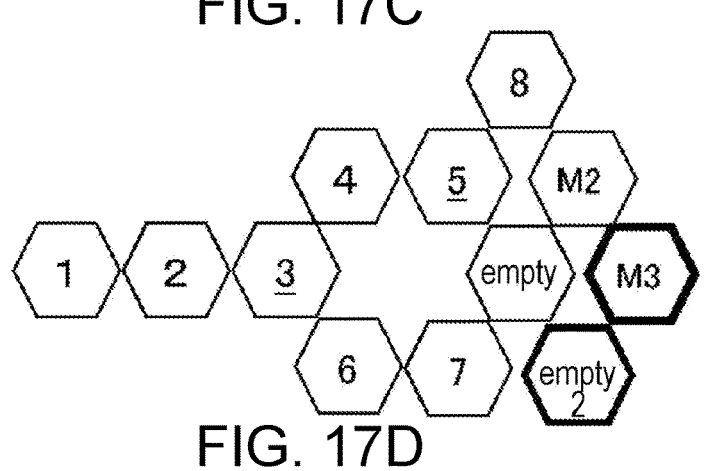

A block "M2" that is a new aggregation block that aggregates the output of the block "8" and the output of the block "M1" is automatically disposed (FIG. 17B). Next, the existing block "M1" is changed to a block "empty" corresponding to the block "8" (FIG. 17C). With this change, there is no aggregation block that aggregates the output of block "7". Thus, the block "M3" that is an aggregation block aggregating the output of the block "M2" and the output of the block "7" and a block "empty 2" that is a through-block connecting the block "7" to the block "M3" is automatically disposed.

Figure 18A:
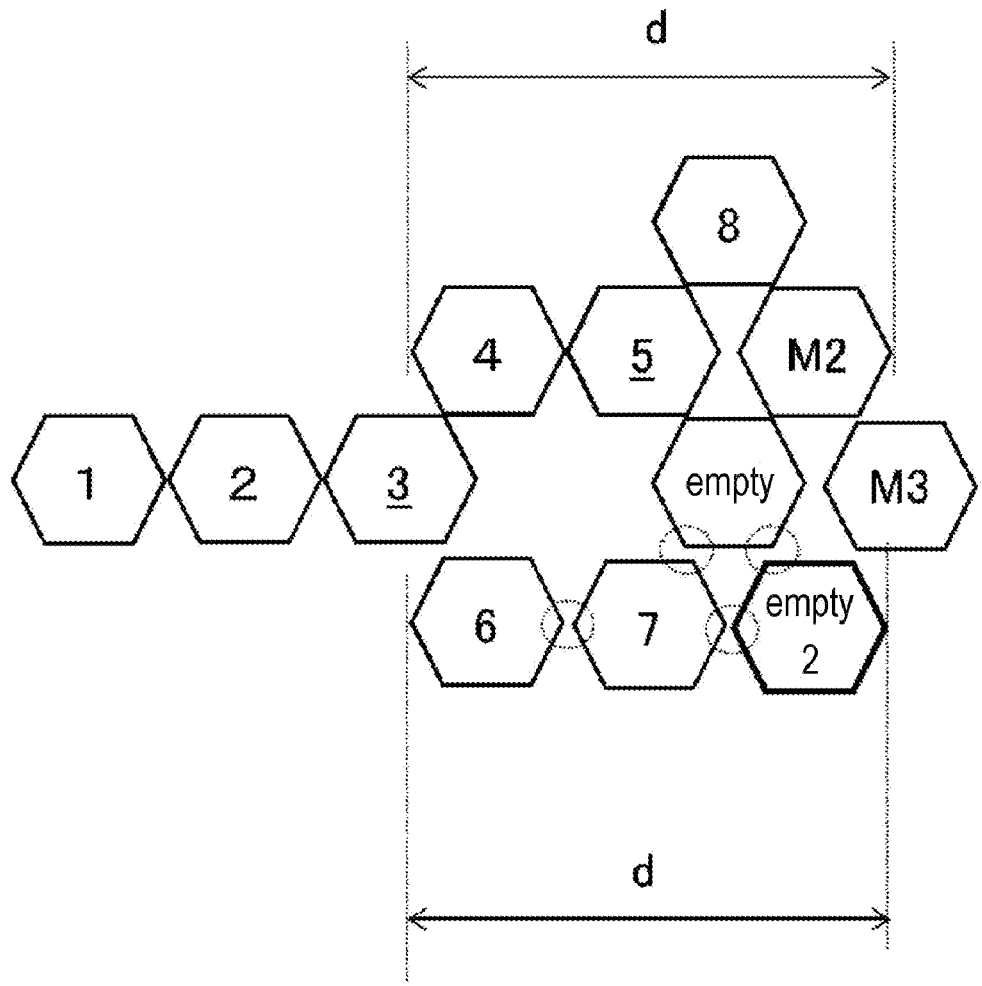
FIGS. 18A and 18B are diagrams illustrating an example of automatic adjustment of a block disposition position.

However, in a state in which the block "empty" and the block "7" are still in contact with each other, it is difficult to understand whether the output of the block "7" is input to the block "empty" or the block "empty 2". Thus, as illustrated in FIG. 18A, the blocks "6", "7", and "empty 2" are lowered such that the blocks "empty" and the block "7" are separated from each other. A length d of the blocks "4", "5", and "M2" in the left-right direction is longer than a size of three blocks 60 in the left-right direction. Thus, a predetermined gap is provided between the blocks "6" and "7" and between the blocks "7" and "empty 2". That is, the gap between the blocks is adjusted such that a distance from the left vertex of the block "6" to the right vertex of the block "empty 2" is d.

Figure 18B:
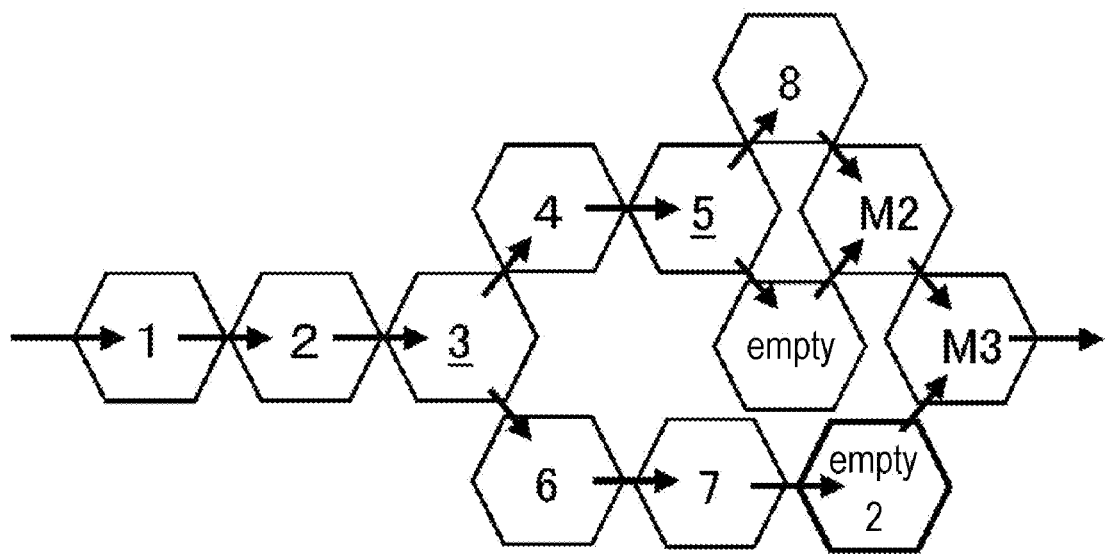

FIG. 18B illustrates a path of the sound signal in the effect chain illustrated in FIG. 18A. The signal input to the block "1" is input to the block "3" via the block "2". From the block "3", the path of the sound signal branches into the block "4" and the block "6". The path of the sound signal from the block "4" to the block "5" branches into the block "8" and the block "empty" at the block "5", and merges at the block "M2". On the other hand, the path of the sound signal input to the block "6" follows the blocks "7" and "empty 2", and merges with the block "M2" at the block "M3".

Figure 19A:
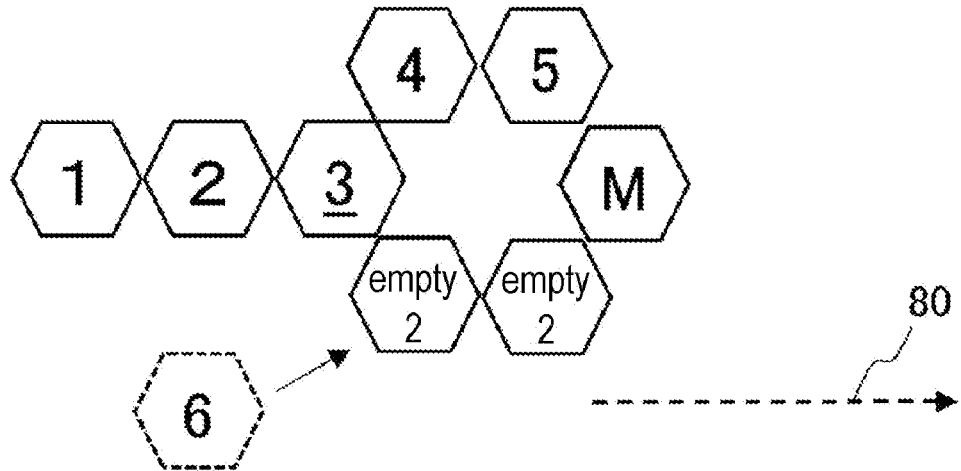
FIGS. 19A to 19C are diagrams illustrating an example of a case where a disposed block is overwritten.
Figure 19B:
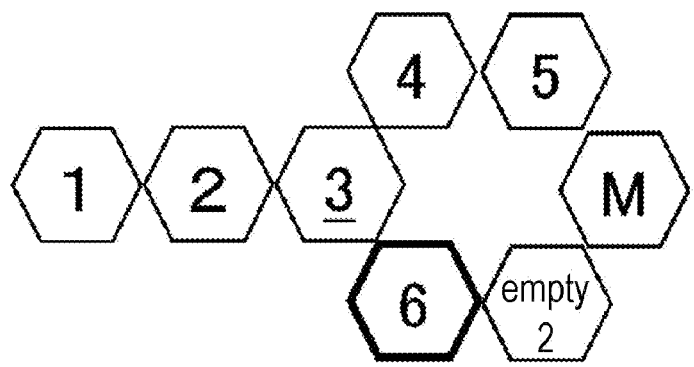
Figure 19C:
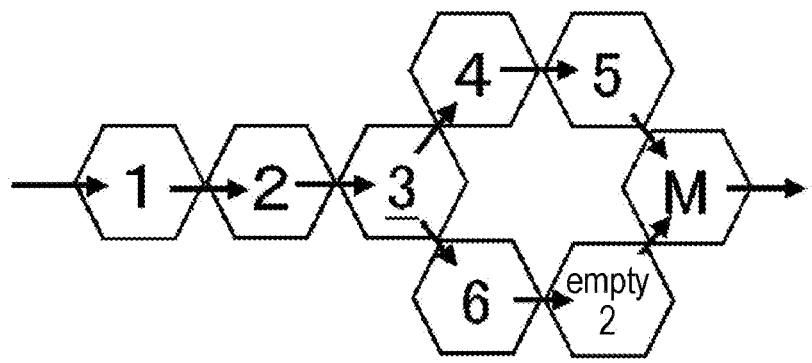

FIGS. 19A to 19C are diagrams illustrating an example of a case where a disposed block is overwritten. It is assumed that in the editing region 52, an effect chain formed of blocks "1" to "5", "M", "empty 1", and "empty 2" as illustrated in FIG. 19A is displayed. In a case where a user desires to impart an effect at the position of the block "empty 1", the block "6" that imparts the desired effect is dropped to be superimposed on the block "empty 1".

The overwriting determination illustrated in FIG. 9 is performed, and the block "empty 1" is overwritten with the block "6" (FIG. 19B). As described above, the block overwriting work can be easily performed. In the example in FIG. 19, the through-block of the branch path can be easily replaced with the effect-imparting block.

FIG. 19C illustrates a path of the sound signal. The signal input to the block "1" is input to the block "3" via the block "2". From the block "3", the path of the sound signal branches into the block "4" and the block "5". The path of the sound signal from the block "4" to the block "5" is aggregated (merges) at the block "M". The path from the block "6" to the block "empty 2" merges with the path of the block "5" at the block "M".

Process Example in Effector

Figure 20A:
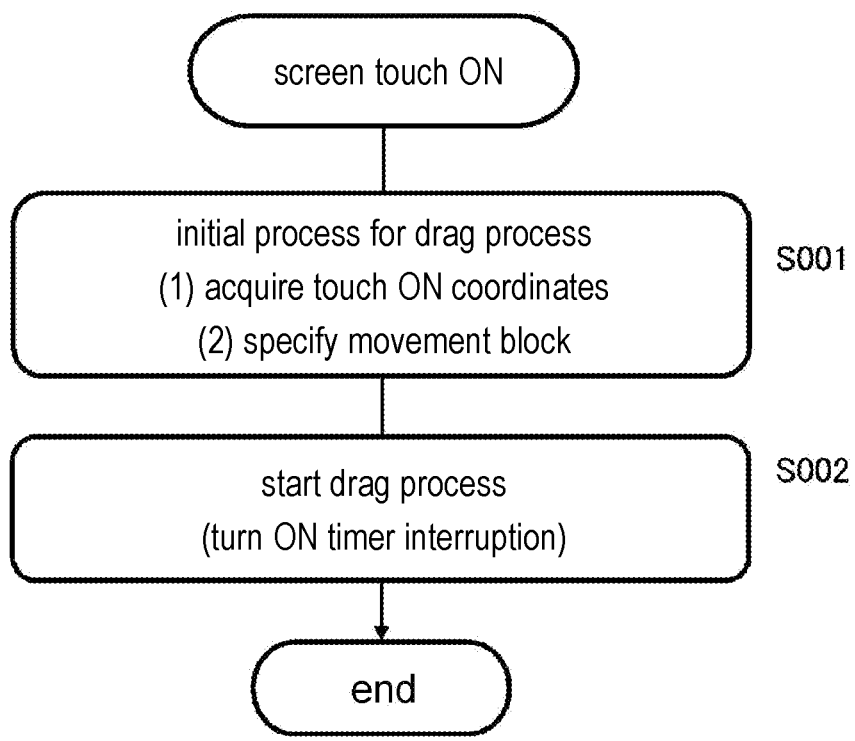
FIG. 20A is a flowchart illustrating a process example when screen touch is ON, and FIG. 20B is a flowchart illustrating a process example of specifying a movement block.

FIG. 20A is a flowchart illustrating a process example when screen touch is ON. The process illustrated in FIG. 20A is started when the touch panel 16 detects touch on the editing screen 50. In step S001, the touch management part 111 (CPU 11) performs an initial process for a drag process for the block 60. As the initial process, the touch management part 111 acquires coordinates of the touch position (touch ON coordinates) on the basis of an output from the touch panel 16. The touch management part 111 specifies a movement block.

Figure 20B:
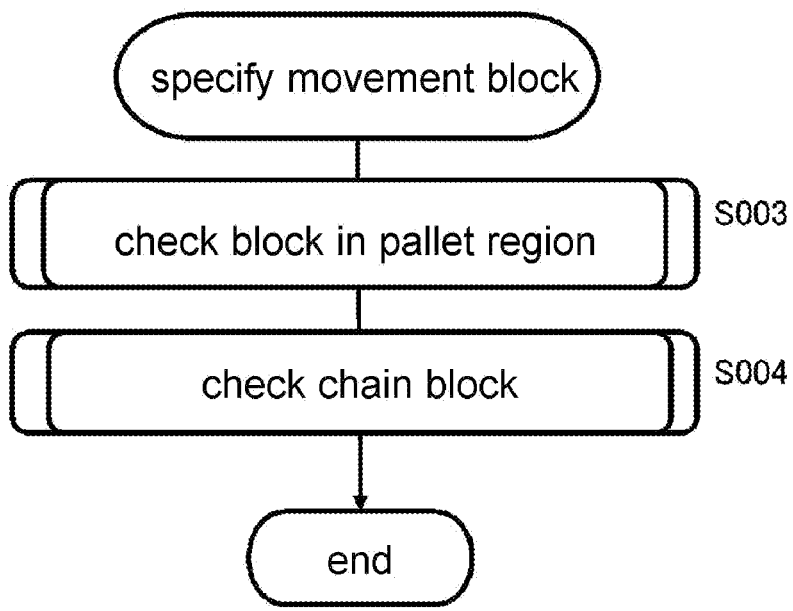

FIG. 20B is a flowchart illustrating a process example of specifying a movement block. In step S003, the touch management part 111 performs a process of checking the blocks 60 displayed in the pallet region 51.

Figure 21:
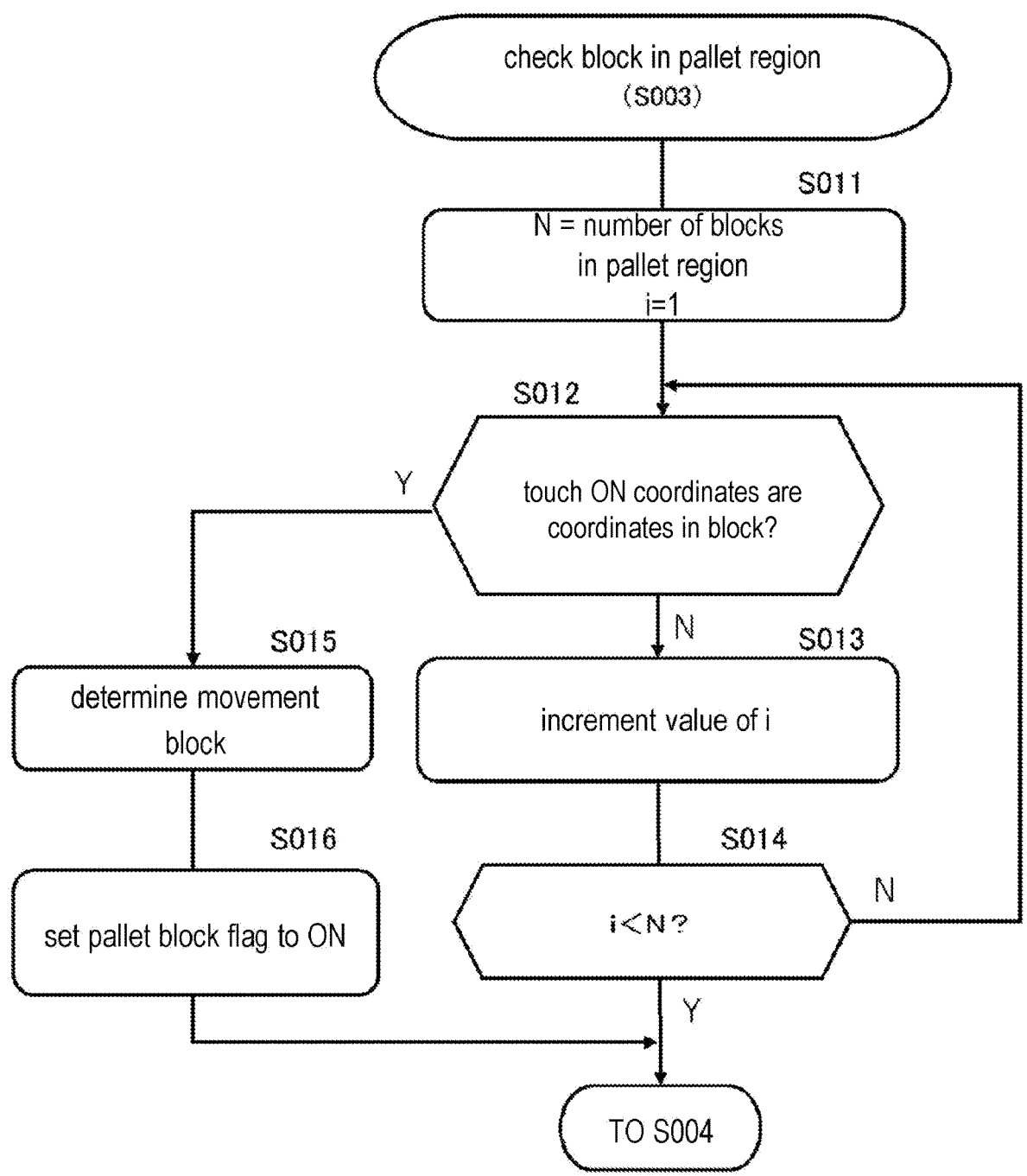
FIG. 21 is a flowchart illustrating a process example of checking a block in a pallet region.

FIG. 21 is a diagram illustrating details of the process in step S003. In step S011, the touch management part 111 checks the number of blocks N in the pallet region 51. The number of blocks in the pallet region 51 is stored in the storage device 12. The touch management part 111 sets a value of a variable i for specifying a target to 1.

In step S012, the touch management part 111 specifies one of the blocks 60 in the pallet region 51 corresponding to the current value of i as a target, and determines whether or not the touch ON coordinates are included in the determination region of the block 60. Information indicating a correspondence relationship between the value of the variable i and the target block 60 is stored in the storage device 12. In a case where it is determined that the touch ON coordinates are included in the determination region, the process proceeds to step S015, and in other cases, the process proceeds to step S013.

In a case where the process proceeds to step S015, the touch management part 111 determines the block 60 specified as the target in the pallet region 51 as a movement block. In step S016, the touch management part 111 sets a palette block flag to ON. Thereafter, the process proceeds to step S004. The pallet block flag indicates that the block 60 is the block 60 in the pallet region 51 when the flag is ON.

In step S013, the touch management part 111 increments the value of the variable i (adds 1 to the current value of i) and the process proceeds to in step S014.

In step S014, the touch management part 111 determines whether or not the value of the variable i exceeds the number N of blocks. When the value of i exceeds the value of N, this means that there is no next target block 60. In a case where it is determined that the value of i exceeds the value of N, the process proceeds to step S004 in FIG. 20, and in other cases, the process returns to step S012.

Figure 22:
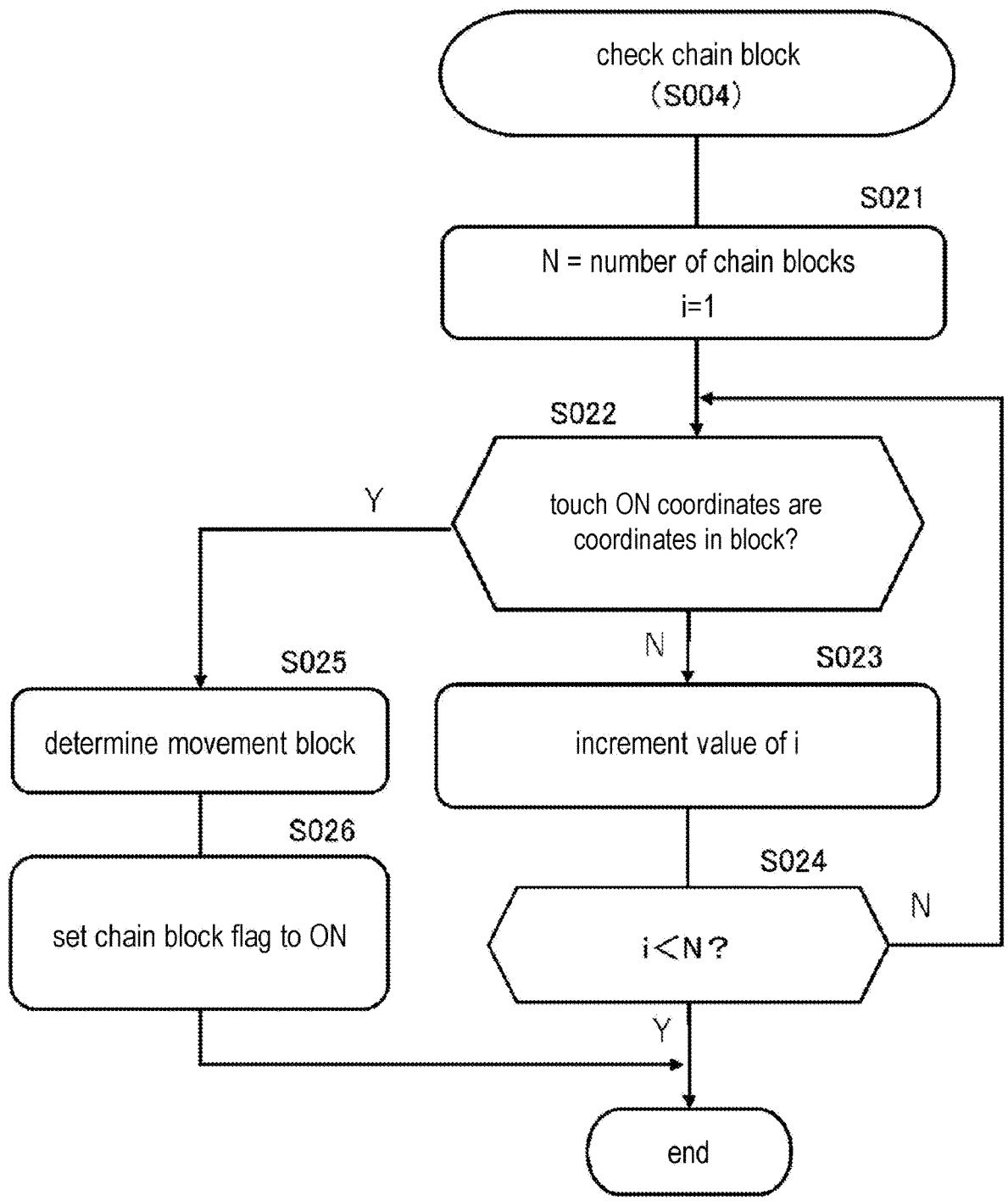
FIG. 22 is a flowchart illustrating a process example of checking a chain block.

In step S004, the touch management part 111 checks the blocks 60 disposed in the editing region 52, that is, the blocks forming the effect chain. FIG. 22 is a flowchart illustrating details of step S004.

In step S021, the touch management part 111 sets the number of blocks 60 forming the effect chain in the editing region 52 as a variable N. The number of blocks 60 forming the effect chain is managed by the effect chain management part 112 and stored in the storage device 12. The touch management part 111 sets a value of the variable i indicating a target to 1.

In step S022, the touch management part 111 specifies, as a target, one of the blocks 60 disposed in the editing region 52 corresponding to the current value of the variable i, and determines whether or not the touch ON coordinates are included in the determination region of the block 60. Information indicating a correspondence relationship between the value of the variable i and the target block 60 is managed by the effect chain management part 112 and stored in the storage device 12. In step S022, in a case where it is determined that the touch ON coordinates are included in the determination region, the process proceeds to step S025, and in other cases, the process proceeds to step S023.

In a case where the process proceeds to step S025, the touch management part 111 determines the block 60 specified as the target, forming the effect chain in the editing region 52, as a movement block. In step S026, the touch management part 111 sets a chain block flag to ON. Thereafter, the movement block specifying process is finished, and the process proceeds to step S002. The chain block flag indicates that the block 60 is a disposed block in the editing region 52 when the flag is ON.

In step S023, the touch management part 111 increments the value of the variable i, and the process proceeds to step S024.

In step S024, the touch management part 111 determines whether or not the value of the variable i exceeds the number N of blocks. In a case where it is determined that the value of i exceeds the value of N, then the movement block specifying process is finished, and the process proceeds to step S002 in FIG. 20. In a case where the value of i is equal to or smaller than the value of N, the process returns to step S022.

In step S002, the touch management part 111 starts the drag process. Consequently, the drag process for the block 60 specified in step S003 or step S004 is performed, and the block 60 touched by the user is brought into a drag state.

Figure 23:
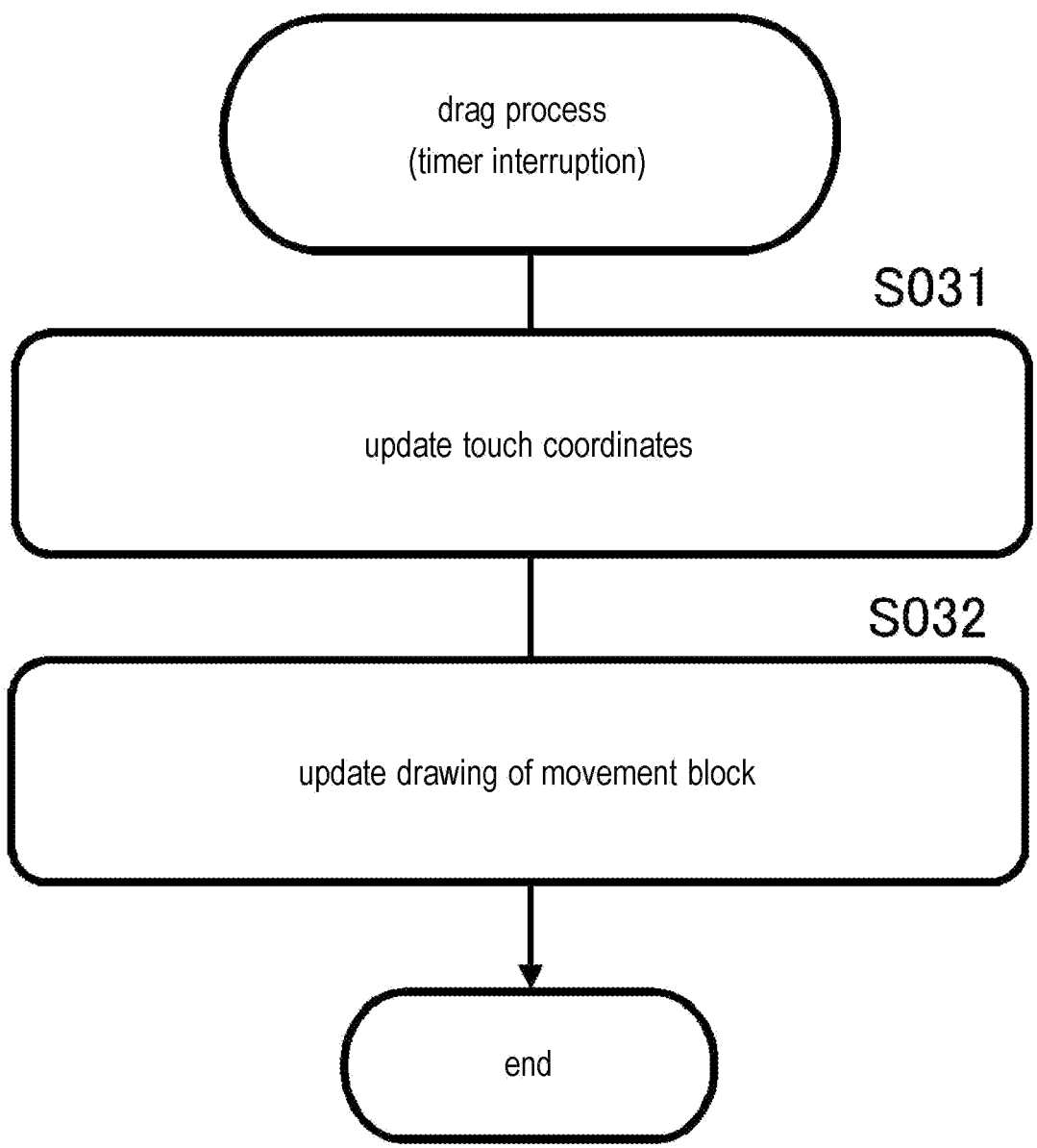
FIG. 23 is a flowchart illustrating an example of a drag process.

FIG. 23 is a flowchart illustrating an example of the drag process. In step S031, the touch management part 111 updates the touch coordinates, that is, the coordinates of the movement block that is the dragged block 60 according to the movement of the block 60. In step S032, the display control part 117 displays a state in which the movement block is moved on the screen 50 due to the movement of the movement block, that is, the update of the touch coordinates.

Figure 24:
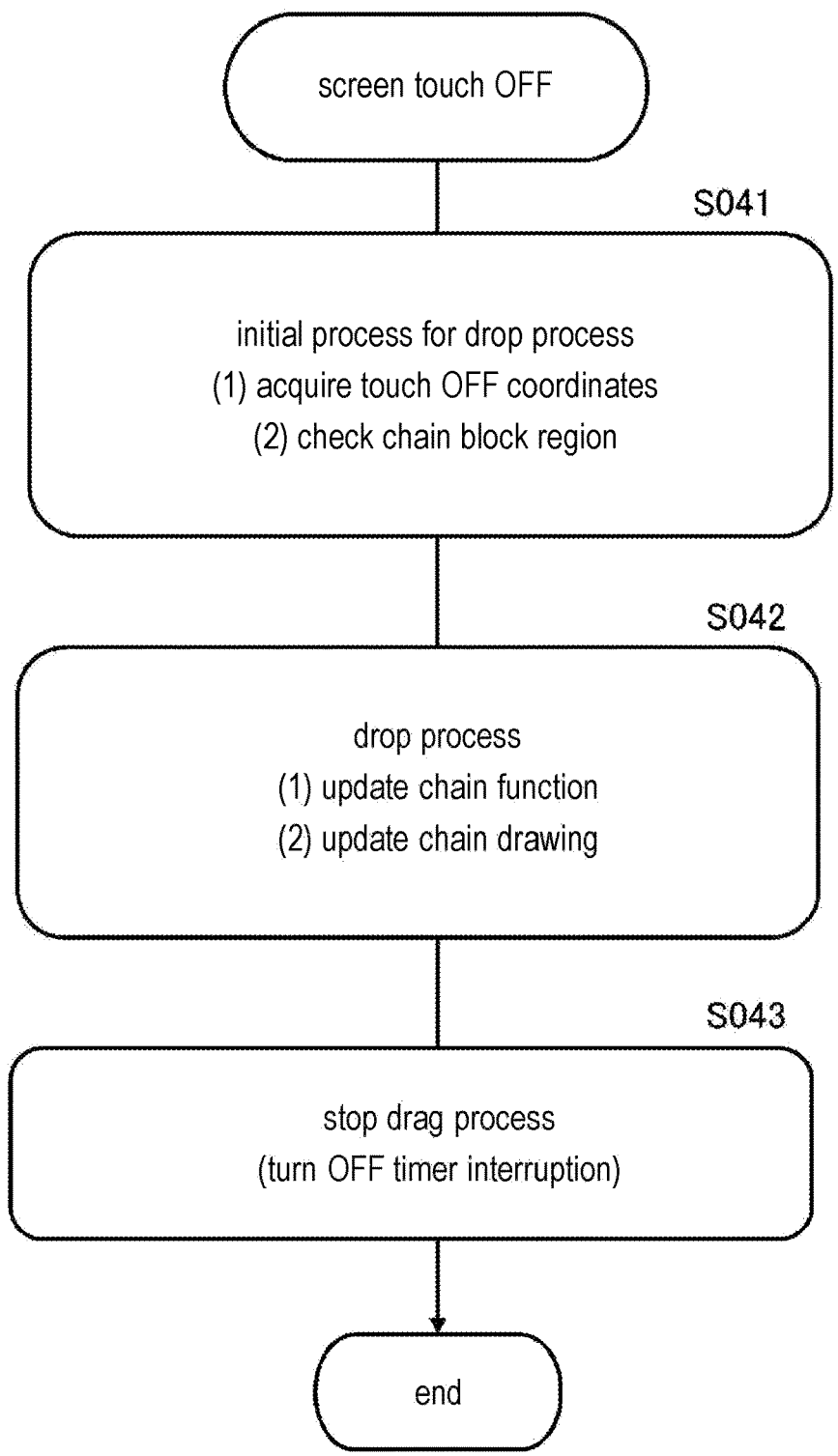
FIG. 24 is a flowchart illustrating a process example when screen touch is OFF.

FIG. 24 is a flowchart illustrating a process example when screen touch is OFF. The process is started in a case where a touch state is released (OFF) by releasing the finger or the like from the block 60 being dragged.

In step S041, the touch management part 111 performs an initial process for a drop process. As the initial process, the touch management part 111 acquires coordinates (referred to as touch OFF coordinates) of the center 60A of the block 60 in the dragged state when the finger or the like is separated (dropped) from the touch panel 16 on the basis of an output from the touch panel 16. The touch management part 111 checks a chain block region (editing region 52).

In step S042, the touch management part 111 performs a process of dropping the block 60. In step S042, a process of updating a chain function and a process of updating a chain drawing are performed.

In step S043, the touch management part 111 stops the drag process. Consequently, timer interruption accompanying the drag is turned off. Thereafter, the screen touch OFF process is finished. By releasing the touch state of the screen 50 as described above, the process related to the drop of the dragged block 60 is executed.

Figure 25:
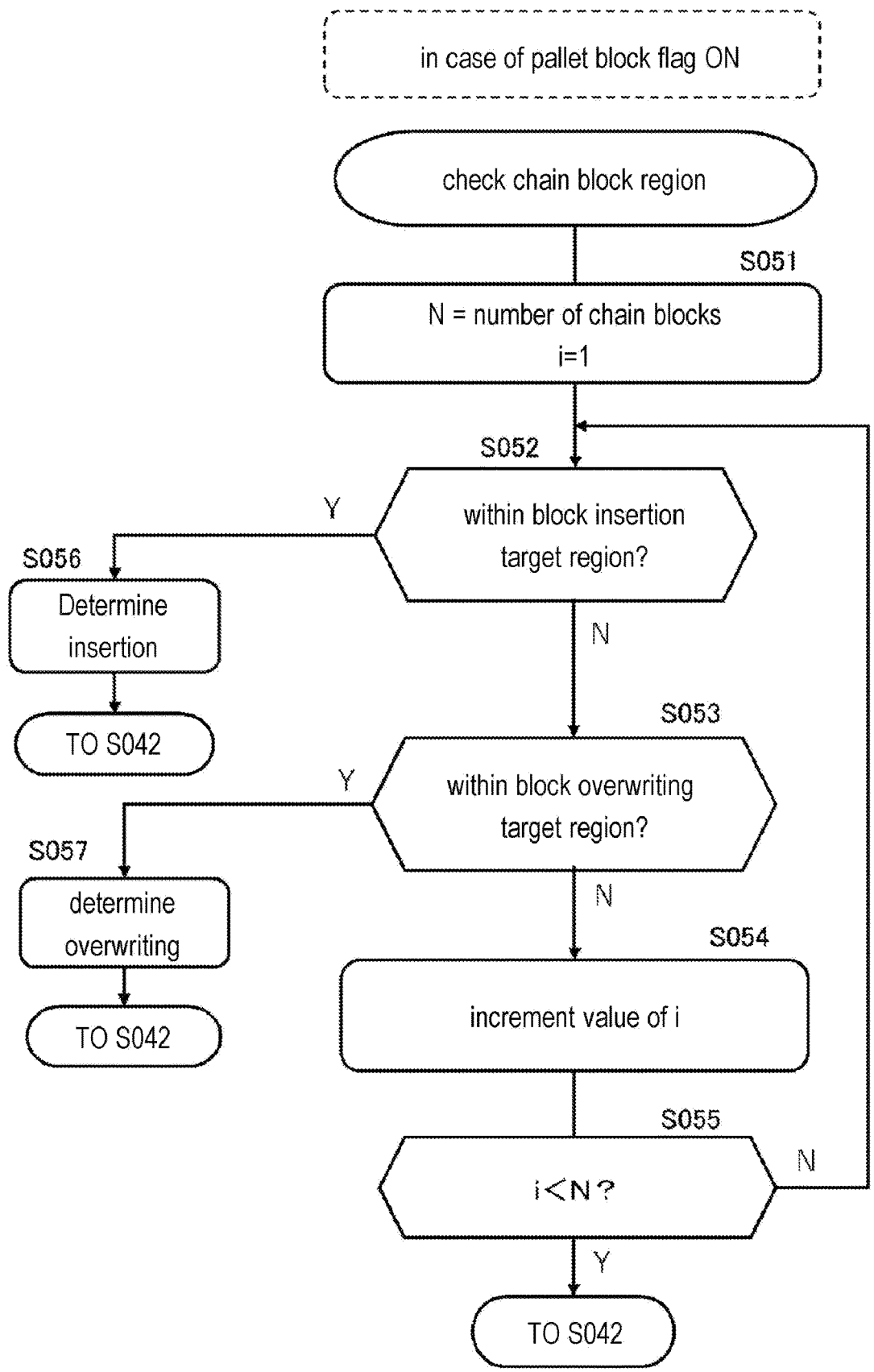

FIG. 25 is a flowchart illustrating a process example of checking the chain block region (S41) in a case where the palette block flag is ON. In step S051, the touch management part 111 sets the number of blocks forming the effect chain in the editing region 52 as a variable N. The number of blocks 60 forming the effect chain is managed by the effect chain management part 112 and stored in the storage device 12. The touch management part 111 sets a value of the variable i indicating a target to 1.

In step S052, the touch management part 111 specifies one of the blocks 60 in the editing region 52 corresponding to the current value of i as a target. The touch management part 111 determines whether or not the touch OFF coordinates are included in a determination region ("insertion region") that is an insertion target formed by the target block 60 and the determination regions 70 of the block 60 adjacent to the block 60 (refer to FIG. 15). In a case where it is determined that the touch OFF coordinates are included in the insertion region, the process proceeds to step S056, and in other cases, the process proceeds to step S053.

Figure 26:
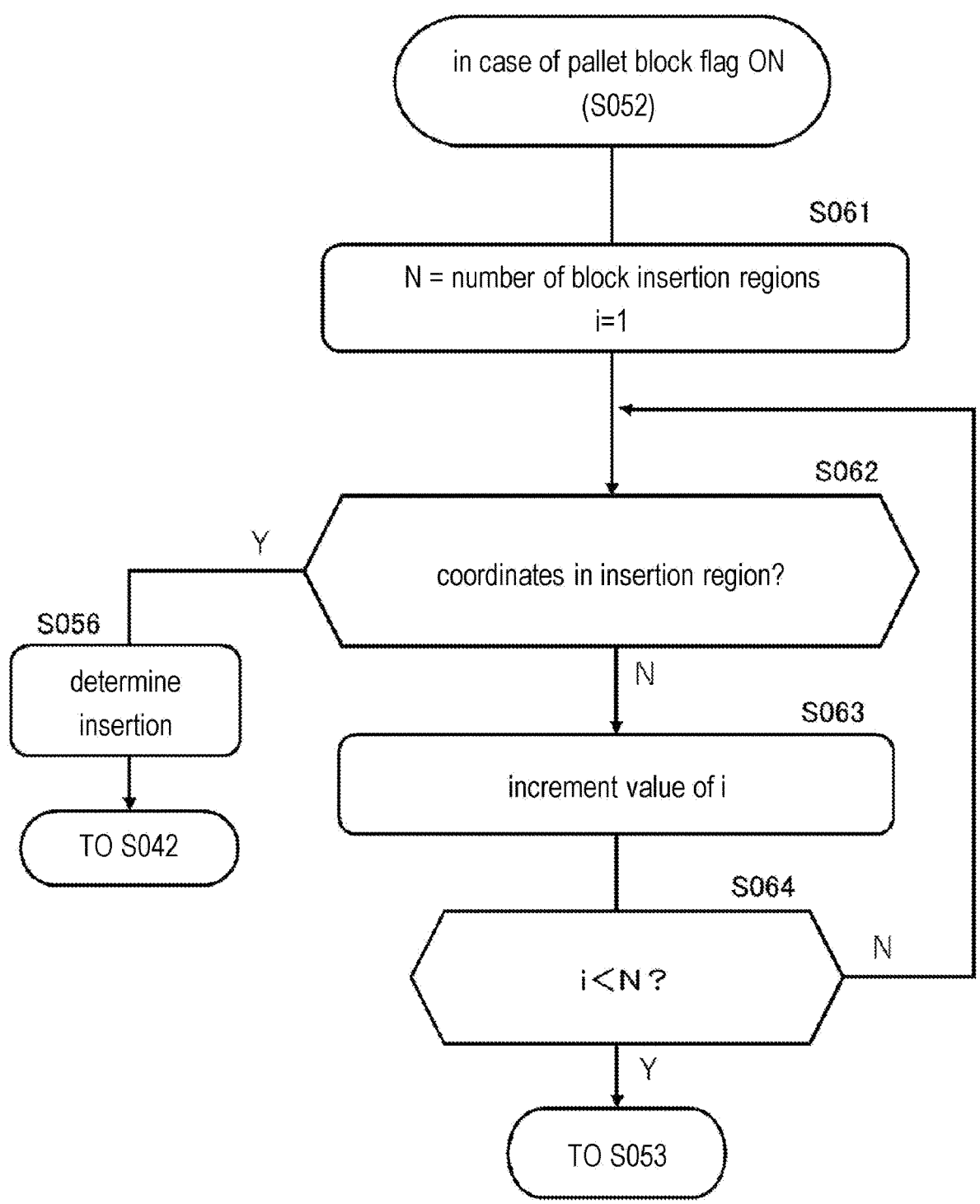
FIG. 26 is a flowchart illustrating an example of a process of determining whether or not the block is within an insertion target region.

FIG. 26 is a flowchart illustrating details of the process in step S052. In step S061, the touch management part 111 sets the number of insertion regions of the block 60 as the variable N. The insertion region and the number thereof in the editing region 52 are managed by the effect chain management part 112 and stored in the storage device 12. The touch management part 111 sets a value of the variable i for specifying a target insertion region to 1.

In step S062, the touch management part 111 specifies one of the insertion regions corresponding to the current value of i as a target. The touch management part 111 determines whether or not the touch OFF coordinates are included in the target insertion region. In a case where it is determined that the touch OFF coordinates are included in the insertion region, the process proceeds to step S056, and in other cases, the process proceeds to step S063.

In step S063, the touch management part 111 increments the value of the variable i, and the process proceeds to step S064.

In step S064, the touch management part 111 determines whether or not the value of the variable i exceeds the number N of the insertion regions. When the value of i exceeds the value of N, this means that there is no next target insertion region. In a case where it is determined that the value of i exceeds the value of N, the process proceeds to step S053 in FIG. 25, and in other cases, the process returns to step S062.

In step S053, the touch management part 111 determines whether or not the touch OFF coordinates are included in a determination region (referred to as an "overwriting region"; refer to FIG. 9A) that is an overwriting target for the target block 60. In a case where it is determined that the touch OFF coordinates are included in the overwriting region, the process proceeds to step S057, and in other cases, the process proceeds to step S054.

Figure 27:
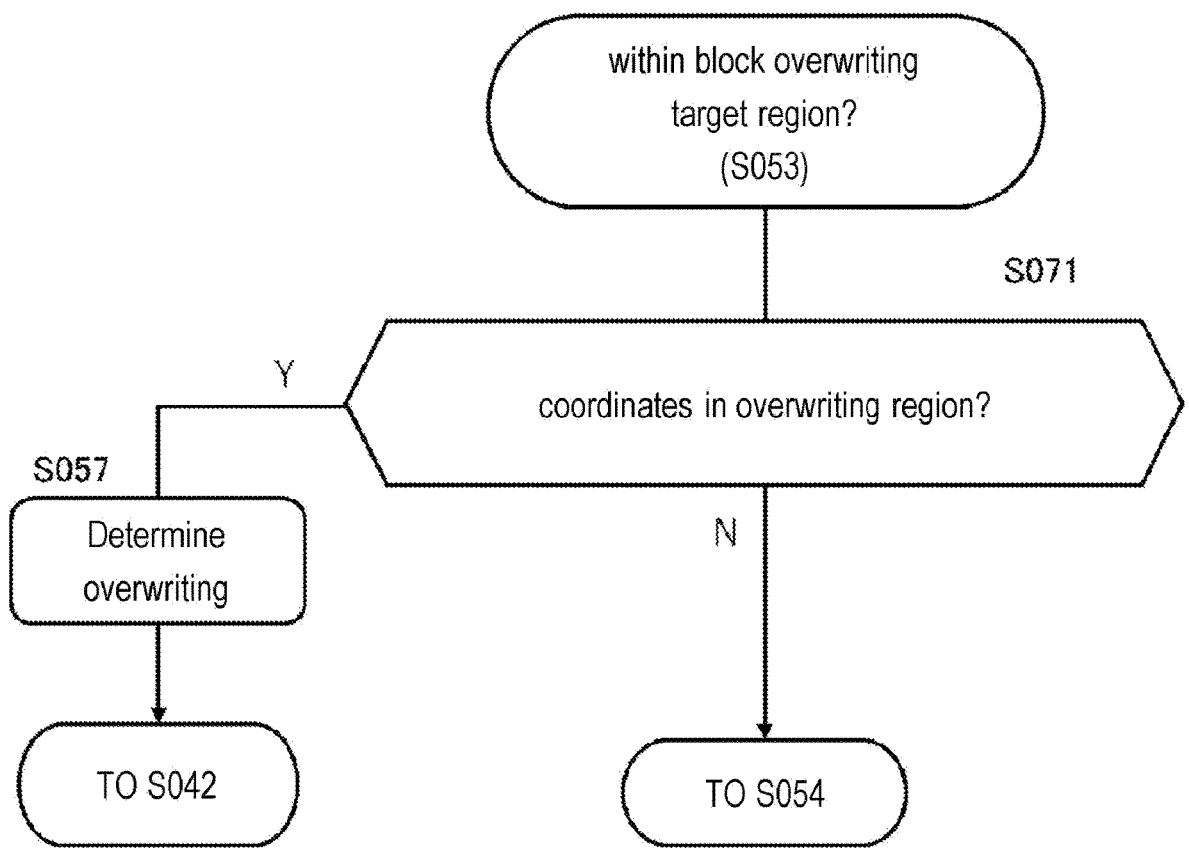
FIG. 27 is a flowchart illustrating an example of a process of determining whether or not a block is within an overwrite target region.

FIG. 27 is a flowchart illustrating details of the process in step S053. In step S071, the touch management part 111 determines whether or not the touch OFF coordinates are coordinates in the overwriting region. In a case where it is determined that the touch OFF coordinates are the coordinates in the overwriting region, the process proceeds to step S057, and in other cases, the process proceeds to step S054.

In step S054, the touch management part 111 increments the value of the variable i, and the process proceeds to step S055.

In step S055, the touch management part 111 determines whether or not the value of the variable i exceeds the number N of blocks. When the value of i exceeds the value of N, this means that there is no next target block 60. In a case where it is determined that the value of i exceeds the value of N, the process proceeds to step S042 in FIG. 24, and in other cases, the process returns to step S052.

In a case where the process proceeds to step S056, the touch management part 111 determines to insert the dropped block 60 between the target block 60 and the adjacent block thereof. Thereafter, the process proceeds to step S042 in FIG. 24.

In a case where the process proceeds to step S057, the touch management part 111 determines to overwrite the target block 60 with the dropped block 60. Thereafter, the process proceeds to step S042 in FIG. 24.

Figure 28:
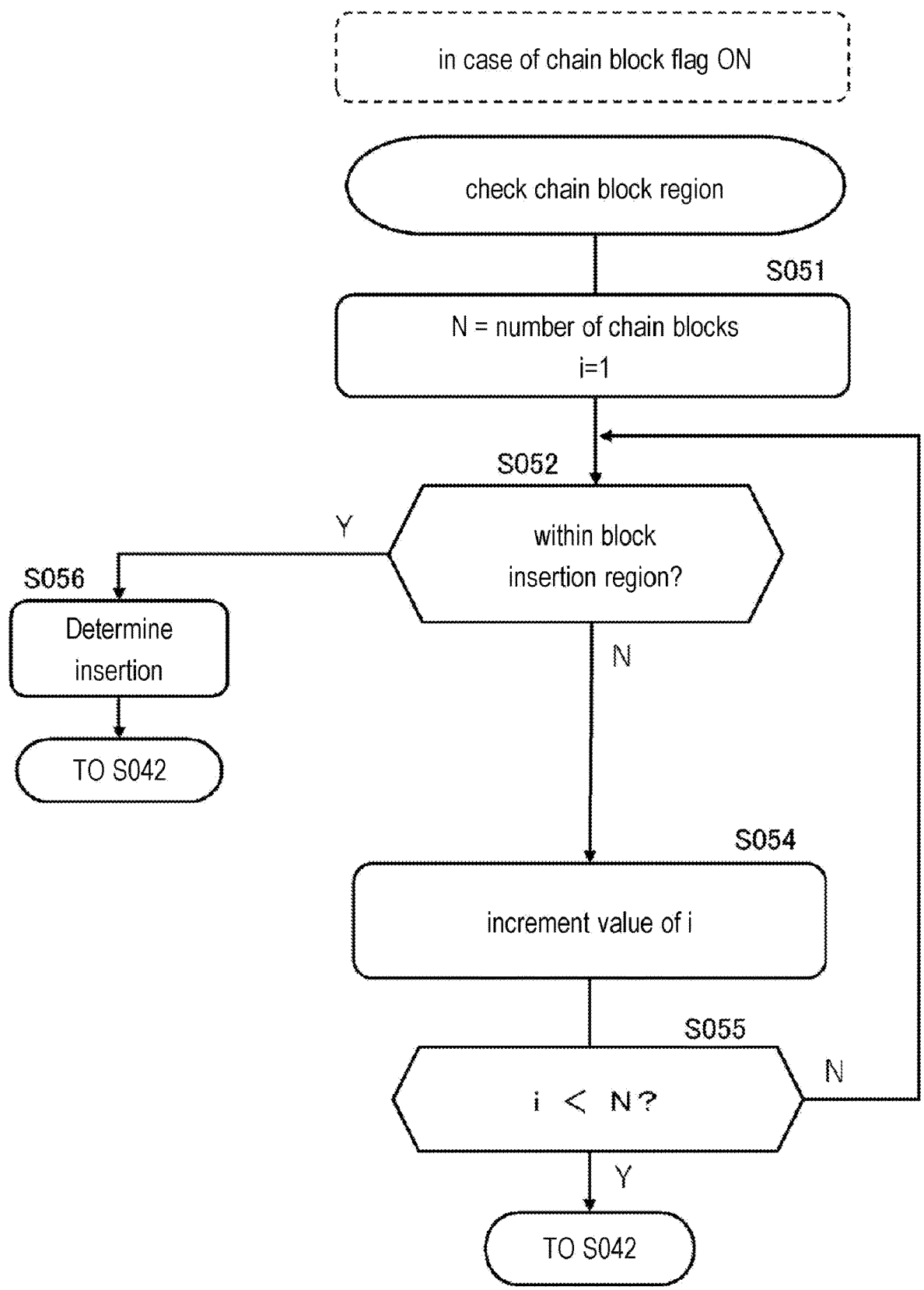

FIG. 28 is a flowchart illustrating a process example of checking a chain block region (S41) in a case where the chain block flag is ON. The flowchart includes details obtained by excluding the processes in steps S053 and S057 related to overwriting from the processes in a case where the pallet block flag is ON illustrated in FIG. 25. Since the processes in the individual steps S051, S052, and S054 to S056 are the same as those in FIG. 25, the description thereof will be omitted.

Figure 29:
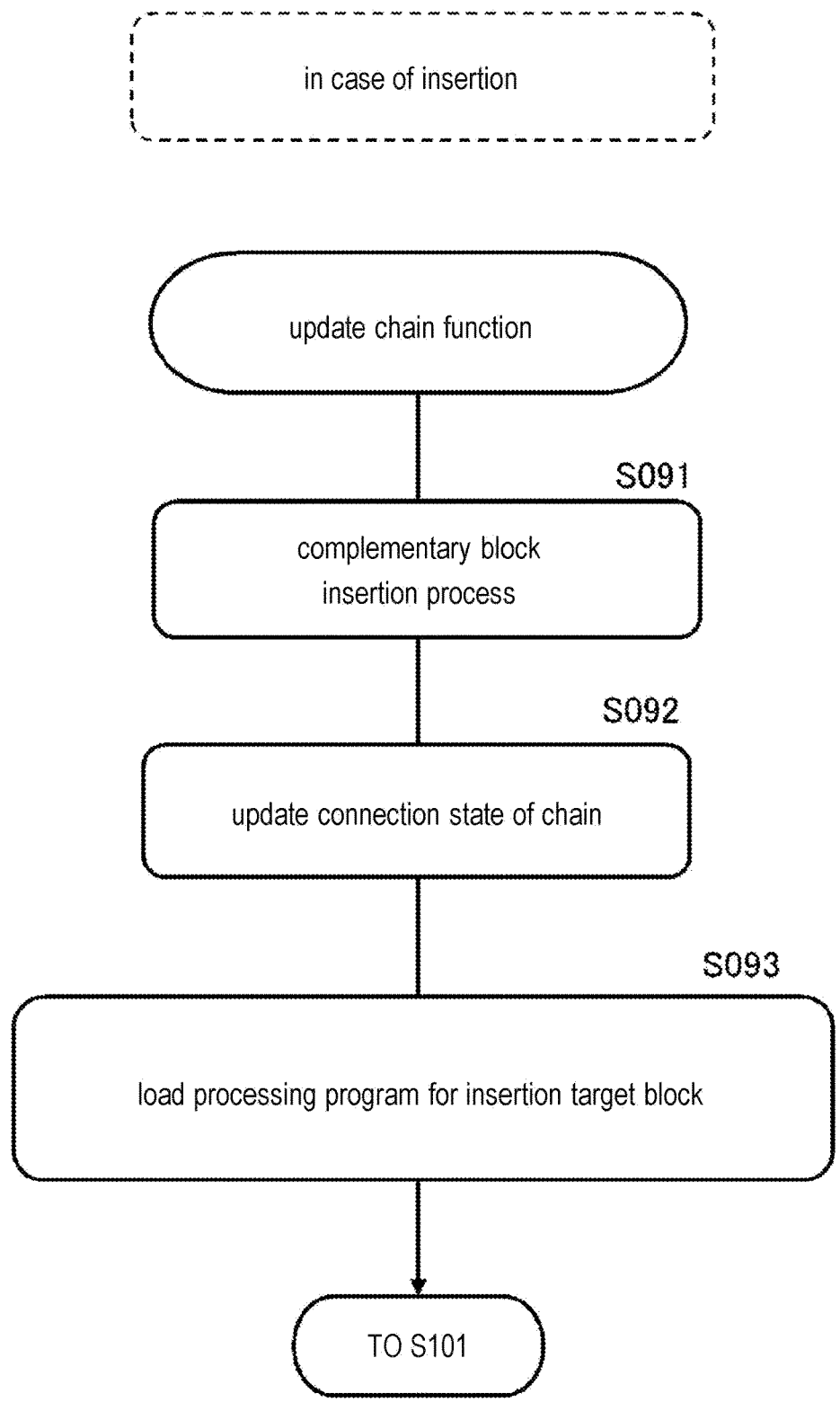
FIG. 29 is a flowchart illustrating a process example of updating a chain function in a case of insertion.

FIG. 29 is a flowchart illustrating details of the process of updating the chain function in step S042. FIG. 29 illustrates a process of updating the chain function in a case of insertion. In step S091, the effect chain management part 112 (CPU 11) performs a process of inserting a complementary block (refer to the block "empty" in FIGS. 14 and 15, and the like).

In step S092, the effect chain management part 112 updates the information stored in the storage device 12, indicating the connection state of the effect chain in response to the insertion.

In step S093, the effect update part 115 reads a processing program for the block 60 that is an insertion target from the effect storage part 114 and loads the program according to the update of the effect chain. Consequently, a process performed by the block 60 that is an insertion target is set in the signal processing part 116. Thereafter, the process proceeds to step S101 in FIG. 30.

Figure 30:
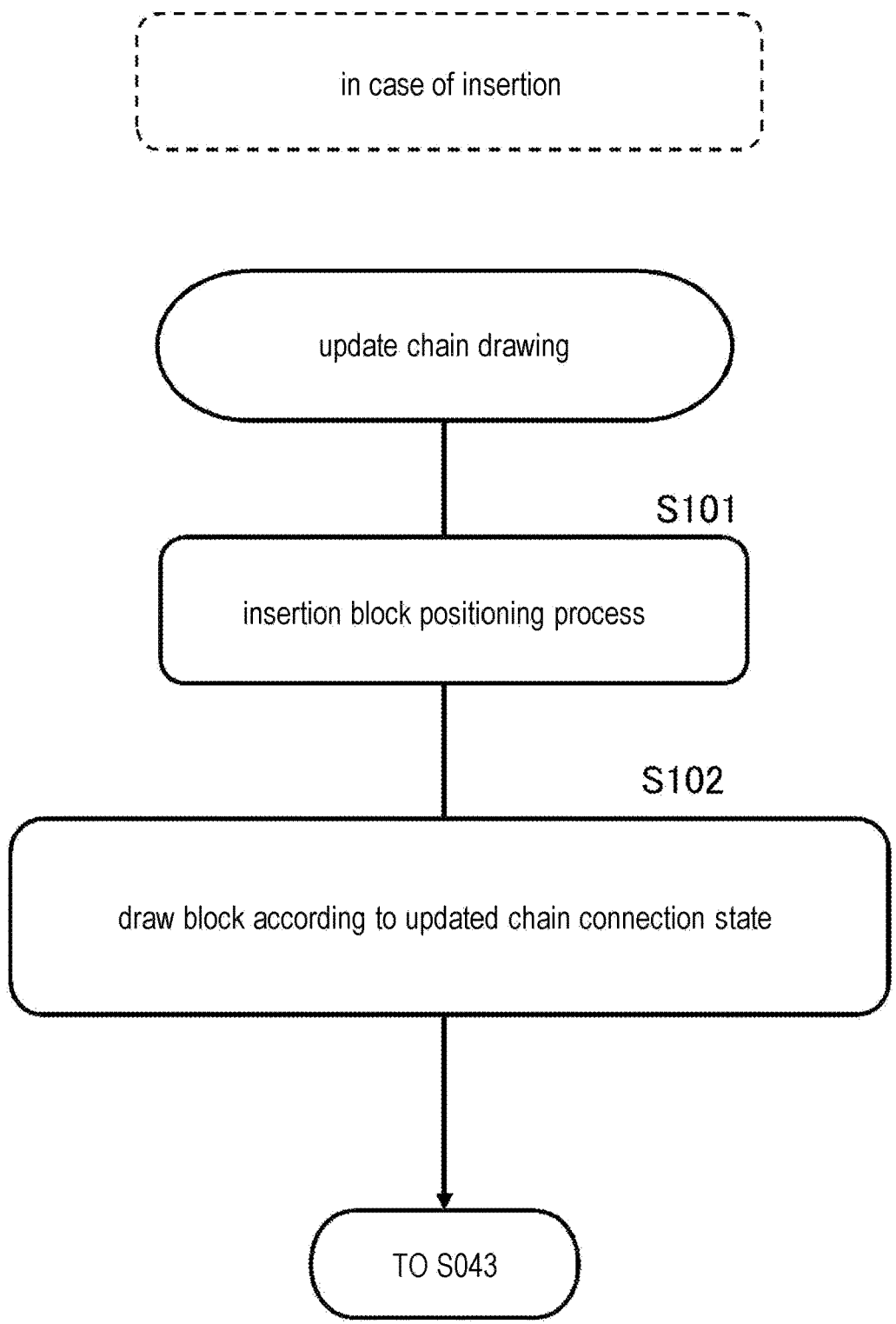
FIG. 30 is a flowchart illustrating a process example of updating a chain drawing in a case of insertion.

FIG. 30 is a flowchart illustrating details of updating the chain drawing (S042) in a case of insertion. In step S101, the display control part 117 performs a process of positioning a block that is an insertion target according to the update of the effect chain.

In step S102, the display control part 117 draws a block according to a connection state of the updated effect chain. Consequently, an effect chain in which the block 60 that is an insertion target is inserted between the blocks 60 as illustrated in FIGS. 14A to 14C or FIGS. 16A to 16C and a complementary block (such as the block "empty") is automatically disposed is displayed in the editing region 52 on the screen 50 of the display 15. Thereafter, the process proceeds to step S043 in FIG. 24.

Figure 31:
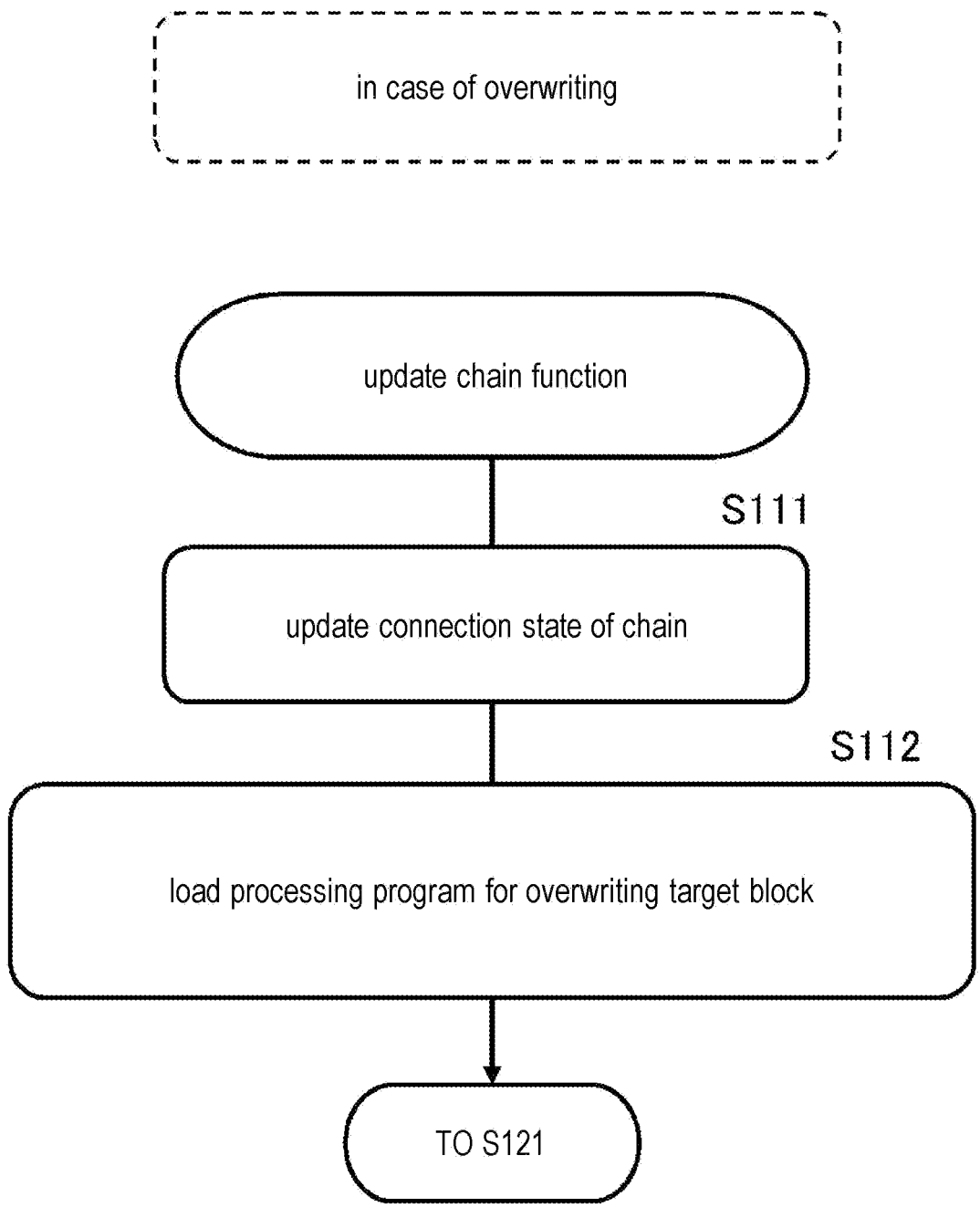
FIG. 31 is a flowchart illustrating a process example of updating the chain function in a case of overwriting.

FIG. 31 is a flowchart illustrating details of the process of updating the chain function in step S042. FIG. 31 illustrates a process of updating the chain function in a case of overwriting. In step S111, the effect chain management part 112 (CPU 11) updates the information stored in the storage device 12, indicating the connection state of the effect chain in response to overwriting.

In step S112, the effect update part 115 reads a processing program for the block 60 that is an overwriting target from the effect storage part 114 and loads the program according to the update of the effect chain. Consequently, a process performed by the block 60 that is an overwriting target is set in the signal processing part 116, and a process of the overwritten block 60 is not performed. Thereafter, the process proceeds to step S121 in FIG. 32.

Figure 32:
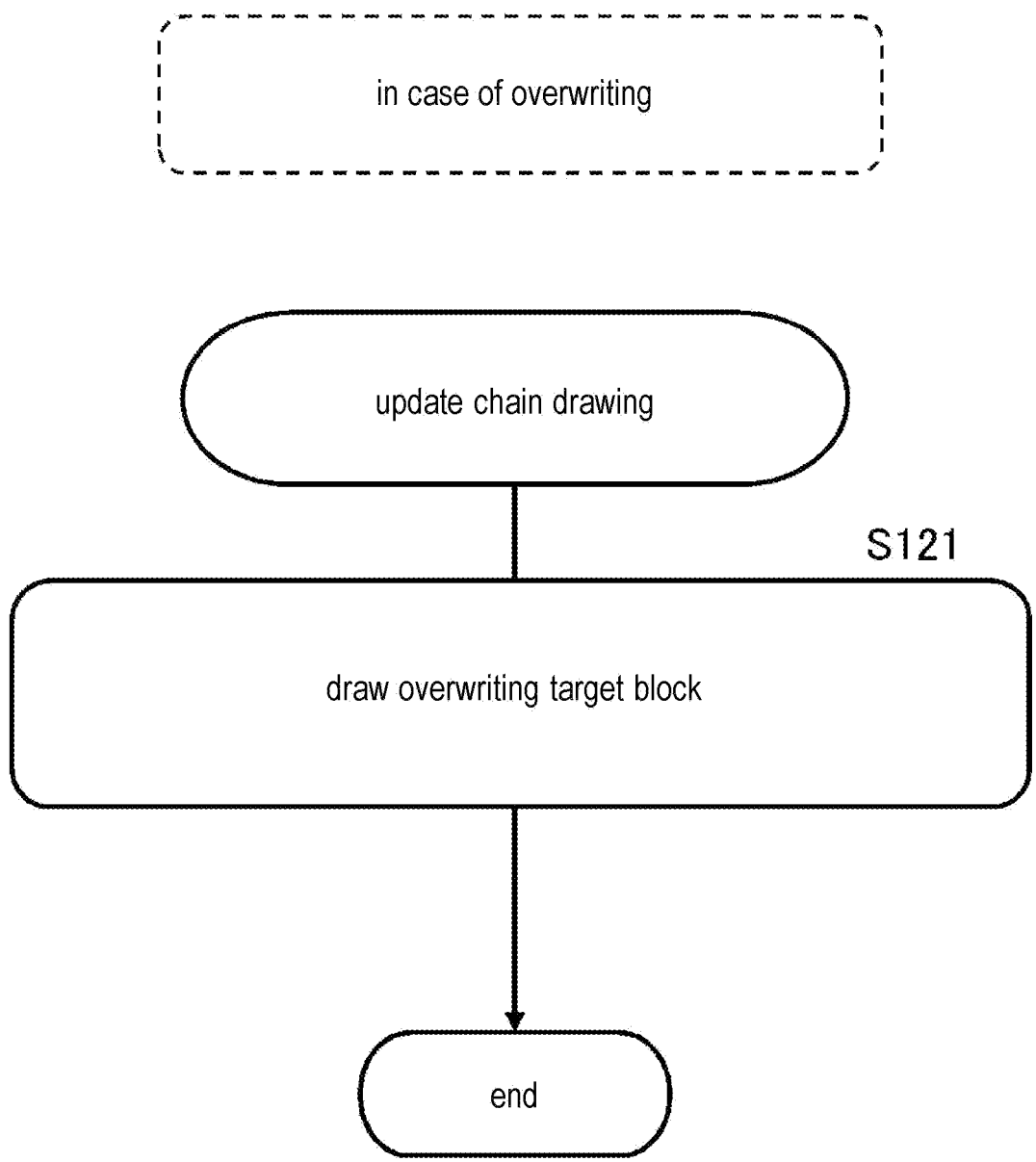
FIG. 32 is a flowchart illustrating a process example of updating the chain drawing in a case of overwriting.

FIG. 32 is a flowchart illustrating details of updating the chain drawing (S042) in the case of overwriting. In step S121, the display control part 117 draws the block 60 that is an overwriting target according to the update of the effect chain. Consequently, an effect chain in which the block "empty 1" as illustrated in, for example, FIGS. 19A and 19B is overwritten with the block "6" that is the overwriting target block 60 is displayed in the editing region 52 on the screen 50 of the display 15. Thereafter, the process proceeds to step S043 in FIG. 24.

Through the processes illustrated in FIGS. 20 to 32, the user can edit the effect chain by using the editing region 52. A setting of signal processing based on the effect chain is applied to the signal processing part 116. The signal processing (effect chain) is turned on/off by, for example, a foot switch (foot SW) that is one of the operators 14. However, the effect chain may be turned on and off by using a device other than the foot switch.

Figure 33:
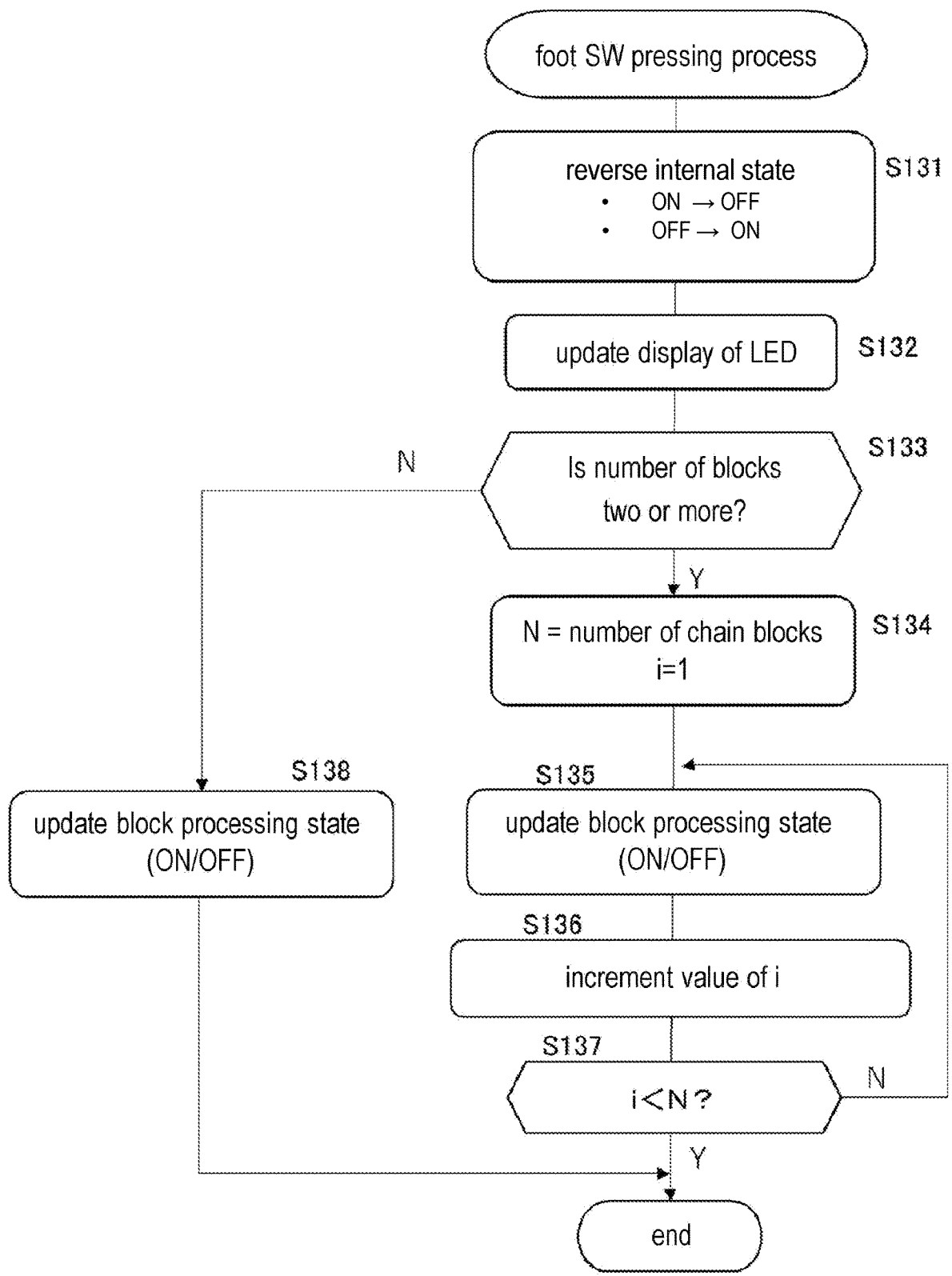
FIG. 33 is a flowchart illustrating an example of a process of pressing a foot switch.

FIG. 33 is a flowchart illustrating a process example in a case where an operation of pressing the foot switch (foot SW) that is one of the operators 14 is performed when one block 60 is set in the editing region 52 and a process corresponding to the block 60 is set in the signal processing part 116.

In step S131, the parameter change part 113 (CPU 11) that detects the pressing of the foot switch reverses an internal state (internal STATE) of the effect chain (signal processing part 116). In this case, when the effect chain is off, it is inverted to an on state, and when the effect chain is on, it is inverted to an off state.

In step S132, a display mode of a light emitting diode (LED) included in the effector 10 is updated according to the update of the internal state. For example, when the state is changed from off to on, the LED is turned on, and when the state is changed from on to off, the LED is turned off.

In step S133, the effect update part 115 (CPU 11) that has received on or off of the effect chain from the parameter change part 113 acquires information indicating details of the effect chain from the effect chain management part 112. The effect update part 115 determines whether the number of blocks 60 forming the effect chain is one or two or more. In this case, when the number of blocks 60 is two or more, the process proceeds to step S134, and in other cases, the process proceeds to step S138.

In a case where the process proceeds to step S134, the effect update part 115 sets the number of blocks in the effect chain as the variable N and sets a value of the variable i to 1.

In step S135, the effect update part 115 updates a processing state (on/off) for the block 60 in the effect chain corresponding to the current value of the variable i. On of the processing state means to impart (apply) an effect set in the block 60, and off means to cause the sound signal pass through the block 60 (do not impart an effect). The update is performed by updating loading details for the signal processing part 116 or turning on or off the signal processing (electronic circuit) set in the signal processing part 116 (DSP).

In step S136, the effect update part 115 increments the value of the variable i. In step S137, the effect update part 115 determines whether or not the value of i exceeds the value of N. When the value of i exceeds the value of N, this means that the process in step S135 has been performed on all the blocks 60 forming the effect chain. In a case where it is determined that the value of i exceeds the value of N, the process in FIG. 33 is finished, and in other cases, the process returns to step S135.

In a case where the process proceeds to step S138, the effect update part 115 updates the processing state (on (effect impartment)/off (through)) for the target block 60. That is, the same process as the process performed on one block 60 forming the effect chain in step S135 is performed. When the process is finished, the process in FIG. 33 is finished.

In a case where the effect chain includes a set block (FIG. 5A), the effect update part 115 performs the same processes as those in steps S134 to S137 on each block 60 forming the short chain forming the set block in step S135 or S138.

As described above, the user can easily change impartment or passing of an effect based on an effect chain by operating the foot switch (on/off of the effect chain).

Modification Example 1

Figure 34A:
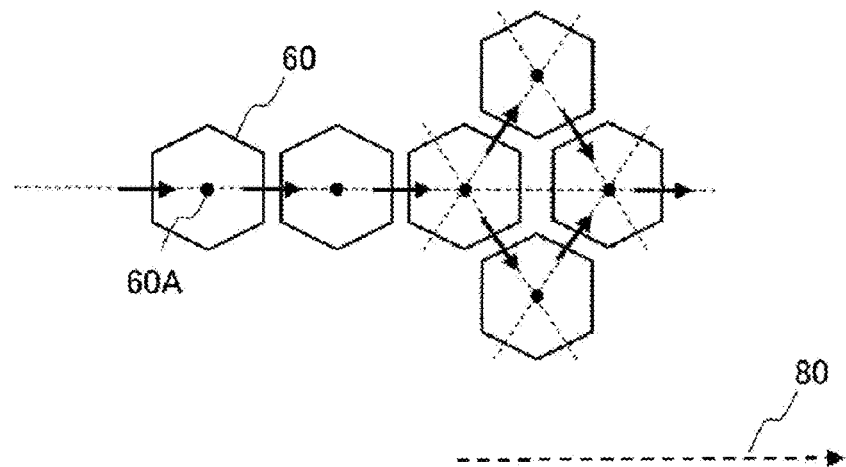
FIGS. 34A to 34C are explanatory diagrams of a modification example of the embodiment.

The above embodiment may be modified as follows. For example, as illustrated in FIG. 34A, the block 60 having a regular hexagonal shape may be rotated by 90° on the screen 50. That is, the block 60 may be disposed in a state in which two of its vertices facing in the vertical direction are disposed and respective sides of the adjacent blocks 60 faces each other in the left-right direction. The sides may overlap each other.

As illustrated in FIG. 34A, adjacent blocks 60 are disposed in a state in which the centers 60A of the respective blocks 60 are arranged on the same virtual straight line. Also in this case, the blocks 60 are arranged from left to right along the time axis 80.

Figure 34B:
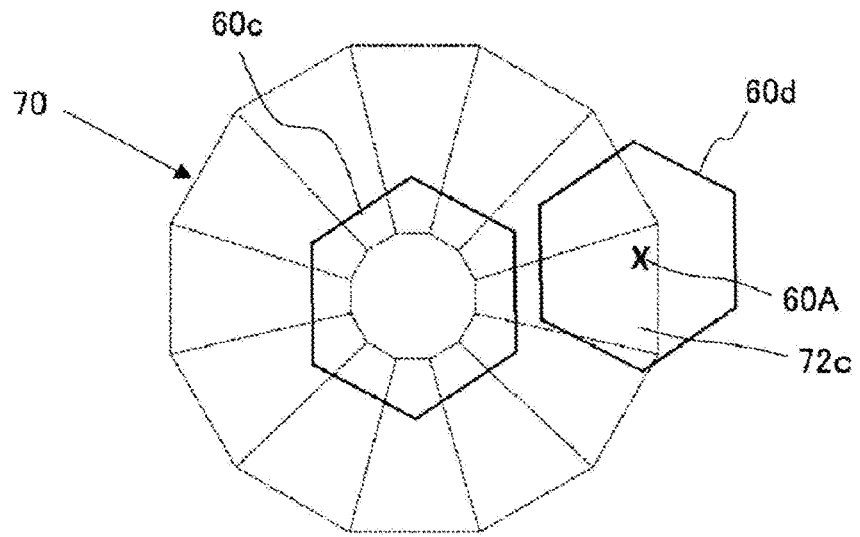

FIG. 34B illustrates a determination region in Modification Example 1 illustrated in FIG. 34A. The determination region 70 related to the block 60 of Modification Example 1 is the same as the determination region 70 (FIG. 6) in the embodiment. As illustrated in FIG. 34B, it is determined whether or not the center 60A of the dropped block 60d is included in the right region 72c of the disposed block 60c.

Figure 34C:
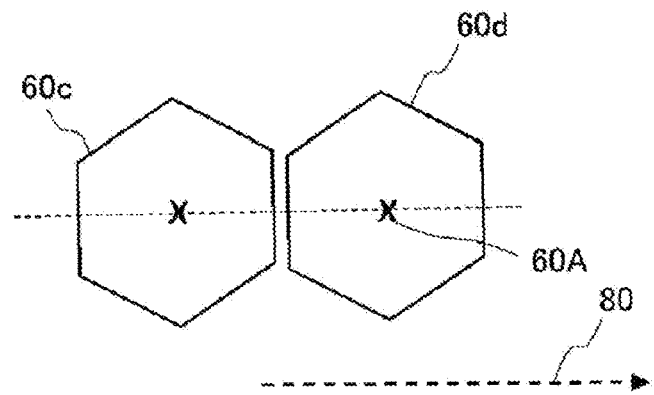

In a case where the center 60A is included in the region 72c, a position of the block 60d is automatically changed such that the respective centers 60A of the blocks 60c and 60d are located on a virtual line in the left-right direction as illustrated in FIG. 34C.

Modification Example 2

Figure 35A:
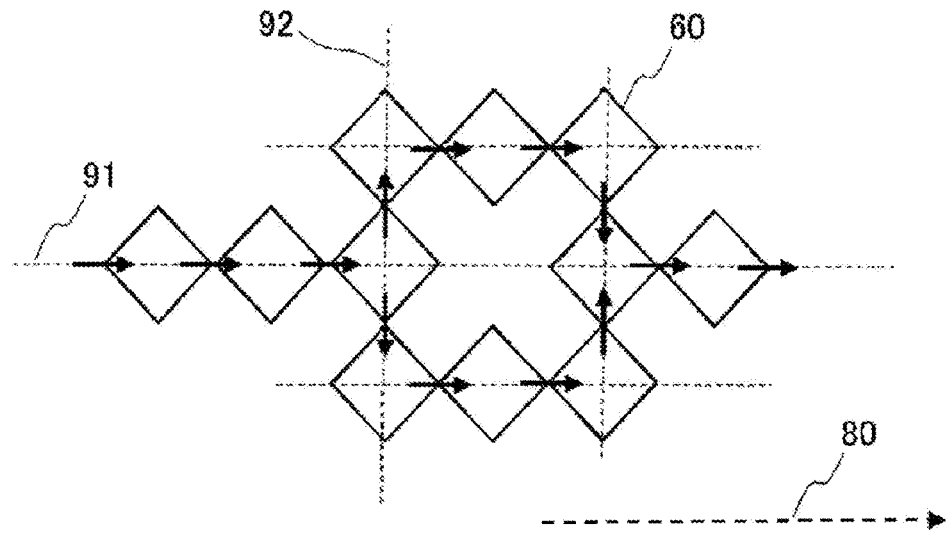
FIGS. 35A to 35C are explanatory diagrams of a modification example of the embodiment.

As illustrated in FIG. 35A, an outer shape of the block 60 may be a square shape. In this case, blocks arranged in the left-right direction (the direction of the time axis 80) are disposed such that vertices thereof are in contact with each other or face each other and the centers of the respective blocks 60 are located on the same virtual straight line in the left-right direction. In a case where a sound signal path branches, the first branch block is disposed above the branch source block, and the second branch block is disposed below the branch source block. The blocks are disposed such that the respective centers 60A of the first branch block and the second branch block and the two vertices of the adjacent blocks pass through a perpendicular line passing through the center of the branch source block.

In a case where the sound signal path is aggregated, the blocks are disposed such that the respective centers of the first aggregation source block and the second aggregation source block and two vertices of adjacent blocks pass through a perpendicular line passing through the center of the aggregation block.

Modification Example 3

Figure 35B:
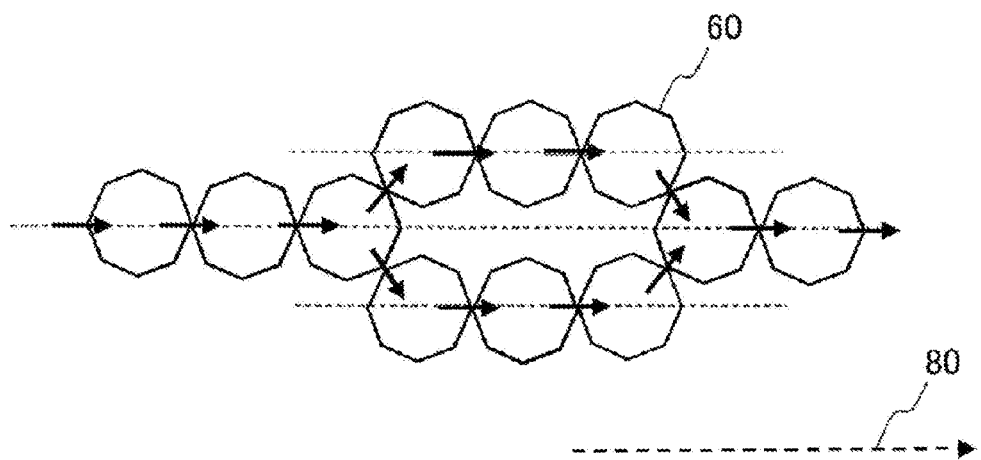

As illustrated in FIG. 35B, an outer shape of the block 60 may be a regular octagonal shape. Also in this case, blocks arranged in the left-right direction (the direction of the time axis 80) are disposed such that vertices thereof are in contact with each other or face each other and the centers of the respective blocks 60 are located on the same virtual straight line in the left-right direction. In a case where a sound signal path branches, the first branch block is disposed on the upper right of the branch source block, and the second branch block is disposed on the lower right of the branch source block. Two adjacent vertices of the branch source block and the first branch block are located on a straight line passing through the center of the branch source block and the center of the first branch block. Two adjacent vertices of the branch source block and the second branch block are located on a straight line passing through the center of the branch source block and the center of the second branch block.

Modification Example 4

Figure 35C:
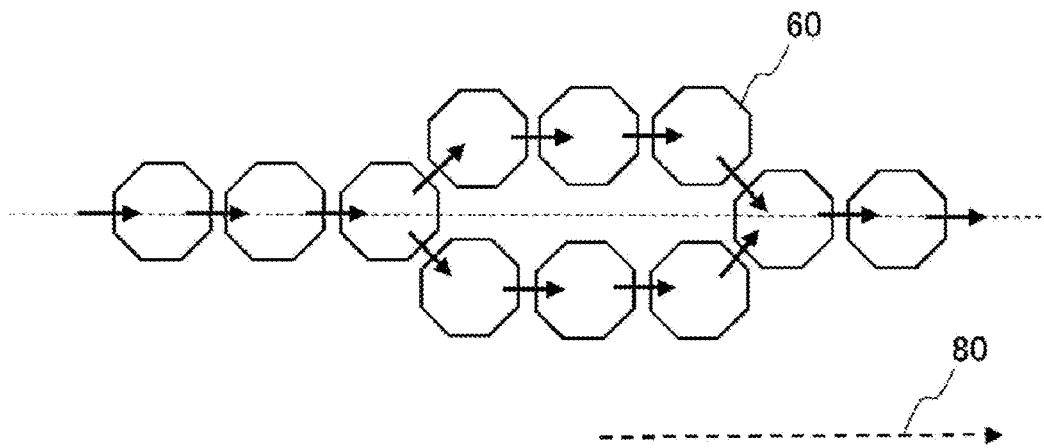

As illustrated in FIG. 35C, an outer shape of the block 60 may be a regular octagonal shape, and sides of the adjacent blocks 60 may be disposed to face each other. Also in this case, the adjacent blocks 60 are disposed such that the centers thereof are located on the same straight line.

Also in Modification Examples 2 to 4, a determination region of the dropped block 60 is provided for the block 60 disposed in the editing region 52, and in a case where the center of the dropped block 60 is included in the determination region, a position of the dropped block 60 may be automatically changed. Regular polygonal shapes other than the square shape and the regular octagonal shape described in Modification Examples 2 to 4 may be applied to an outer shape of the block 60. Polygonal shapes other than a regular polygonal shape may be used for an outer shape of the block 60.

Modification Example 5

Figure 36A:
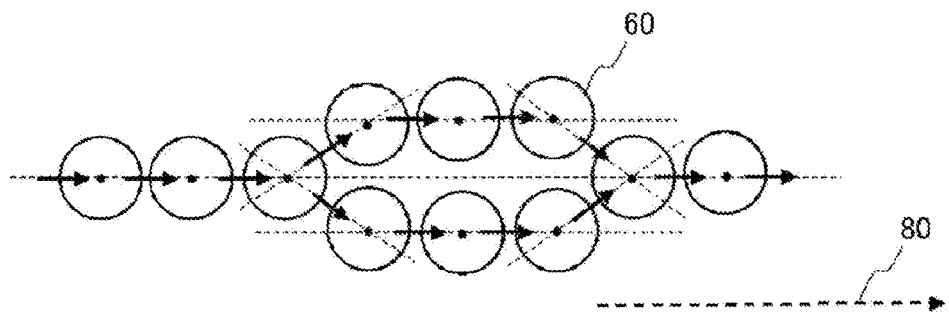
FIGS. 36A to 36D are explanatory diagrams of a modification example of the embodiment.

As illustrated in FIG. 36A, an outer shape of the block 60 may be a circular shape. Also in this case, the adjacent blocks 60 are disposed such that the centers of the respective blocks 60 are located on the same virtual straight line. The adjacent blocks 60 are disposed in a state of being in contact with each other at one point or in a state of being separated from each other by a predetermined distance.

Figure 36B:
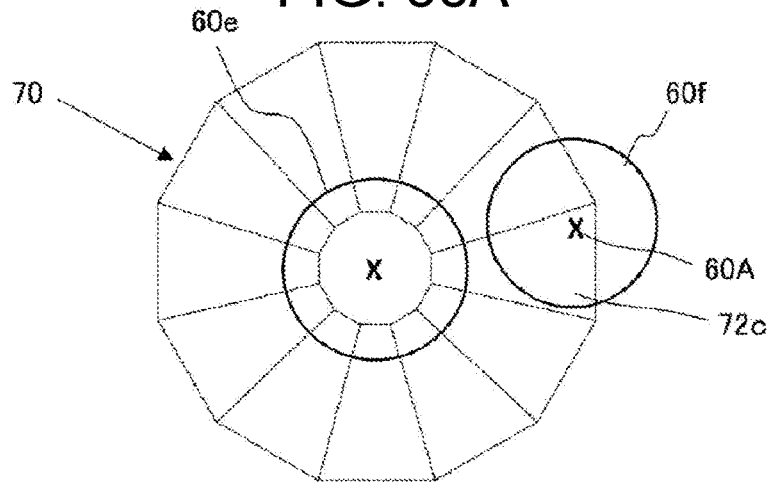

FIG. 36B illustrates a determination region in Modification Example 5 illustrated in FIG. 36A. As the determination region 70 related to the block 60 (60e in FIG. 36B) of Modification Example 5, the same determination region 70 (FIG. 6) in the embodiment may be applied. As illustrated in FIG. 36B, it is determined whether or not the center 60A of the dropped block 60f is included in the right region 72c of the disposed block 60e.

Figure 36C:
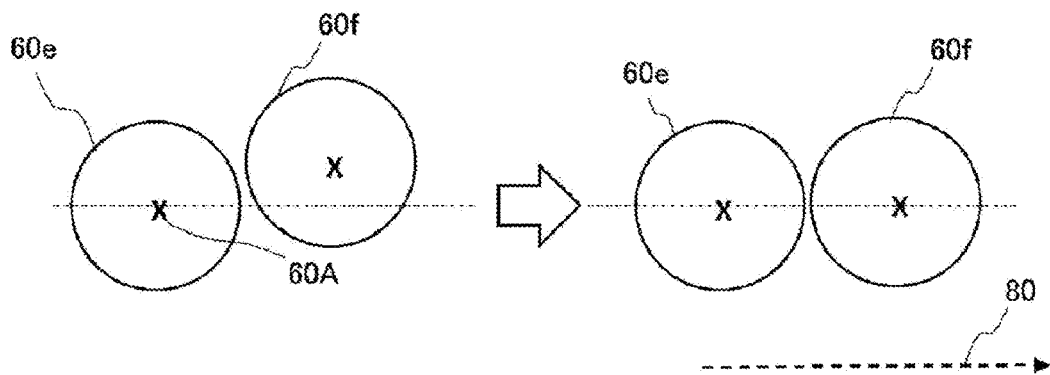

In a case where the center 60A of the block 60f is included in the region 72c, a position of the block 60f is automatically changed such that the respective centers 60A of the blocks 60e and 60f are located on a virtual line in the left-right direction as illustrated in FIG. 36C.

Figure 36D:
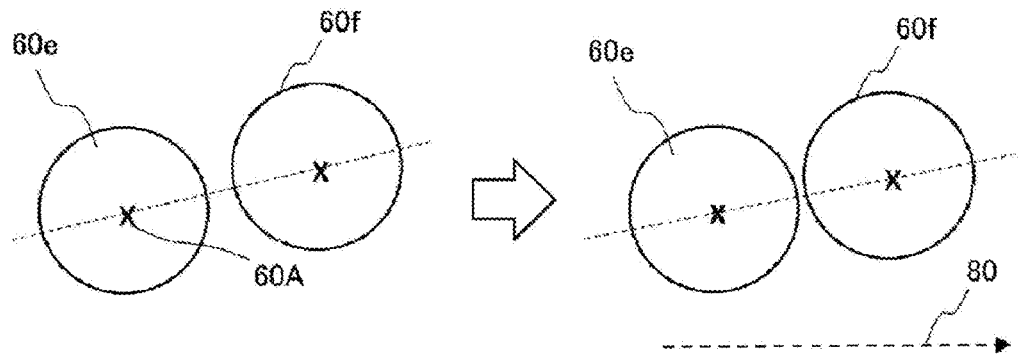

However, as illustrated in FIG. 36D, in a case where an outer shape of the block 60 is a circular shape, a distance between the blocks 60 may be adjusted to a constant distance in a state in which a virtual straight line passing through the respective centers 60A is not parallel to the time axis 80.

Modification Example 6

Figure 37A:
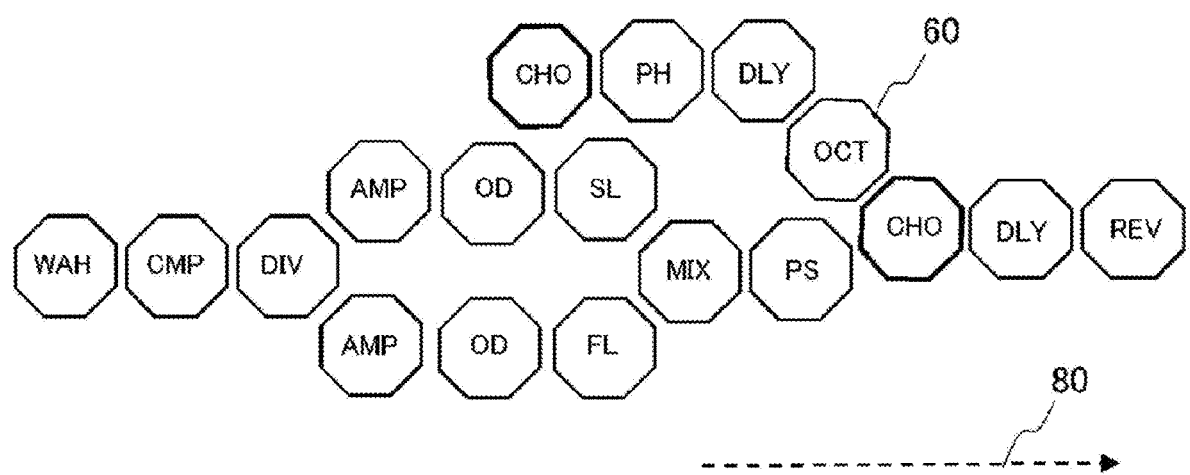
FIGS. 37A and 37B are explanatory diagrams of a modification example of the embodiment.

In the present embodiment, a connection between the blocks 60 is a vertex connection in which the vertices are connected to each other, but as described in Modification Examples 2 and 4, the connection may be a surface connection (or a side connection) in which the sides of the adjacent blocks 60 are disposed at a predetermined distance. As illustrated in FIG. 37A, an effect chain may be created by combining a vertex connection with a surface connection. In the example illustrated in FIG. 37A, the blocks 60 are connected to each other by a surface connection in principle, but the blocks 60 are connected to each other by a vertex connection, such as a block "OD" and a block "CHO" or a block "PS" and the block "CHO". In the example illustrated in FIG. 37A, in a case where the blocks 60 overlap each other or a distance becomes unnatural if the blocks 60 are to be disposed by a surface connection according to the principle, the blocks 60 are connected by a vertex connection. However, whether a connection between the blocks 60 is a vertex connection or a surface connection may be determined according to a rule other than the above.

Modification Example 7

Figure 37B:
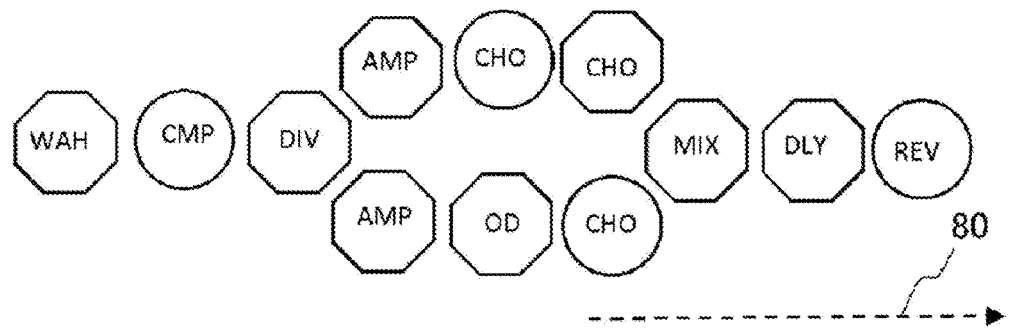

As illustrated in FIG. 37B, an effect chain may be formed of a combination of a polygonal block 60 and a circular block 60.

Advantageous Effects of Embodiment

The effector 10 (sound processing device) according to the embodiment can be set to perform a plurality of processes (effects, and the like) on a sound signal on the time axis 80. The effector 10 includes the display control part 117 that controls display of the screen 50 on which two or more blocks 60 each indicating input and output of the sound signal and process details for an input sound signal can be disposed. The effector 10 includes the signal processing part 116 that performs a process corresponding to each block 60 on a sound signal in a block order defined on the basis of a positional relationship between the blocks 60 disposed on the screen 50 and a new block disposed on the screen 50.

That is, in the effector 10, in a case where the block 60 is dropped onto the editing region 52 of the screen 50, a block order, that is, a connection order is determined on the basis of a positional relationship between the disposed block 60 and the dropped block 60 (S042 in FIG. 24, S092 in FIGS. 29, and S111 in FIG. 31). The signal processing part 116 performs processes on the sound signal in the connection order of each block 60 in the effect chain. Consequently, a user can set the order of processes performed by the signal processing part 116 without performing work such as connecting the blocks 60 disposed in the editing region 52 via a virtual wiring. Consequently, the user can easily determine the order of processes on the sound signal. In the screen 50, since the blocks 60 are not connected via a wiring or the like, a space of the screen 50 can be effectively used.

The effector 10 includes the effect chain management part 112 (generation part) that generates information (effect chain information) indicating the order of blocks on the basis of a positional relationship (connection order) between the blocks 60. Consequently, the user can automatically determine the order of processes on the sound signal on the basis of disposition of the blocks 60.

The effect chain management part 112 updates a connection state of the effect chain in the chain function update process (FIGS. 24, 29, and 31). Consequently, in a case where a position of the new block 60b disposed on the screen 50 is present in a connection region (regions 72a, 72c, and 72e) provided in the disposed block 60a (FIG. 6), the effect chain management part 112 generates information indicating the block order (connection order) in which the disposed block 60a is followed by the block 60b.

In a case where a position (a position of the center 60A) of the new block 60 disposed (dropped) in the editing region 52 is present in an insertion region (an overlapping region of the region 72e and the region 72k) provided in two adjacent blocks (the block "4" and the block "M"; refer to FIG. 15) disposed on the screen 50, the effect chain management part 112 generates information indicating a block order in which the block 60 dropped between the two blocks "4" and "M" is inserted. That is, the effect chain management part 112 generates effect chain information indicating the blocks "4", "5", and "M" in this order. In the present embodiment, a position of the block 60 is a position of the center 60A of the block 60, but a position other than the center 60A may be used to determine a position of the block 60.

In a case where a position (a position of the center 60A) of the new block 60b disposed (dropped) in the editing region 52 is present in an overwriting region (region 71) provided in the disposed block 60a (FIG. 9A), the effect chain management part 112 generates information (effect chain information) indicating a block order in which the disposed block 60a is overwritten with the disposed new block 60b.

In the embodiment, the new block disposed in the editing region 52 is, for example, a block dragged in a first region (pallet region) on the screen 50 and dropped in a second region (editing region 52) on which the disposed block is displayed (FIG. 4A). Alternatively, the disposed new block may be a block selected from among the blocks disposed in the editing region 52 through a drag operation and dropped at a position different from a disposition position before the drag operation (FIG. 3B).

In the embodiment, on the screen 50, two or more disposed blocks are disposed along the direction of the time axis 80 defined on the screen 50 (FIG. 3A). For example, in FIG. 7A, in a case where a second block (block 60b) is connected and disposed in the future direction of a first block (block 60a) disposed on the screen 50, the display control part 117 displays the block 60b on the screen 50 in a state in which the center 60A of the block 60b is located on the virtual straight line 90a that is disposed in the direction of the time axis 80 and passes through the center 60A of the disposed block 60a. Consequently, the user can intuitively understand a connection relationship between the blocks 60a and 60b.

In a case where the block 60b that is a second block is dropped onto the connection region (region 72c) of the block 60a that is a first block, the display control part 117 displays (automatically disposes) the block 60b of which the center 60A is located on the virtual straight line 90a. Therefore, it is possible to allow a margin in a drop position of the user.

On the screen 50, the block 60b may intersect the block 60a at one point (FIG. 7B). On the screen 50, the block 60b is disposed at a predetermined distance from the block 60a in the direction of the time axis 80. Outer shapes of the blocks 60a and the block 60b are a polygonal shape (regular hexagonal shape), and the adjacent vertices (6d and 6a) of the blocks 60a and 60b are located on the virtual straight line 90a (FIG. 7B). However, an outer shape of the block 60 may be a regular polygonal shape such as a regular quadrangular shape or a regular octagonal shape, or may be a polygonal shape other than a regular polygonal shape. An outer shape of the block 60 may be a circular shape.

In the embodiment, as illustrated in FIG. 11C, two blocks such as a first branch block (block "4") and a second branch block (block "empty") may be disposed to be connected to the branch source block "3" that is a block disposed on the screen 50. In this case, the first and second branch blocks are disposed such that the center of the first branch block "4" and the center of the second branch block "empty" are line-symmetrical with respect to the virtual straight line 90 disposed in the direction of the time axis 80 and passing through the center of the branch source block "3".

Here, as illustrated in FIG. 35A, on the screen 50, the respective centers of the first branch block and the second branch block may be located on a virtual straight line 92 that is orthogonal to a first virtual straight line 91 and passes through the center of the branch source block.

As illustrated in FIG. 11C, in a case where a future direction of the time axis 80 is the front of the branch source block "3" and the virtual straight line 90 is a center line of the branch source block "3", the center of the first branch block "4" is disposed on the front left (diagonally forward left; the upper right in FIG. 11C) of the branch source block "3", and the center of the second branch block "empty" is disposed on the front right (diagonally forward right; the lower right of in FIG. 11C).

As illustrated in FIG. 11C, it is assumed that the dragged block "4" is dropped onto the connection region (region 72a) of the first branch block in the branch source block "3". In this case, the display control part 117 disposes the dropped block "4" at the disposition position of the first branch block, and disposes the complementary block "empty" at the disposition position of the second branch block. The display control part 117 disposes, on the screen 50, the aggregation block "M" to which two blocks such as a first aggregation source block and a second aggregation source block are connected, and the first branch block "4" as the first aggregation source block and the second branch block "empty" as the second aggregation source block are connected. Consequently, the user can easily create a branch path.

As illustrated in FIGS. 14A to 14C, in a case where the block "5" in a dragged state is dropped onto the insertion region (FIG. 15) between the first branch block "4" and the aggregation block "M", the control part 117 displays a state in which the dropped block "5" as a first aggregation source block is inserted between the first branch block "4" and the aggregation block "4". The display control part 117 disposes the complementary block "empty" as a second aggregation source block inserted between the second branch block "empty" and the aggregation block "M" on the screen 50. Consequently, the user can easily insert an additional block into a branch path.

As illustrated in FIGS. 16A to 16C, a case is assumed in which the block "5" in a dragged state is dropped onto the insertion region (refer to FIG. 15) between the branch source block "3" and the first branch block "4". In this case, the display control part 117 displays a state in which the dropped block "5" as a new first branch block is inserted between the aggregation source block "3" and the original first branch block "4". The display control part 117 disposes the complementary block "empty" as a second aggregation source block inserted between the second branch block "empty" and the aggregation block "M" on the screen 50. Consequently, the user can easily insert an additional block into a branch path.

As illustrated in FIGS. 17A to 17D, a case is assumed in which the block "8" in a dragged state is dropped onto the connection region (region 72a) of the first branch block in the block "5" that is a first aggregation source block disposed on the screen 50. In this case, the display control part 117 uses the dropped block "8" as a first aggregation source block, and disposes the second aggregation block "M2" connected to the first aggregation block "M1" that is an aggregation block to which the first aggregation source block "5" is connected on the screen 50. The display control part 117 changes the first aggregation block "M1" to a second aggregation source block for the second aggregation block "M2". The display control part 117 disposes, on the screen 50, the third aggregation block "M3" connected to the second aggregation block "M2", and the complementary block "empty 2" connecting the block "7" that was a second aggregation source block for the first aggregation block "5" to the third aggregation block "M3". Consequently, the user can easily create an additional branch path.

In the above case, the display control part 117 adjusts a distance between the second aggregation source block "empty" for the second aggregation block "M2" and the block "7" that was the second aggregation source block for the first aggregation block "M1", and a distance between the second aggregation source block "empty" for the second aggregation block "M2" and the complementary block "empty 2" such that the blocks are separated from each other. Consequently, the user can intuitively understand a connection state between blocks. The configurations described in the embodiment may be appropriately combined within the scope without departing from the purpose.

APPENDIX

The above embodiment discloses the following appendices. The appendices may be combined as appropriate.

[Appendix 1]

A sound processing device (10) that can set a plurality of processes to be performed on a sound signal on a time axis, the sound processing device including:
   a display control part (117) that controls display of a screen on which two or more blocks each indicating input and output of the sound signal and process details for the input sound signal can be disposed; and
   a signal processing part (116) that performs a process corresponding to each block on the sound signal in a block order defined on the basis of a positional relationship between a block disposed on the screen and a new block disposed on the screen (FIG. 2) (1).

[Appendix 2]

The sound processing device according to Appendix 1 further including:
   a generation part (112) that generates information indicating the block order on the basis of the positional relationship (FIG. 2) (2).

[Appendix 3]

The sound processing device according to Appendix 2, in which, in a case where a position of the disposed new block is present in a connection region provided in the disposed block, the generation part generates information indicating the block order in which the disposed block is followed by the disposed new block (S042 in FIG. 24) (3).

[Appendix 4]

The sound processing device according to Appendix 2, in which, in a case where a position of the disposed new block is present in an insertion region provided in two adjacent blocks disposed on the screen, the generation part generates information indicating the block order in which the disposed new block is inserted between the two blocks (S042 in FIG. 24, and FIG. 29) (4).

[Appendix 5]
The sound processing device according to Appendix 2, in which, in a case where a position of the disposed new block is present in an overwriting region provided in the disposed block, the generation part generates information indicating the block order in which the disposed block is overwritten with the disposed new block (S042 in FIG. 24, and FIG. 31) (5).

[Appendix 6]
The sound processing device according to any one of Appendices 1 to 5, in which the disposed new block is a block that is dragged in a first region of the screen and dropped onto a second region in which the disposed block is displayed (FIG. 4A) (6).

[Appendix 7]
The sound processing device according to any one of Appendices 1 to 5, in which the disposed new block is a block selected from among a plurality of the disposed blocks through a drag operation and dropped at a position different from a disposition position before the drag operation (FIG. 3B) (7).

[Appendix 8]
The sound processing device according to any one of Appendices 1 to 7, in which two or more disposed blocks are disposed on the screen along a direction of the time axis defined on the screen (FIG. 3A) (8).

[Appendix 9]
The sound processing device according to Appendix 8, in which, in a case where a second block is connected and disposed in a future direction of a first block disposed on the screen, the display control part displays the second block on the screen in a state in which a center of the second block is located on a virtual straight line that is disposed in the direction of the time axis and passes through the center of the disposed block (FIG. 7B) (9).

[Appendix 10]
The sound processing device according to Appendix 9, in which the display control part displays the second block of which the center is located on the virtual straight line in a case where the second block is dropped onto a connection region of the first block (FIGS. 7A and 7B).

[Appendix 11]
The sound processing device according to Appendix 9 or 10, in which the second block intersects with the first block at one point on the screen (FIG. 7B).

[Appendix 12]
The sound processing device according to Appendix 9 or 10, in which the second block is disposed at a predetermined distance from the first block in the direction of the time axis on the screen (FIG. 34C).

[Appendix 13]
The sound processing device according to Appendix 9, in which each of outer shapes of the first block and the second block is a polygonal shape, and adjacent vertices of the first block and the second block are located on the virtual straight line (FIG. 7B).

[Appendix 14]
The sound processing device according to Appendix 9, in which each of outer shapes of the first block and the second block is a circular shape (FIGS. 36C and 36D).

[Appendix 15]
The sound processing device according to Appendix 8, in which, in a case where two blocks including a first branch block and a second branch block are disposed to be connected to a branch source block that is a block disposed on the screen, the two blocks are disposed such that respective centers of the first branch block and the second branch block are line-symmetrical with respect to a virtual straight line that is disposed in the direction of the time axis and passes through a center of the branch source block (FIG. 11C) (10).

[Appendix 16]
The sound processing device according to Appendix 15, in which the center of each of the first branch block and the second branch block is located on a second virtual straight line that is orthogonal to a first virtual straight line that is the virtual straight line on the screen and passes through the center of the branch source block (FIG. 35A) (11).

[Appendix 17]
The sound processing device according to Appendix 15, in which, in a case where the future direction of the time axis is the front of the branch source block and the virtual straight line is a center line of the branch source block, the center of the first branch block is disposed on the front left of the branch source block, and the center of the second branch block is disposed on the front right of the branch source block (FIG. 11C) (12).

[Appendix 18]
The sound processing device according to Appendix 15, in which, in a case where a block in a dragged state is dropped onto a connection region of the first branch block in the branch source block, the display control part disposes the dropped block at a disposition position of the first branch block, disposes a complementary block at a disposition position of the second branch block, and disposes an aggregation block to which two blocks including a first aggregation source block and a second aggregation source block are connected and the first branch block as the first aggregation source block and the second branch block as the second aggregation source block are connected, on the screen (FIGS. 11A to 11D) (13).

[Appendix 19]
The sound processing device according to Appendix 12, in which, in a case where a block in a dragged state is dropped onto a connection region of the second branch block in the branch source block, the display control part disposes the dropped block at a disposition position of the second branch block, disposes a complementary block at a disposition position of the first block, and disposes an aggregation block connected to the first branch block and the second branch block, on the screen.

[Appendix 20]
The sound processing device according to Appendix 18, in which, in a case where a block in a dragged state is dropped onto an insertion region between the first branch block and the aggregation block, the display control part displays a state in which the dropped block as the first aggregation source block is inserted between the first branch block and the aggregation block, and disposes a complementary block as the second aggregation source block inserted between the second branch block and the aggregation block on the screen (FIGS. 14A to 14C) (14).

[Appendix 21]
   The sound processing device according to Appendix 18, in which, in a case where a block in a dragged state is dropped onto an insertion region between the second branch block and the aggregation block, the display control part displays a state in which the dropped block as the second aggregation source block is inserted between the second branch source block and the aggregation block, and disposes a complementary block as the first aggregation source block inserted between the first branch source block and the aggregation block (FIGS. 16A to 16C).

[Appendix 22]
   The sound processing device according to Appendix 18, in which, in a case where a block in a dragged state is dropped onto an insertion region between the branch source block and the first branch block, the display control part displays a state in which the dropped block as a new first branch block is inserted between the aggregation block and the original first branch block, and disposes a complementary block as the second aggregation source block inserted between the second branch block and the aggregation block on the screen (FIGS. 16A to 16C) (15).

[Appendix 23]
   The sound processing device according to Appendix 15 or 16,
   in which, in a case where a block in a dragged state is dropped onto an insertion region between the branch source block and the second branch block, the display control part displays a state in which the dropped block as a new second branch block is inserted between the aggregation source block and the original second branch block, and disposes a complementary block as the first aggregation source block inserted between the first branch block and the aggregation block on the screen.

[Appendix 24]
   The sound processing device according to Appendix 18, in which, in a case where a block in a dragged state is dropped onto a connection region of the first branch block in the block that is the first aggregation source block, disposed on the screen, the display control part disposes, with the dropped block as a first aggregation source block, a second aggregation block connected to a first aggregation block that is an aggregation block to which the first aggregation source block is connected on the screen, changes the first aggregation block to a second aggregation source block for the second aggregation block, and disposes a third aggregation block connected to the second aggregation block, and a complementary block connecting a block that was the second aggregation source block for the first aggregation block to the third aggregation block on the screen (FIGS. 17A to 17D) (16).

[Appendix 25]
   The sound processing device according to Appendix 24, in which the display control part adjusts a distance between the second aggregation source block for the second aggregation block and a block that was the second aggregation source block for the first aggregation block and a distance between the second aggregation source block for the second aggregation block and the complementary block such that the blocks are separated from each other (FIG. 18A) (17).

[Appendix 26]
   The sound processing device according to any one of Appendices 1 to 24,
   in which an outer shape of the block disposed on the screen is a polygonal shape (FIGS. 3A, 34A, and 35A to 35C).

[Appendix 27]
   The sound processing device according to any one of Appendices 1 to 24,
   in which an outer shape of the block disposed on the screen is a circular shape (FIGS. 36A to 36D).

[Appendix 28]
   The sound processing device according to any one of Appendices 1 to 26,
   in which a block having a polygonal outer shape and a block having a circular outer shape are disposed on the screen in a mixed manner (FIG. 37B).

[Appendix 29]
   The sound processing device according to any one of Appendices 26 to 28,
   in which blocks that are connected to each other are in contact with each other at one point on the screen (FIG. 7B).

[Appendix 30]
   The sound processing device according to Appendix 30,
   in which respective centers of the blocks connected to each other and the adjacent vertices of the first block and the second block are located on a virtual straight line (FIG. 7B).

[Appendix 31]
   The sound processing device according to any one of Appendices 26 to 28,
   in which blocks that are connected to each other are disposed with a predetermined distance on the screen (FIG. 34A).

[Appendix 32]
   The sound processing device according to Appendix 31,
   in which respective sides of the blocks connected to each other are disposed in parallel with a distance (FIG. 34A).

[Appendix 33]
   The sound processing device according to any one of Appendices 1 to 32,
   in which a set block in which a plurality of processes performed by a plurality of blocks are defined can be disposed as one of the blocks on the screen (FIG. 5B) (18).

[Appendix 34]
   The sound processing device according to Appendix 18 or 19,
   in which a process performed in the complementary block is a process of causing the input sound signal to pass therethrough (FIG. 11C).

[Appendix 35]
   A sound processing method of causing a sound processing device that can set a plurality of processes to be performed on a sound signal on a time axis, to execute:
   controlling display of a screen on which two or more blocks each indicating input and output of the sound signal and process details for the input sound signal can be disposed; and
   performing a process corresponding to each block on the sound signal in a block order defined on the basis of a positional relationship between a block disposed on the screen and a new block disposed on the screen (19).

[Appendix 36]

A program causing a computer of a sound processing device that can set a plurality of processes to be performed on a sound signal on a time axis, to execute:

controlling display of a screen on which two or more blocks each indicating input and output of the sound signal and process details for the input sound signal can be disposed; and performing a process corresponding to each block on the sound signal in a block order defined on the basis of a positional relationship between a block disposed on the screen and a new block disposed on the screen (20).

What is claimed is:

1. A sound processing device that is capable to set a plurality of processes to be performed on a sound signal on a time axis, the sound processing device comprising:

a display control part that controls display of a screen on which two or more blocks each indicating input and output of the sound signal and process details for the input sound signal are disposed; and a signal processing part that performs a process corresponding to each block on the sound signal in a block order defined on a basis of a positional relationship between a block disposed on the screen and a new block disposed on the screen, wherein two or more disposed blocks are disposed on the screen along a direction of the time axis defined on the screen, and wherein, in a case where two blocks including a first branch block and a second branch block are disposed to be connected to a branch source block that is a block disposed on the screen, the two blocks are disposed such that respective centers of the first branch block and the second branch block are line-symmetrical with respect to a virtual straight line that is disposed in the direction of the time axis and passes through a center of the branch source block.

2. The sound processing device according to claim 1, further comprising:

a generation part that generates information indicating the block order on a basis of the positional relationship.

3. The sound processing device according to claim 2,
wherein, in a case where a position of the disposed new block is present in a connection region provided in the disposed block, the generation part generates information indicating the block order in which the disposed block is followed by the disposed new block.

4. The sound processing device according to claim 2,
wherein, in a case where a position of the disposed new block is present in an insertion region provided in two adjacent blocks disposed on the screen, the generation part generates information indicating the block order in which the disposed new block is inserted between the two blocks.

5. The sound processing device according to claim 2,
wherein, in a case where a position of the disposed new block is present in an overwriting region provided in the disposed block, the generation part generates information indicating the block order in which the disposed block is overwritten with the disposed new block.

6. The sound processing device according to claim 1,
wherein the disposed new block is a block that is dragged in a first region of the screen and dropped onto a second region in which the disposed block is displayed.

7. The sound processing device according to claim 1,
wherein the disposed new block is a block selected from among a plurality of the disposed blocks through a drag operation and dropped at a position different from a disposition position before the drag operation.

8. The sound processing device according to claim 1,
wherein, in a case where a second block is connected and disposed in a future direction of a first block disposed on the screen, the display control part displays the second block on the screen in a state in which a center of the second block is located on a virtual straight line that is disposed in the direction of the time axis and passes through the center of the disposed block.

9. The sound processing device according to claim 1,
wherein the center of each of the first branch block and the second branch block is located on a second virtual straight line that is orthogonal to a first virtual straight line that is the virtual straight line on the screen and passes through the center of the branch source block.

10. The sound processing device according to claim 8,
wherein, in a case where the future direction of the time axis is the front of the branch source block and the virtual straight line is a center line of the branch source block, the center of the first branch block is disposed on the front left of the branch source block, and the center of the second branch block is disposed on the front right of the branch source block.

11. The sound processing device according to claim 10,
wherein, in a case where a block in a dragged state is dropped onto a connection region of the first branch block in the branch source block, the display control part disposes the dropped block at a disposition position of the first branch block, disposes a complementary block at a disposition position of the second branch block, and disposes an aggregation block to which two blocks including a first aggregation source block and a second aggregation source block are connected and the first branch block as the first aggregation source block and the second branch block as the second aggregation source block are connected, on the screen.

12. The sound processing device according to claim 11,
wherein, in a case where a block in a dragged state is dropped onto an insertion region between the first branch block and the aggregation block, the display control part displays a state in which the dropped block as the first aggregation source block is inserted between the first branch block and the aggregation block, and disposes a complementary block as the second aggregation source block inserted between the second branch block and the aggregation block.

13. The sound processing device according to claim 11,
wherein, in a case where a block in a dragged state is dropped onto an insertion region between the branch source block and the first branch block, the display control part displays a state in which the dropped block as a new first branch block is inserted between the aggregation block and the original first branch block, and disposes a complementary block as the second aggregation source block inserted between the second branch block and the aggregation block on the screen.

14. The sound processing device according to claim 13,
wherein, in a case where a block in a dragged state is dropped onto a connection region of the first branch block in the block that is the first aggregation source block, disposed on the screen, the display control part disposes, with the dropped block as a first aggregation source block, a second aggregation block connected to a first aggregation block that is an aggregation block to which the first aggregation source block is connected on the screen, changes the first aggregation block to a second aggregation source block for the second aggregation block, and disposes a third aggregation block connected to the second aggregation block, and a complementary block connecting a block that was the second aggregation source block for the first aggregation block to the third aggregation block on the screen.

15. The sound processing device according to claim 14, wherein the display control part adjusts a distance between the second aggregation source block for the second aggregation block and a block that was the second aggregation source block for the first aggregation block and a distance between the second aggregation source block for the second aggregation block and the complementary block such that the blocks are separated from each other.

16. The sound processing device according to claim 1, wherein a set block in which a plurality of processes performed by a plurality of blocks are defined is disposed as one of the blocks on the screen.

17. A sound processing method of causing a sound processing device that is capable to set a plurality of processes to be performed on a sound signal on a time axis, to execute:
   controlling display of a screen on which two or more blocks each indicating input and output of the sound signal and process details for the input sound signal are disposed on the screen along a direction of the time axis defined on the screen;
   in a case where two blocks including a first branch block and a second branch block are disposed to be connected to a branch source block that is a block disposed on the screen, disposing the two blocks such that respective centers of the first branch block and the second branch block are line-symmetrical with respect to a virtual straight line that is disposed in the direction of the time axis and passes through a center of the branch source block; and
   performing a process corresponding to each block on the sound signal in a block order defined on a basis of a positional relationship between a block disposed on the screen and a new block disposed on the screen.

18. A recording medium storing a program causing a computer of a sound processing device that is capable to set a plurality of processes to be performed on a sound signal on a time axis, to execute:
   controlling display of a screen on which two or more blocks each indicating input and output of the sound signal and process details for the input sound signal are disposed on the screen along a direction of the time axis defined on the screen;
   in a case where two blocks including a first branch block and a second branch block are disposed to be connected to a branch source block that is a block disposed on the screen, disposing the two blocks such that respective centers of the first branch block and the second branch block are line-symmetrical with respect to a virtual straight line that is disposed in the direction of the time axis and passes through a center of the branch source block; and
   performing a process corresponding to each block on the sound signal in a block order defined on a basis of a positional relationship between a block disposed on the screen and a new block disposed on the screen.

* * * * *